US011175964B2

(12) United States Patent
Jaeger et al.

(10) Patent No.: US 11,175,964 B2
(45) Date of Patent: Nov. 16, 2021

(54) PARTNER ENABLEMENT SERVICES FOR MANAGED SERVICE AUTOMATION

(71) Applicant: Virtustream IP Holding Company LLC, Bethesda, MD (US)

(72) Inventors: Peter Jaeger, Wiesbaden (DE); Vincent G. Lubsey, Davenport, FL (US); Gregsie Leighton, Alpharetta, GA (US); Derek Anderson, Roberts Creek (CA); Michael Fink, Gaffney, SC (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 393 days.

(21) Appl. No.: 16/265,216

(22) Filed: Feb. 1, 2019

(65) Prior Publication Data

US 2020/0250009 A1    Aug. 6, 2020

(51) Int. Cl.
| | |
|---|---|
| *H04L 12/24* | (2006.01) |
| *H04L 29/08* | (2006.01) |
| *G06F 9/50* | (2006.01) |
| *G06F 9/455* | (2018.01) |

(52) U.S. Cl.
CPC ........ *G06F 9/5077* (2013.01); *G06F 9/45541* (2013.01); *H04L 41/0803* (2013.01); *H04L 41/5061* (2013.01); *H04L 67/10* (2013.01)

(58) Field of Classification Search
None
See application file for complete search history.

(56) References Cited

U.S. PATENT DOCUMENTS

| 10,742,721 B1* | 8/2020 | Wagner | H04L 12/4641 |
| 2018/0183578 A1* | 6/2018 | Chakrabarti | H04L 9/3247 |
| 2020/0084202 A1* | 3/2020 | Smith | H04L 67/28 |

OTHER PUBLICATIONS

Vaultproject.IO, "Kubernetes Auth Method," vaultproject.io/docs/auth/kubernetes.html, Jan. 23, 2019, 3 pages.

(Continued)

*Primary Examiner* — Angela Nguyen
(74) *Attorney, Agent, or Firm* — Ryan, Mason & Lewis, LLP

(57) ABSTRACT

An apparatus in one embodiment comprises at least one processing device having a processor coupled to a memory configured to implement a plurality of virtual computing resources including a first subset providing a management network, a second subset providing partner zones, and a third subset providing customer service enclaves. The management network is configured to provision and control communication between partner zones and customer service enclaves. A given partner zone associated with a given partner is configured to provision partner-controlled services of the given partner to customer environments via the customer service enclaves. A given customer service enclave associated with a given customer is configured to activate the given partner for a given customer environment associated with the given customer to enable provisioning of the partner-controlled services of the given partner from the given partner zone to the given customer environment.

20 Claims, 49 Drawing Sheets

(56) References Cited

OTHER PUBLICATIONS

Hashicorp, "Vault Plugin: Kubernetes Auth Backend," https://github.com/hashicorp/vault-plugin-auth-kubernetes, Nov. 30, 3018, 3 pages.
Frazelle J., "Hard Multi-Tenancy in Kubernetes," Jessie Frazelle's Blog, https://blog.Jessfraz.com/post/hard-multi-tenancy-in-kubernetes/, May 18, 2018, 7 pages.
Martin, A., "11 Ways (Not) to Get Hacked," https://kubernetes.lo/blog/2018/07/18/11-ways-not-to-get-hacked/, Jul. 18, 2018, 23 pages.
Fernandes, J., "Building on Kubernetes: Bringing Google-Scale Container Orchestration and Management to the Enterprise," https://blog.openshift.com/buiiding-kubernetes-bringing-google-scale-container-orchestration-to-the-enterprise/, Apr. 28, 2015, 6 pages.
"SAP GUI Logon Configuration—Netweaver Technology," https://wiki.scn.sap.com/wiki/display/NWTech/SAP+GUI+Logon+Configuration, Nov. 6, 2013, 6 pages.
"State Testing," Salt Table: Developing Salt Tutorial: Modular Systems: Module Types: State: State System Reference:, https://docs.saltstack.com/en/latest/ref/states/testing.html#state-testing, Mar. 3, 2018,1 page.
"What Is Amazon VPC?" AWS Documentation: Amazon VPC: User Guide:, https://docs.aws.amazon.com/vpc/latest/userguide/what-is-amazon-vpc.html, Jan. 23, 2018, 9 pages.
Aussourd, C., "A Single AWS Elastic Load Balancer for Several Kubernetes Services Using Kubernetes Ingress," https://www.sandtable.com/a-single-aws-elastic-load-balancer-for-several-kubernetes-services-using-kubernetes-ingress/, May 12, 2016, 9 pages.
"Cloud Providers," https://kubernetes.io/docs/concepts/cluster-administration/cloud-providers/, Jan. 23, 2019, 14 pages.
"NGINX Ingress Controller for Kubernetes," https://github.com/kubernetes/ingress-nginx, Jan. 23, 2019, 3 pages.
"Installing Kubernetes on AWS With Kops," https://kubernetes.io/docs/setup/custom-cloud/kops/, Aug. 21, 2018, 6 pages.
"Kubernetes Auth Method," vaultproject.io/docs/auth/kubernetes.html, Jan. 23, 2019, 3 pages.
"Limits for Your Network Load Balancers," AWS Documentation: Elastic Load Balancing: Network Load Balancers:, https://docs.aws.amazon.com/elasticloadbalancing/latest/network/load-balancer-limits.html, Jan. 23, 2019, 1 page.
"Network Load Balancers," https://docs.aws.amazon.com/elasticloadbalancing/latest/network/network-load-balancers.html, Jan. 23, 2019, 4 pages.
"Accelerate Your Zero Trust Journey With AppGate SDP," https://www.cyxtera.com/essential-defense/appgate-sdp, Jan. 23, 2019, 3 pages.
"A Network Engineers Best Friend," http://spritelink.github.io/NIPAP/, Jan. 23, 2019, 5 pages.
Rekhter, Y. et al., "Address Allocation for Private Internets," Internet Engineering Task Force (IETF) Request for Comments (RFC) 1918, Feb. 1996, 9 pages.
Weil, J. et al., "IANA-Reserved IPV4 Prefix for Shared Address Space," Internet Engineering Task Force (IETF) Request for Comments (RFC) 6598, Apr. 2012, 11 pages.
"Updating Your Security Groups to Reference Peer VPC Groups," https://docs.aws.amazon.com/vpc/latest/peering/vpc-peering-security-groups.html, Jan. 23, 2019, 5 pages.
"Using HashiCorp Vault with Kubernetes (Cloud Next '18)," http://www.youtube.com/watch?v=B16YTeSs1hl, Jul. 26, 2018, 2 pages.
"Amazon Elastic Container Registry," https://aws.amazon.com/ecr/, Jan. 23, 2019, 2 pages.
U.S. Appl. No. 16/054,176 filed in the name of Peter Jaeger on Aug. 3, 2018 and entitled "Standardized Microservices for Controlling Components of Distinct Applications in Multi-Tentant Clouds."

* cited by examiner

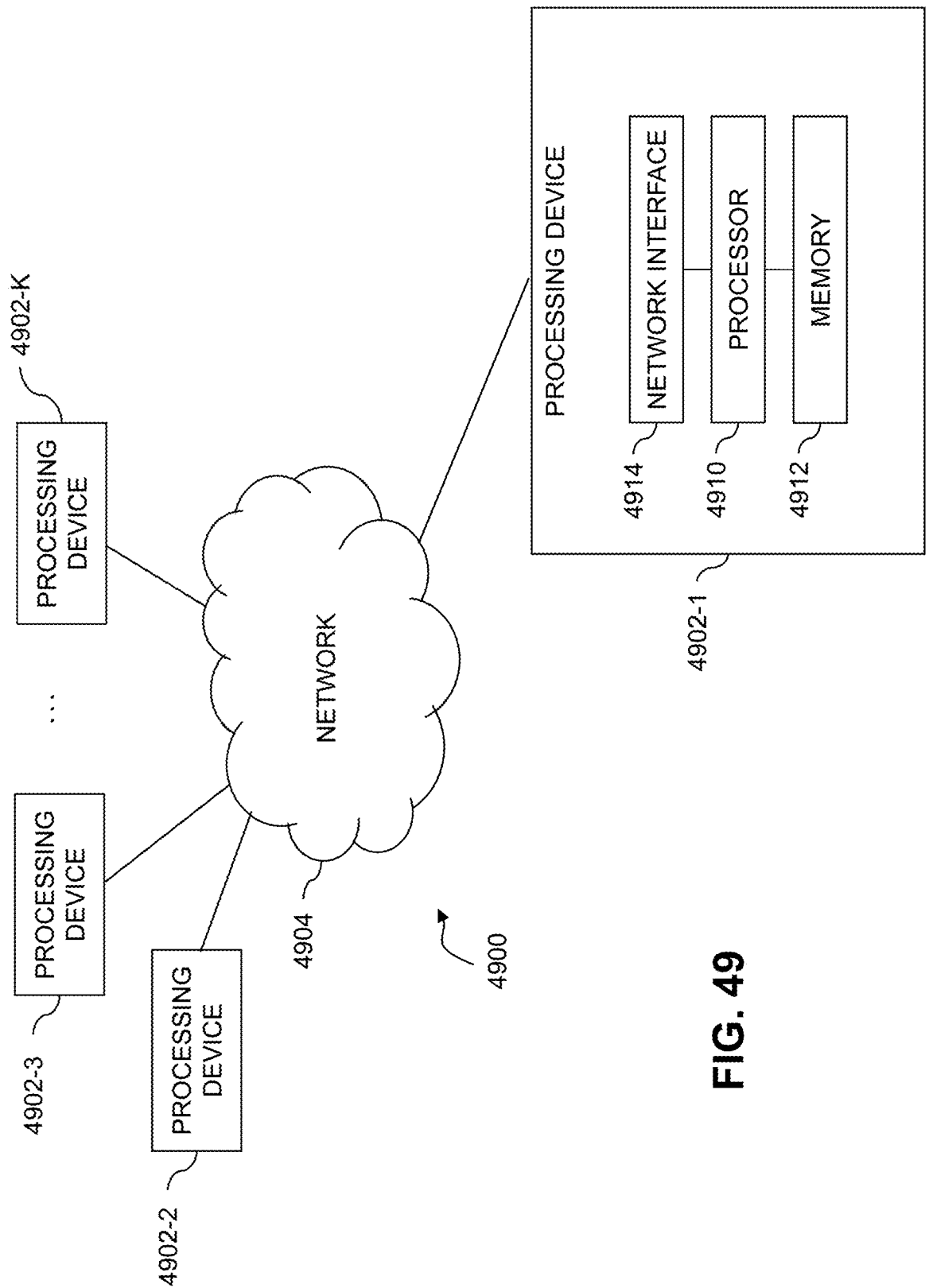

PARTNER ENABLEMENT SERVICES FOR MANAGED SERVICE AUTOMATION

FIELD

The field relates generally to information processing systems, and more particularly to techniques for managing cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present invention provide techniques for managed service automation utilizing partner enablement services.

In one embodiment, an apparatus comprises at least one processing device comprising a processor coupled to a memory, wherein the at least one processing device is configured to implement a plurality of virtual computing resources. The plurality of virtual computing resources comprises a first subset of virtual computing resources providing a management network for a partner enablement services framework, the management network being configured to provision and control communication between one or more partner zones associated with one or more partners of the partner enablement services framework and one or more customer service enclaves associated with one or more customers of the partner enablement services framework. The plurality of virtual computing resources also comprises a second subset of virtual computing resources providing the one or more partner zones, wherein a given partner zone associated with a given partner of the partner enablement services framework is configured to provision one or more partner-controlled services of the given partner to one or more customer environments via the one or more customer services enclaves. The plurality of virtual computing resources further comprises a third subset of virtual computing resources providing the one or more customer service enclaves, wherein a given customer service enclave associated with a given customer of the partner enablement services framework is configured to activate partner enablement services and the given partner for a given customer environment associated with the given customer to enable provisioning of the one or more partner-controlled services of the given partner from the given partner zone to the given customer environment.

These and other illustrative embodiments include, without limitation, methods, apparatus, networks, systems and processor-readable storage media.

BRIEF DESCRIPTION OF THE DRAWINGS

FIGS. 48 and 49 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
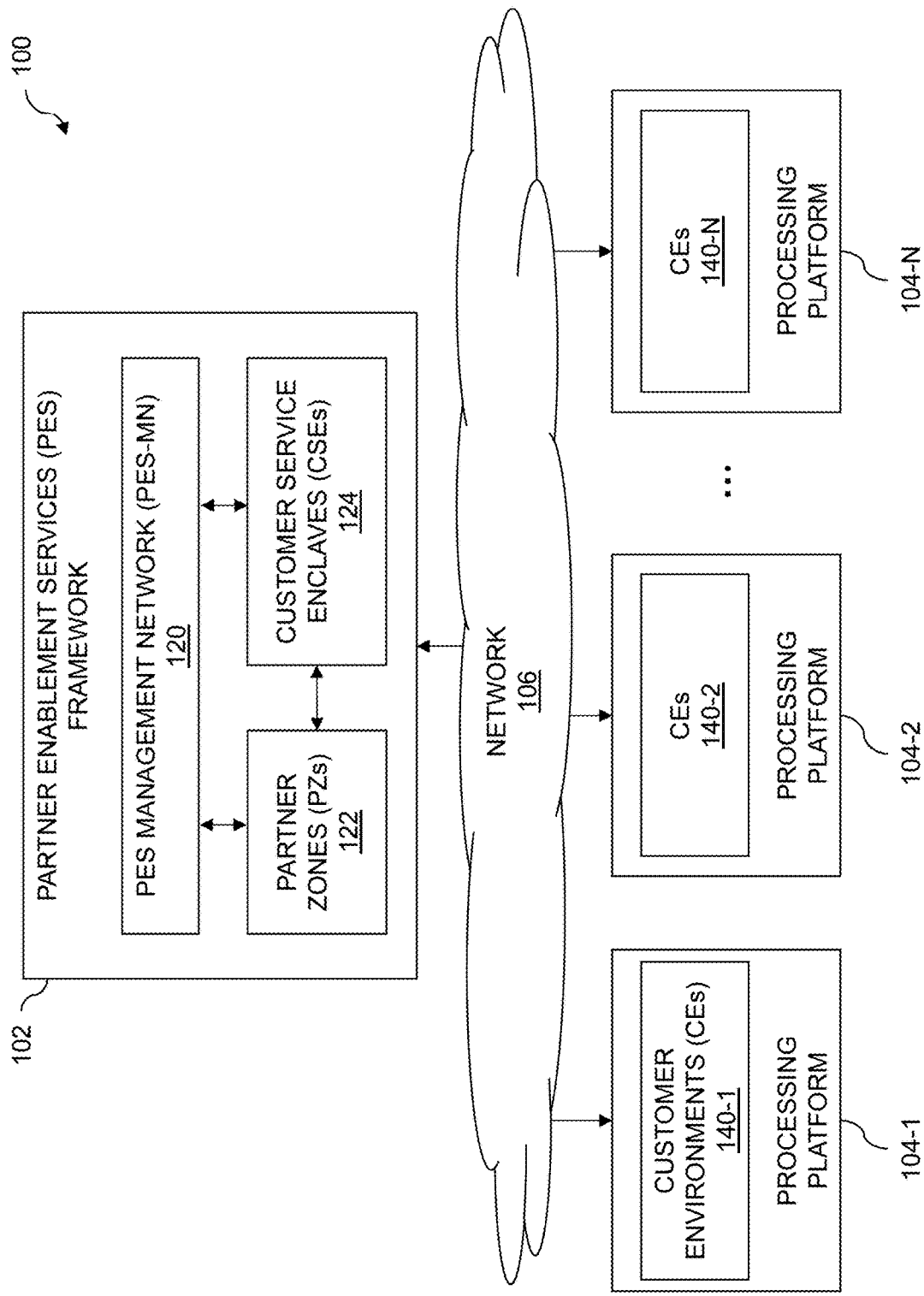
FIG. 1 is a block diagram of an information processing system for partner enablement services for managed service automation in an illustrative embodiment of the invention.

FIG. 1 shows an information processing system 100, including a partner enablement services (PES) framework 102 and a set of processing platforms 104-1, 104-2, . . . 104-N (collectively, processing platforms 104) coupled via network 106. The PES framework 102 includes a PES management network (PES-MN) 120, a set of partner zones (PZs) 122 associated with partners of the PES framework 102, and a set of customer service enclaves (CSEs) 124 associated with customers of the PES framework 102. Each of the processing platforms 104 is assumed to implement a set of customer environments (CEs) 140 (e.g., CEs 140-1 on processing platform 104-1, CEs 140-2 on processing platform 104-2, . . . , CEs 140-N on processing platform 104-N).

The PES-MN 120 is configured to provision and control communication between the PZs 122 and the CSEs 124. The PES-MN 120, for example, is configured to provide partner and customer onboarding functionality. When a partner is on-boarded to the PES framework 102, the PES-MN 120 instantiates a PZ 122 for that partner, and when a customer is on-boarded to the PES framework 102, the PES-MN 120 instantiates a CSE 124 for that customer. Such instantiation of the PZs 122 and CSEs 124 may, in some embodiments, include deploying container images containing Partner Administrative Services (PAS) and Tenant Administrative Services (TAS) functionality for the PZs 122 and CSEs 124, respectively.

The PZs 122 are configured to provision partner-controlled services (PCS), such as managed services, to CEs 140 via the CSEs 124. To do so, the CSEs 124 first activate PES and partners for the CEs 140. For example, a given partner operating a given one of the PZs 122 is only able to deploy managed services (e.g., PCS) to a given one of the CEs 140 for a given customer after the given customer has enabled PES for the given CE 140 and has enabled the given partner for the given CE 140. It should be appreciated that a given customer may be associated with multiple ones of the CEs 140, which may operate on the same or different ones of the processing platforms 104. The processing platforms 104, in some embodiments, represent different cloud computing platforms operated by one or more cloud service providers (CSPs). Thus, via the PES framework 102, managed service automation functionality (e.g., multi-cloud service automation) is provided using the PES-MN 120, PZs 122 and CSEs 124.

In some embodiments, the PES-MN 120, PZs 122 and CSEs 124 comprise respective subsets of a plurality of virtual computing resources providing the PES framework 102. Such virtual computing resources may include one or more virtual machines (VMs), one or more containers, etc. The CEs 140 may also be provided via virtual computing resources such as VMs and containers. The plurality of virtual computing resources providing the PES framework 102 may run on an Infrastructure-as-a-Service (IaaS) platform that is provided by a provider of the PES framework 102 (e.g., a PES Platform Provider or PPP). The processing platforms 104 on which the CEs 140 run may be the same as or distinct from the IaaS platform providing the PES framework 102. For example, one or more of the CEs 140 may operate on a given one of the processing platforms 104-1 that also provides the IaaS platform for PES framework 102 while one or more other ones of the CEs 140 may operate on distinct IaaS or other cloud computing platforms 104-2 through 104-N not operated by the PPP.

The PES framework 102 and the processing platforms 104 may run on one or more clouds, with each cloud illustratively comprising a plurality of host devices configured to support execution of applications on behalf of multiple users, although such host devices are not explicitly shown in FIG. 1. For example, the host devices of a cloud providing one or more of the processing platforms 104 or a cloud implementing the PES framework 102 may comprise respective container host devices. Cloud native applications can execute in respective application containers implemented utilizing the container host devices. The container host devices may comprise Docker containers, LXD containers, Cloud Foundry Diego-based containers or other types of containers. These and other host devices are examples of what are more generally referred to herein as "processing devices."

It should be noted that references above and elsewhere herein to container host devices should not be viewed as limiting in any way. Other embodiments can utilize other types of host devices, including VMs and "bare metal" hosts. The term "host device" as used herein is therefore intended to be broadly construed.

One or more of the clouds may be implemented using a layered architecture. For example, such a cloud can comprise a Platform-as-a-Service (PaaS) layer overlying an IaaS layer. The IaaS layer may illustratively comprise a plurality of VM instances configured to support application containers or other containers of the PaaS layer of the cloud.

One or more of the clouds providing the processing platforms 104, or a cloud used to implement the PES framework 102 may also include at least one storage platform implementing one or more of block storage, object storage and file storage, although additional or alternative types of storage platforms can be used in other embodiments. The block storage may be implemented using a software-defined storage product such as ScaleIO™ to provide a virtual storage area network (vSAN). The object storage may be implemented using a cloud storage product such as Elastic Cloud Storage (ECS). The file storage may be implemented using Isilon® platform nodes and associated accelerators in the S-Series, X-Series and NL-Series product lines. The above-mentioned storage products are from Dell EMC.

Different combinations of these and numerous other storage products can also be used in implementing a given storage platform in an illustrative embodiment. Additional examples of storage products that may be used in other embodiments include VNX® and Symmetrix VMAX® storage arrays, all-flash and hybrid flash storage arrays such as Unity™, object-based storage products such as Atmos®, scale-out all-flash storage arrays such as XtremIO™, and software-defined storage products such ViPR®, also from Dell EMC. Combinations of multiple ones of these and other storage products can also be used in implementing a given storage platform in an illustrative embodiment.

The PES framework 102 of the information processing system 100 in the FIG. 1 embodiment is assumed to be implemented using at least one processing platform, which may be one of the processing platforms 104. Each processing platform is assumed to comprise one or more processing devices each having a processor coupled to a memory. Such processing devices can illustratively include particular arrangements of compute, storage and network resources.

At least portions of the PES framework 102, PES-MN 120, PZs 122, CSEs 124 and CEs 140 may be implemented at least in part in the form of software that is stored in memory and executed by a processor.

The PES framework 102 may be implemented on a distinct processing platform relative to the processing platforms 104, although numerous other arrangements are possible. For example, in some embodiments at least portions of the PES framework 102 may be implemented on one of the processing platforms 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the PES framework 102 and processing platforms 104, or components thereof, to reside in different data centers. Numerous other distributed implementations are possible. The PES framework 102, for example, can be implemented in a distributed manner across multiple data centers.

Additional examples of processing platforms utilized to implement components of the system 100 will be described in more detail below in conjunction with FIGS. 48 and 49.

It is to be appreciated that these and other features of illustrative embodiments are presented by way of example only, and should not be construed as limiting in any way.

Figure 2:
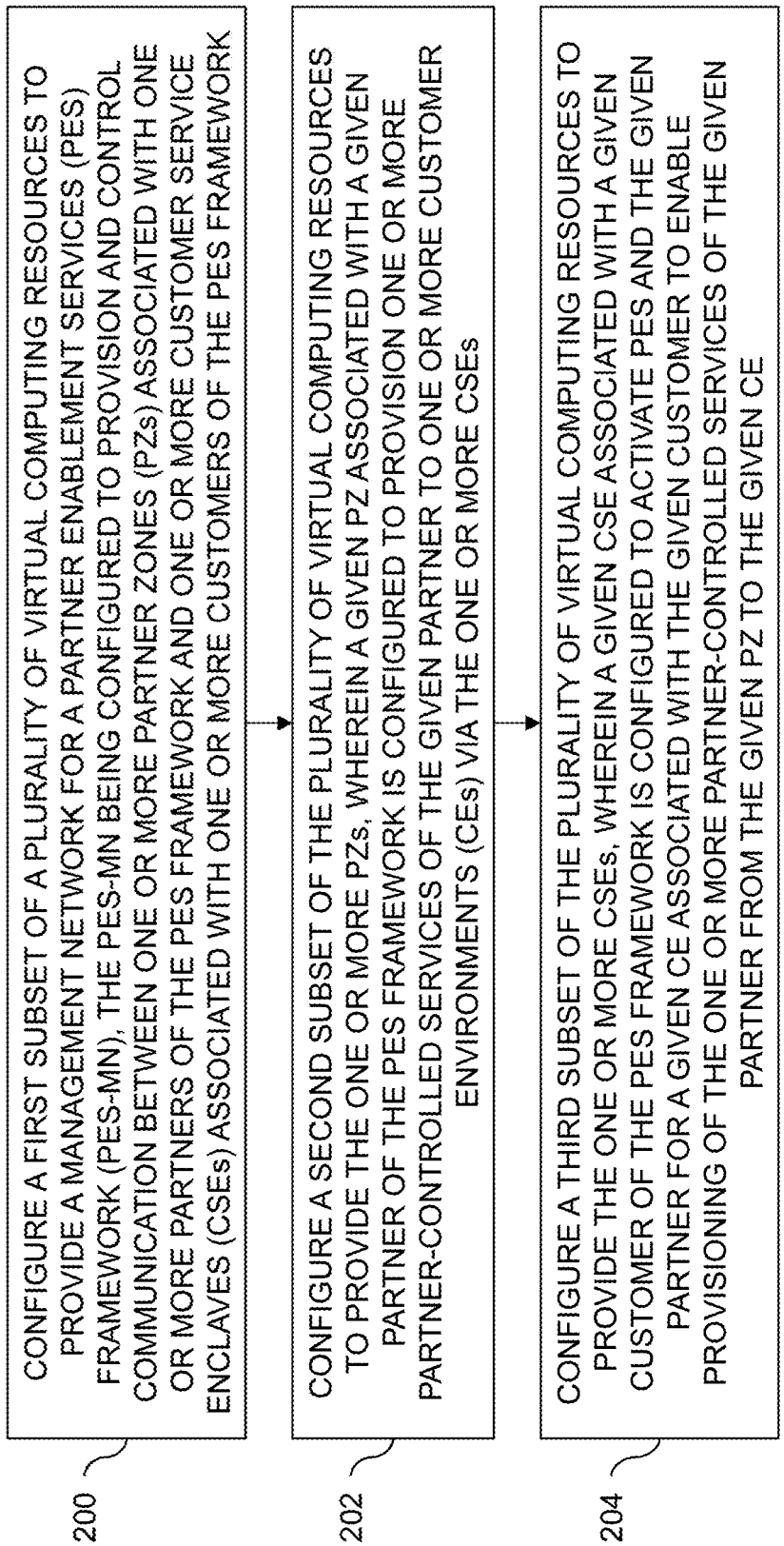
FIG. 2 is a flow diagram of an exemplary process for managed service automation utilizing partner enablement services in an illustrative embodiment.

An exemplary process for managed service automation (e.g., multi-cloud service automation) utilizing PES will now be described in more detail with reference to the flow diagram of FIG. 2. It is to be understood that this particular process is only an example, and that additional or alternative processes for managed service automation utilizing PES can be carried out in other embodiments.

In this embodiment, the process includes steps 200 through 204. These steps are assumed to be performed by the PES framework 102 utilizing PES-MN 120, PZs 122 and CSEs 124. The process begins with step 200, configuring a first subset of a plurality of virtual computing resources to provide the PES-MN 120, the PES-MN 120 being configured to provision and control communication between the PZs 122 and the CSEs 124.

In step 202, a second subset of the plurality of virtual computing resources are configured to provide the PZs 122. A given one of the PZs 122 associated with a given partner of the PES framework 102 is configured to provision one or more PCSs of the given partner to one or more of the CEs 140 via the CSEs 124.

In step 204, a third subset of the plurality of virtual computing resources is configured to provide the CSEs 124. A given one of the CSEs 124 associated with a given customer of the PES framework 102 is configured to enable PES and the given partner for the given CE 140, thereby enabling provisioning of the PCSs of the given partner from the given PZ 122 to the given CE 140.

In some embodiments, communication between the CEs 140 and the PZs 122 is initiated at the CEs 140, and takes place via the CSEs 124. The PES-MN 120 may be configured to provision the PZs 122 with a PAS container image providing application functionality for provisioning PCS, and to configure the CSEs 124 with a TAS container image providing application functionality for activating PES for partners (e.g., thereby enabling access from such partners associated PZs 122 to the CSEs 124) and the CEs 140. The TAS container image may further provide application functionality for enabling individual partners for individual ones of the CEs 140.

The PES-MN 120 may comprise a Partner Directory that is configured to maintain information for partners, customers and a provider of the PES framework 102 (e.g., the PPP). The Partner Directory may be further configured to maintain authorizations provided by the one or more customers to the one or more partners for the CSEs 124 and the CEs 140. The PES-MN 120 may also comprise a credential store that stores credentials utilized by the one or more partners and the one or more customers to access the PES framework 102. The PES-MN 120 may further comprise a central logging system that stores access records for the one or more partners and the one or more customers of the PES framework 102. The PES-MN 120 may further comprise a repository hosting container images for one or more microservices (e.g., TAS, PAS, PCS) utilized in the PZs 122 and CSEs 124.

In some embodiments, the PES-MN 120 is configured to manage routes between the PES-MN 120, the PZs 122 and the CSEs 124. This may include generating a route between the PES-MN 120 and a given one of the CSEs 124 responsive to onboarding a given customer to the PES framework 102 (e.g., which may include first instantiating the given CSE 124 for the given customer). This may also include generating a route between the given CSE 124 and a given one of the CEs 140 responsive to the given customer activating PES for the given CE 140. Managing the routes may further include generating a route between the PES-MN 120 and a given one of the PZs 122 responsive to onboarding a given partner to the PES framework 102 (e.g., which may include first instantiating the given PZ 122 for the given partner), and generating a route between the given PZ 122 and the given CSE 124 responsive to activating the given partner for the given customer.

The PES-MN 120 may comprise a user interface (UI) portal that exposes various self-service functions for the partners, customers and the PPP of the PES framework 102. Such self-service functions may include, but are not limited to: PES activation and deactivation by the customers; partner activation and deactivation for the CSEs 124 by the one or more customers; viewing users, groups, authorizations, access records, routes and logging entries of the PES framework 102; deploying and managing PCSs onto the PZs 122; publishing images for administrative services (e.g., PAS, TAS) deployed to the PZs 122 and CSEs 124 for enabling access by the customers to PCSs in the PZs 122 for activated partners and CEs 140 of the customers.

In some embodiments, the PES-MN 120 provides a configuration management infrastructure (e.g., a SaltStack infrastructure) for a given consumer associated with a given one of the CSEs 124. The configuration management infrastructure may include a master component (e.g., a Tenant Salt Master (TSM)) running in the given CSE 124, one or more minion components running on virtual computing resources (e.g., VMs, containers) operating in a given one of the CEs 140, and a version control system (e.g., GIT) running in the PES-MN 120 for version control of states and pillars (e.g., Salt States and Pillars) used by the configuration management infrastructure for the given consumer (e.g., a consumer- or tenant-specific GIT). The master component (e.g., the TSM) may be configured to apply states and pillars (e.g., Salt States and Pillars) from the version control system (e.g., GIT) to deploy and configure, via the minion components, applications and workloads onto the virtual computing resources operating in the given CE 140.

In some embodiments, the PES-MN 120 comprises a central repository of managed services (e.g., artifacts such as container images) that may be deployed in the PES framework 102. The central repository may include artifacts that are provided by the PPP and the partners. A given one of the CSEs 124 may include a remote repository that mirrors a set of available managed services from the central repository for deployment from the given CSE 124 to CEs 140 associated with a given customer operating the given CSE 124. The set of available managed services in the remote repository may include managed services that are offered by the PPP and managed services that are offered by partners that have been activated for the CEs 140 associated with the given customer.

The PCS-MN 120 in some embodiments comprises a Jump Host Orchestrator configured to provide Jump Hosts that provide access from the PZs 122 to virtual computing resources running in the CEs 140. Providing a given Jump Host may include: receiving a request for the given Jump Host from a given partner associated with a given one of the PZs 122 that has been activated for a given one of the CEs 140; deploying a Jump Host image (e.g., a container image) for the given Jump Host from the Jump Host Orchestrator in the PES-MN 120 to a given one of the CSEs 124 associated with the given customer running the given CE 140, provisioning the given Jump Host with a one-time passcode (OTP) certificate associated with the given partner from a certificate vault in the PES-MN 120; utilizing the OTP certificate provisioned in the given Jump Host to obtain an OTP for the given partner from a tenant vault running in the given CSE 124; and utilizing the given Jump Host to access a given virtual computing resource running in the given CE 140 utilizing the obtained OTP.

Additional details regarding implementations of the PES framework 102, PES-MN 120, PZs 122, CSEs 124 and CEs 140 will be discussed in further detail below.

If a cloud is mission-critical ready, highly usable and supported by a vibrant partner community, then the cloud will provide numerous advantages for the operator and its users. PES described herein provide techniques for facilitating the development of such a vibrant partner community for a cloud computing infrastructure. Through PES, an operator of a cloud computing infrastructure (e.g., a cloud service provider (CSP)) can build a vibrant partner community that attracts customers and workloads. PES may be used to grow the portfolio of managed applications that may be offered, and provides various efficiencies through standardization and automation in aspects such as managed services. Through PES, potentially complex tasks such as customer onboarding may be offloaded to partners. PES may also generate revenue via partner certification and PES stock keeping units (SKUs). PES may further enable reselling of partner services, allowing a CSP to become a service broker (e.g., on behalf of partners), and enabling the provisioning of new services in collaboration between the CSP and its partners.

PES enables a CSP to build an ecosystem for mission critical workloads in an enterprise cloud, with partner-managed services and Software-as-a-Service (SaaS) capabilities. The CSP operating or providing PES is referred to herein as the PES Platform Provider (PPP). PES-certified partners are enabled to provide managed services and SaaS offerings in a more streamlined and highly automated manner for customers running on a PPP's cloud. For example, various embodiments are described herein with respect to implementing PES on the Virtustream Enterprise Cloud (VEC), with Virtustream acting as the PPP. It should be appreciated, however, that other CSPs may implement PES in other embodiments. PES provides support for partner-owned software solutions, with which partners provide added services to their clients or customers. With PES, partners will be able to focus on their managed services and SaaS solutions without being distracted by access, deployment or control issues. Clients or customers benefit from PES, as the services provided by PES-certified partners may improve delivery times, quality, etc.

Further, PES is designed to provide support for multi-cloud, including support for cloud environments outside that of the CSP operating PES (e.g., outside of the PPP's cloud or clouds). For example, PES operated by Virtustream on VEC may provide support for other cloud environments such as SAP Cloud Platform, Microsoft Azure, Google Cloud Platform (GCP), Amazon Web Services (AWS), etc. Thus, PES provides a solution for true multi-cloud service automation. For PES-certified partners, the delivery of managed services for multi-cloud applications will become much more efficient.

Via PES, the PPP provides increased flexibility for clients or consumers to consume managed services for complex multi-cloud applications. Depending on the customer requirements, partner offerings and the to-be-managed applications, different partners provide services for different parts of the overall stack.

Figure 3:
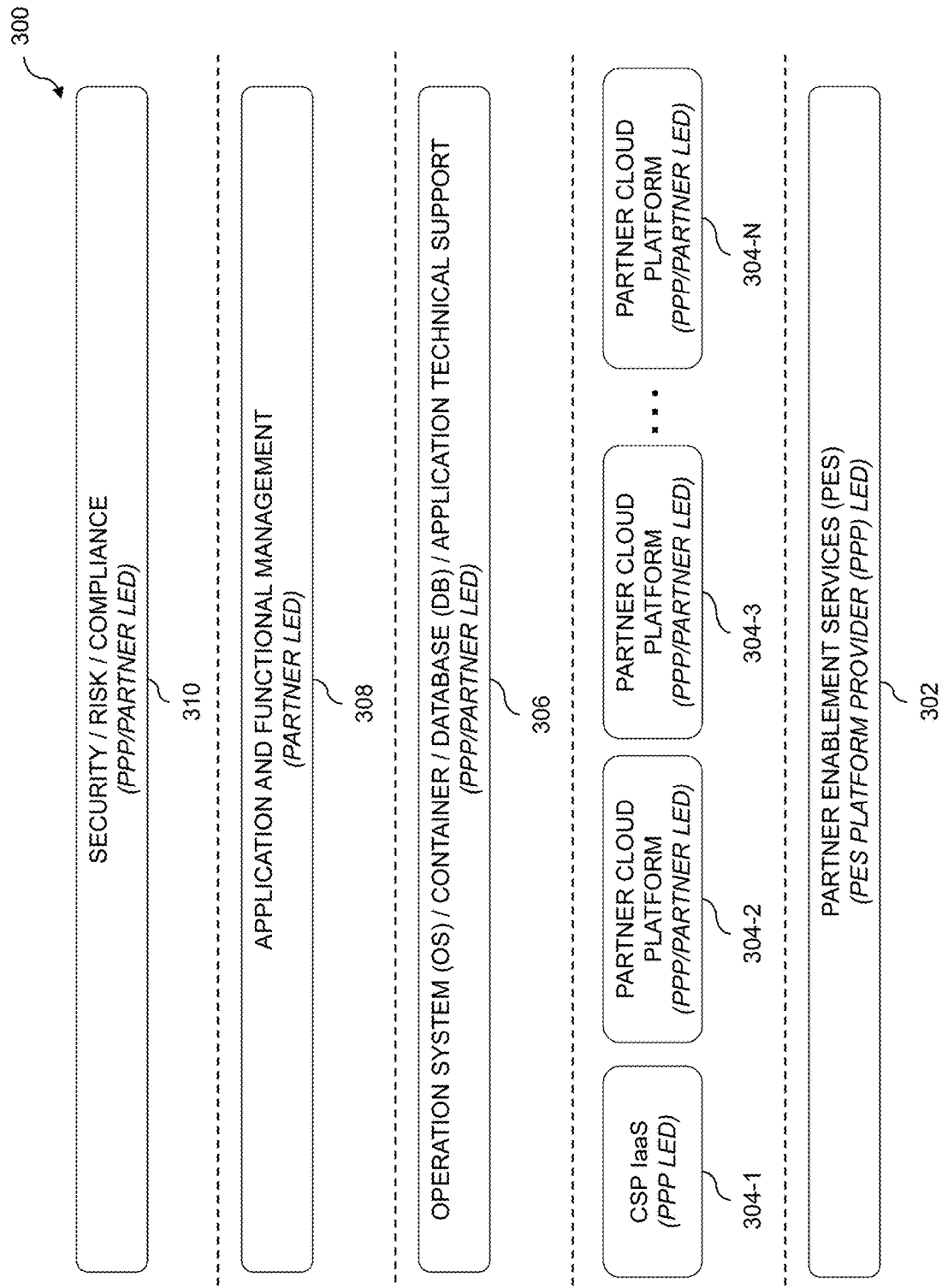
FIG. 3 illustrates a partner enablement services governance model in an illustrative embodiment.

FIG. 3 shows a PES governance model 300 for multi-cloud partner enablement. The PES governance model 300 defines the relationships between the parties who participate in PES, and the governance for PES-related environments and artifacts in some embodiments. In particular, FIG. 3 shows the PES governance model 300 in a managed services case, where the PPP leads or operates PES 302. At the next level are various cloud platforms, such as an Infrastructure-as-a-Service (IaaS) platform 304-1 operated by the PPP, and one or more partner cloud platforms 304-2 through 304-N. As noted in FIG. 3, the PPP IaaS platform 304-1 is led by the PPP providing PES 302. The partner cloud platforms 304-2 through 304-N may be partner led, using SKUs provided by the PPP (and are thus denoted in FIG. 3 as "PPP/partner led"). Examples of the partner cloud platforms 304-2 through 304-N include, but are not limited to, SAP Cloud Platform, Azure XaaS, AWS XaaS, GCP XaaS, etc.

The next level of the PES governance model includes operating system (OS), container, database (DB) and application support 306, which again may be PPP/partner led. The layer 306 may also include additional functionality which may be specific to one or more of the partner cloud platforms 304-2 through 304-N, such as SAP Basis support for an SAP Cloud Platform. Application and functional management 308 is partner led, and security, risk and compliance services 310 may be PPP led, partner led, or PPP/partner led.

PES features, in some embodiments, are delivered as capabilities with independent life cycles and continuous delivery of updates. PES capabilities may be introduced over time. PES capabilities include, but are not limited to, providing easy and secure access to CEs, a customer inventory manager (e.g., a multi-tenant, multi-cloud configuration management database (CMDB) for partners), customer asset health monitoring, tools for deployment of workloads and partner solutions, etc.

In some embodiments, PES is provided through multiple integrated micro-services and securely connected environments which interact according to the PES governance model 300. The micro-services may run as containers or VMs on the PSCP, such as on the Virtustream Enterprise Container Platform (ECP) as managed Kubernetes (K8S) clusters, etc.

PES makes use of what is referred to as "partner zones" (PZs) and "customer service enclaves" (CSEs). Each PES-certified partner is assigned to a PZ that is used to host PCS along with PAS. Via the PZ, the certified partners can deliver services more efficiently and securely. The CSE hosts TAS. Both PAS and TAS belong to a PES control plane described in further detail below. The PPP ensures that only eligible partners have secure routes from the PZs to the CSEs.

Partners such as Independent Software Vendors (ISVs) or System Integrators (SIs) bring more customers and workloads to the PPP. Further, with more types of workloads and applications being on-boarded onto the PPP, the PPP can provide related services for such new workloads on top of the PPP's IaaS. Hence, specialized SIs enter the big picture in order to provide a complete solution.

While the promise of mission-critical capabilities can attract customers to the PPP, the overarching complexity and usability constraints can be challenging, including for managed service organizations such as Application Management Services (AMS), Infrastructure Management Services (IMS), Security Operations (SecOps), etc. A major root cause of this adverse effect is the lack of standardization for tenant management. For example, in conventional arrangements there may be no standardized way to access tenant networks or CEs, or to assess the health of tenant applications. This includes the lack of a standardized, automated procedure for application configuration management as well.

In some embodiments, PES provides functionality for overcoming these and other challenges. Anyone that wants to provide managed services on top of a CSP's cloud needs a seamless and standardized way to access, utilize, and enhance the cloud with less support burden for the CSP. IMS, AMS and SecOps teams, for example, may be treated as primary partners of a PPP, and are great beneficiaries of the functionality provided via PES.

PES provides further advantages in the multi-cloud world, which bears more complex software architectures than have ever had to be managed before. Partners who can certify for a solution that embraces such complexity will thus have a competitive advantage. Any cloud provider who can provide a multi-cloud partner enabling tenant management solution will have a definite competitive advantage.

PES also provides opportunities for decreasing costs, increasing revenue along with greater market expansion.

PES enables a vibrant, efficient, and innovative partner community attracting more customers and workloads. Hence, the PPP's portfolio of supported applications will continuously grow and become more valuable and attractive for customers. Standardization through PES caters to automation, and automation advantageously lowers support costs. As a by-product, the PPP's own managed services organizations (e.g., IMS, AMS, SecOps, etc.) become more cost efficient. PES further enables offloading work that may be considered too complex for customer self-service (e.g., customer onboarding) to the certified partners of the PES framework or system. PZs generate revenue, such as via a certification process, PES IaaS consumption, chargeable PES SKUs, etc. The PPP may also be able to resell partner services, thus becoming a service broker for customers. PES also facilitates the PPP and its partners to co-innovate on new multi-cloud services for mission-critical solutions.

PES enables a CSP to provide solutions running on top of any IaaS layer in an enterprise-grade manner. PES enables the PPP to do so without requiring mastery of even a fraction of the software solutions available (e.g., via SaaS provided by various CSPs), which may be provided at least in part by the partners of the PES system. The PPP will be perceived by customers as the platform for managed services. Partners such as SIs will perceive the PPP as the primary platform on which not only multi-cloud managed services can be seamlessly delivered to enterprises, but also the platform on which SaaS solutions can be safely hosted and managed. The PPP will thus be recognized as the (multi-)cloud provider who understands managed IT services for enterprises.

Figure 4:
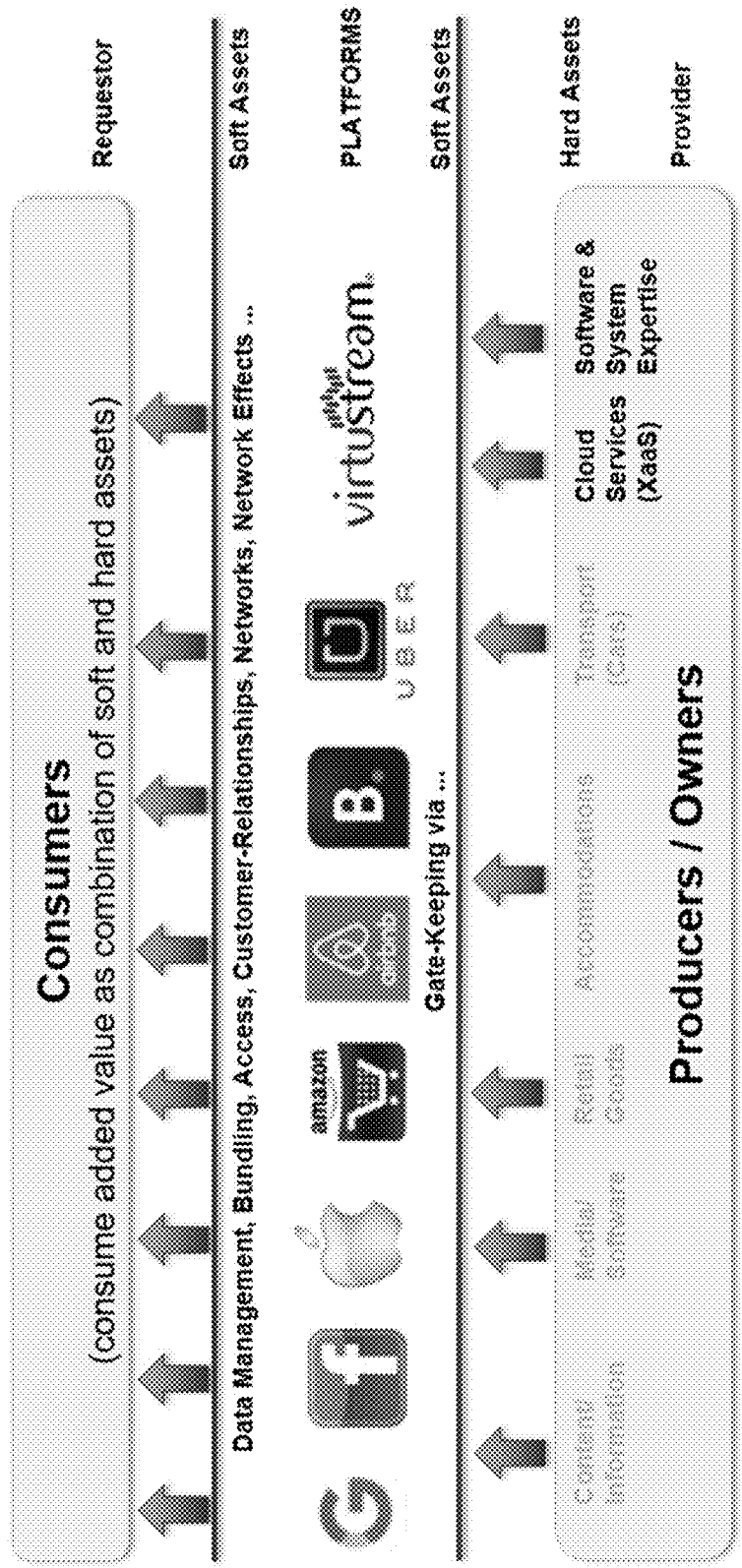
FIG. 4 is a block diagram illustrating platforms supporting relationships between producers and consumers in an illustrative embodiment.

FIG. 4 illustrates the relationship between producers and owners of "hard" assets, such as content and information, media and software, retail goods, accommodations, transportation (cars), etc. and the consumers or requestors of such assets. As illustrated, various "soft" asset platforms may be viewed as providing gate-keeping (e.g., data management, bundling, access, customer relationships, networks, network effects, etc.) to such hard assets. As shown in FIG. 4, the soft asset platforms may include: for content and information, Google and Facebook; for media and software, Apple; for retail goods, Amazon, for accommodations, Airbnb and Booking.com, for car transportation, Uber. PES enables a PPP such as Virtustream to provide the soft asset platform for consumers to access cloud services (e.g., XaaS) and software and system expertise.

The number of PES-certified partners providing services on top of the PES platform is a key performance indicator (KPI). The PPP and the partners may advantageously drive the evolution of managed services from a practice-oriented stage to a predictive stage powered by a service enablement system that fully implements the observe-orient-decide-act (OODA) loop.

As noted above, PES capabilities include partner activation by the customer, which allows easy adoption of PES by PPP customers. Customers can activate and deactivate PES as desired for their environments, as well as activating and deactivating partner access. This capability ensures clear security boundaries between the partner, customer and the PPP environments. PES also provides efficient, robust, secure and auditable access to partner environments hosting SaaS solutions, as well as to environments of customers for which the partner provides managed services. PES may also be used to provide a customer inventory manager for partners through a multi-tenant, multi-cloud CMDB containing all assets of all customers for which the partner provides services. PES may also be used to provide a customer asset health manager for partners through a multi-tenant, multi-cloud health monitoring solution for workloads of all customers for which the partner provides services. PES also enables easy deployment for partners through a tool chain allowing the partners to develop new software solutions for customers in a highly automated and standardized way. PES may be further utilized to provide capabilities such as partner easy billing, a customer migration manager for partners, a customer compliance manager for partners, a partner service broker, a multi-cloud application manager for partners, a multi-cloud service integrator for partners, etc.

Access to the PES-MN that hosts central services is controlled by the PPP (e.g., the security team of Virtustream or another PPP). Once a partner is certified, PZs are created, and maintained and supported by the PPP's PES team in accordance with PES SKUs. PES provides tools by which customers can enable and disable access of PES partners to the CEs. CSEs for customers will utilize and incur IaaS costs from the PPP. The same CE may consume services from multiple PES-certified partners, with the partners' respective rights and responsibilities regarding customer assets being regulated through agreement between the customers and partners. Such rights and responsibilities should be in accordance with the PES governance model 300 described above in some embodiments. It should be appreciated that customers of the PPP are not limited to using PES-certified partners for managed services, though managed services provided by non-PES-certified partners would have access be organized by the customer, with manually installed tools, etc.

PZs also consume IaaS services of the PPP, as well as additional services as per PES SKUs. In some embodiments, a PES partner will have only one associated PZ. In other embodiments, however, a PES partner may be assigned multiple PZs, where different PZs may be associated with or belong to different, organizationally separated business units of that partner. A PES partner may also be assigned multiple PZs for compliance reasons (e.g., to comply with the European Union (EU) General Data Protection Regulation (GDPR)).

As noted above, a customer's assets may utilize services provided by multiple PES partners. Conflicts between overlapping or contentious actions by such multiple partners on the customer assets may be handled as agreed upon between the customer and the involved partners.

TABLE 1 in the Appendix shows examples of various actors in a PES system, as well as their associated functions within the PES system and their affiliation (e.g., with one or more of the PPP, a partner and a customer).

In the context of various use cases described below, the PES framework may include or utilize systems such as: a Partner Directory (e.g., a Virtustream Partner Directory (VPD)), which acts as the single source of truth for organizations, users, groups and related authorizations of all participants of the PES including the PPP; a PES Portal that exposes self-service functions for customers and partners; a PES Central Log and Audit System that contains all log entries from all PES services, excluding PCSs, which may be used to audit access records; a PES Management System that is used to manage the PES framework and capabilities; a PES Network Control System that manages the routes and firewalls between CEs, CSEs, PZs and PES-MN as well as the Software Defined Perimeter (SDP) controlled access from partner networks to PZs; a PES Repository that hosts the artifacts for PES such as container images; and a PPP (e.g., VEC) IaaS that provides an IaaS management system (e.g., using xStream).

TABLE 2 in the Appendix illustrates PES-related relationships and responsibilities between the PPP and a customer, between the PPP and a partner, and between a partner and a customer.

TABLE 3 in the Appendix illustrates PES service types and associated governance, including for PES service types such as the TAS, PAS, PFS and PCS. It should be appreciated, however, that PES service types are not limited to TAS, PAS, PFS and PCS, and that various other PES service types may be used in some embodiments.

TABLE 4 in the Appendix illustrates PES-related environments and their associated governance, including the CE, CSE, PZ and PES-MN. Again, it should be appreciated that various other PES-related environments may be used in some embodiments.

Figure 5:
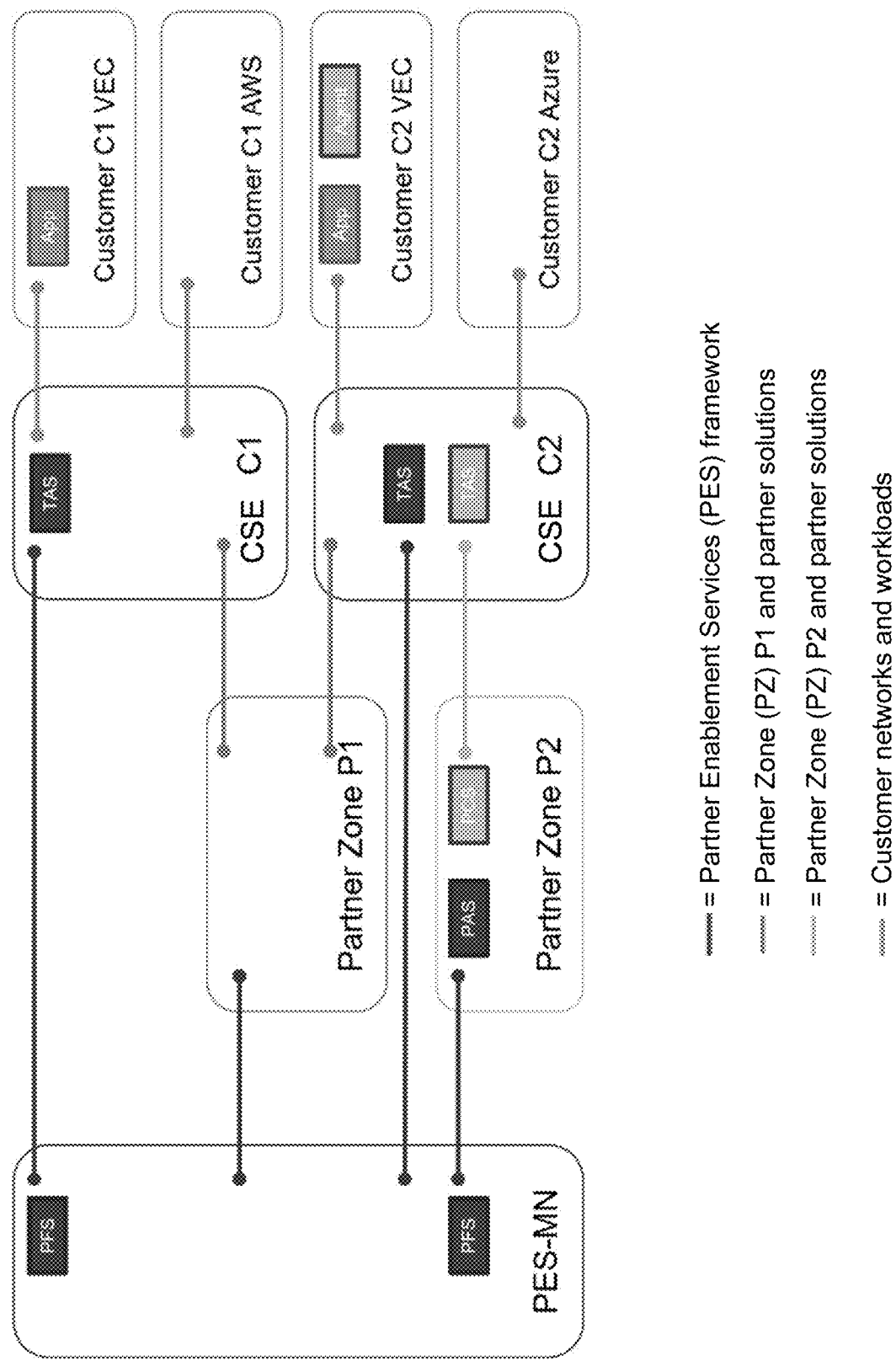
FIG. 5 shows an example of a partner enablement services environment in an illustrative embodiment.

FIG. 5 illustrates an arrangement of PES environments and associated micro-services. As shown in FIG. 5, different shadings of lines are used to denote links between the different environments which will be described in further detail below. In the FIG. 5 example, there are two partners P1 and P2 with associated PZs, and two customers C1 and C2 with associated CSEs. The customer C1 has CEs operating on VEC and AWS clouds, while the customer C2 has CEs operating on VEC and Azure clouds. Partner P1 has access to the CSEs for C1 and C2 while partner P2 has access to the CSE for C2 only, as illustrated by the links therebetween. PES links are established between the PES-MN and the PZs for P1 and P2 as well as the CSEs for C1 and C2 as illustrated. The PES-MN implements PFS micro-services for the CSE C1 and PZ P2. The PZ P2 also implements PCS micro-service for C2's CSE. Each of the CSEs implements TAS micro-services for the PES-MN, and the CSE for C2 also implements TAS micro-services for P2's PZ as illustrated. C1 and C2 implement respective applications on the VEC, and C2 also implements an agent on the VEC.

In some embodiments, the governance model of the PPP may stipulate various security rules that need to be considered by the PES architecture. Examples of such security rules which may be used in some embodiments will now be described. Consider that VEC is the PPP. In such a case, the PES-MN should be distinct from the VEC Management Zone (MZ) and there should be no connection between these networks. Further, there should be no direct network connection between the PES-MN and the CEs. As shown in FIG. 5, for example, the PES-MN connects to the CSEs for customers C1 and C2 rather than to the CEs themselves. There should also be no direct connection between the PZs and the CEs. Any communication from CEs to PZs will go through the Internet, or through the CSEs as illustrated in FIG. 5. Such communication should further be initiated from the CEs. Different PZs should not have any direct connection, unless multiple PZs belong to a same partner and that partner requests such a connection. No services running in the PES-MN should be exposed to the Internet. The PZs and CSEs should also have a standardized set of Internet Protocol (IP) address ranges that do not overlap with the IP address range of the PES-MN.

Figure 6:
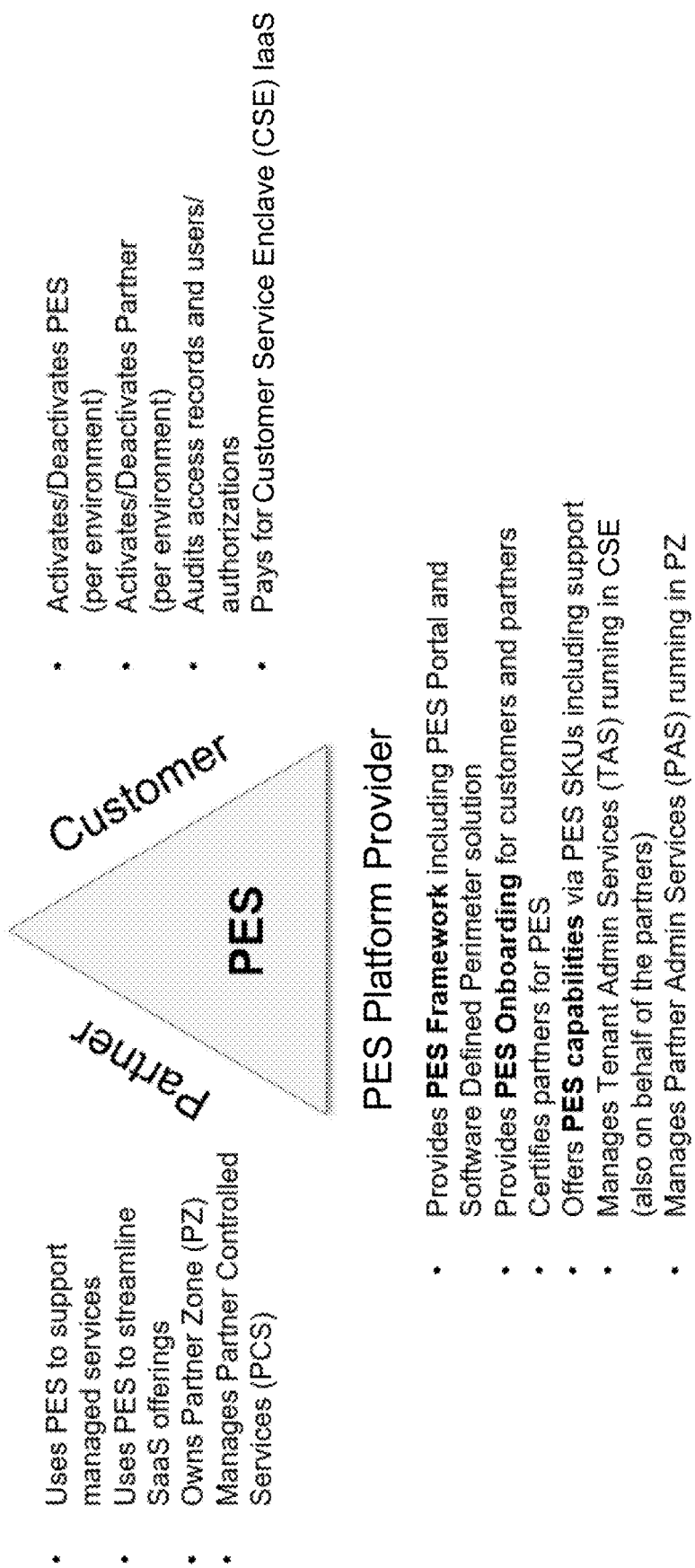
FIG. 6 shows a partner enablement services governance model in an illustrative embodiment.

FIG. 6 shows an example of a PES governance model, focusing on the responsibilities of the partner, customer and PPP. The PPP provides the PES framework, including a PES Portal and a Software Defined Perimeter solution. The PPP also provides PES onboarding for customers and partners, certifies partners for PES, and offers PES capabilities including support services via PES SKUs. The PPP in some embodiments also manages TAS running in the CSEs and PAS running in PZs. The partner uses PES to support managed services and to streamline SaaS offerings. The partner owns a PZ, and manages PCSs. The customer activates and deactivates PES for each of its CEs, and also activates and deactivates partners for each of its CEs. The customer audits access records, users and authorizations. The customer also pays the PPP for the CSE IaaS services.

Figure 7:
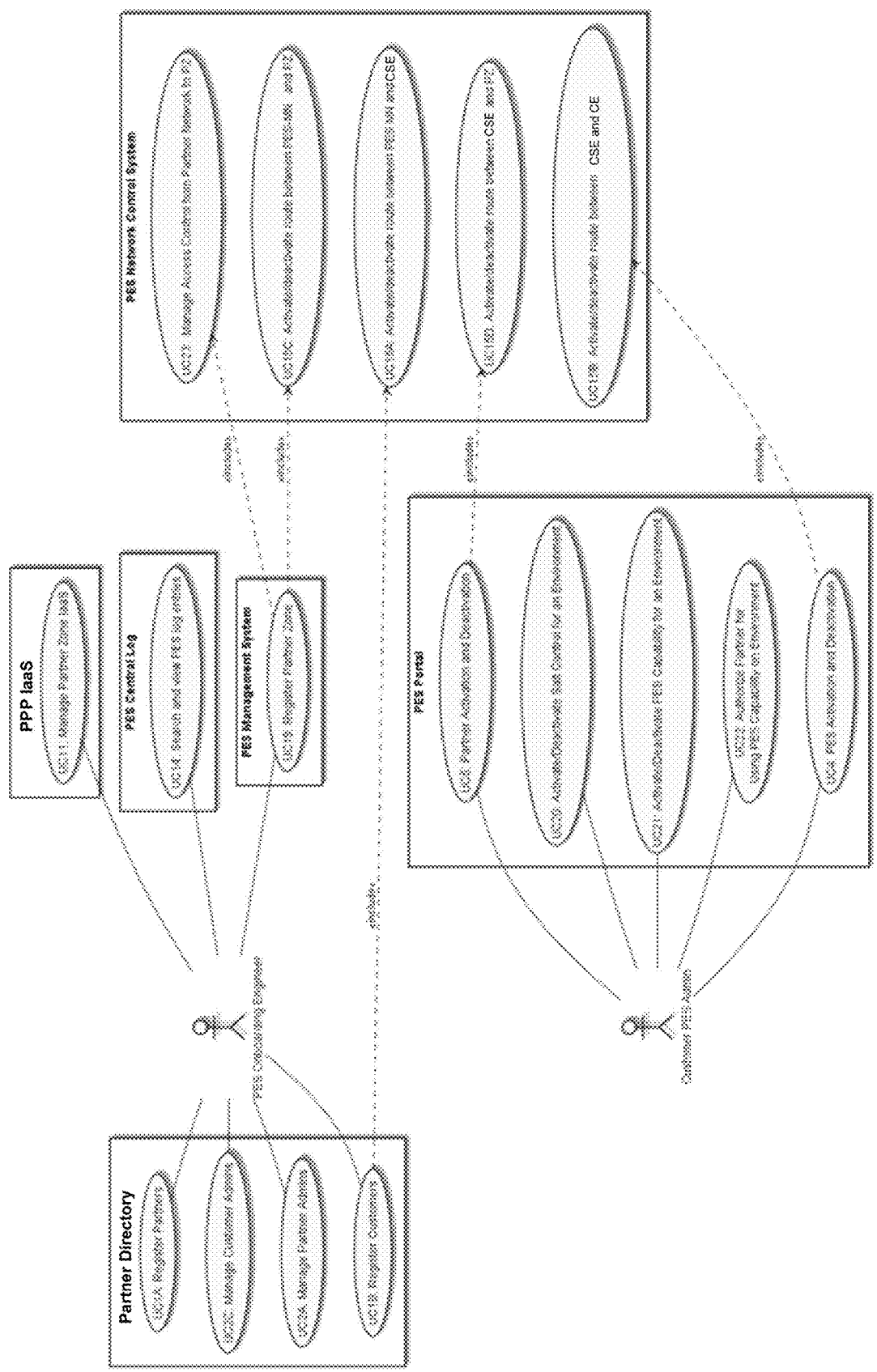
FIG. 7 shows a set of use cases for onboarding and activation of services in a partner enablement services framework in an illustrative embodiment.
Figure 8:
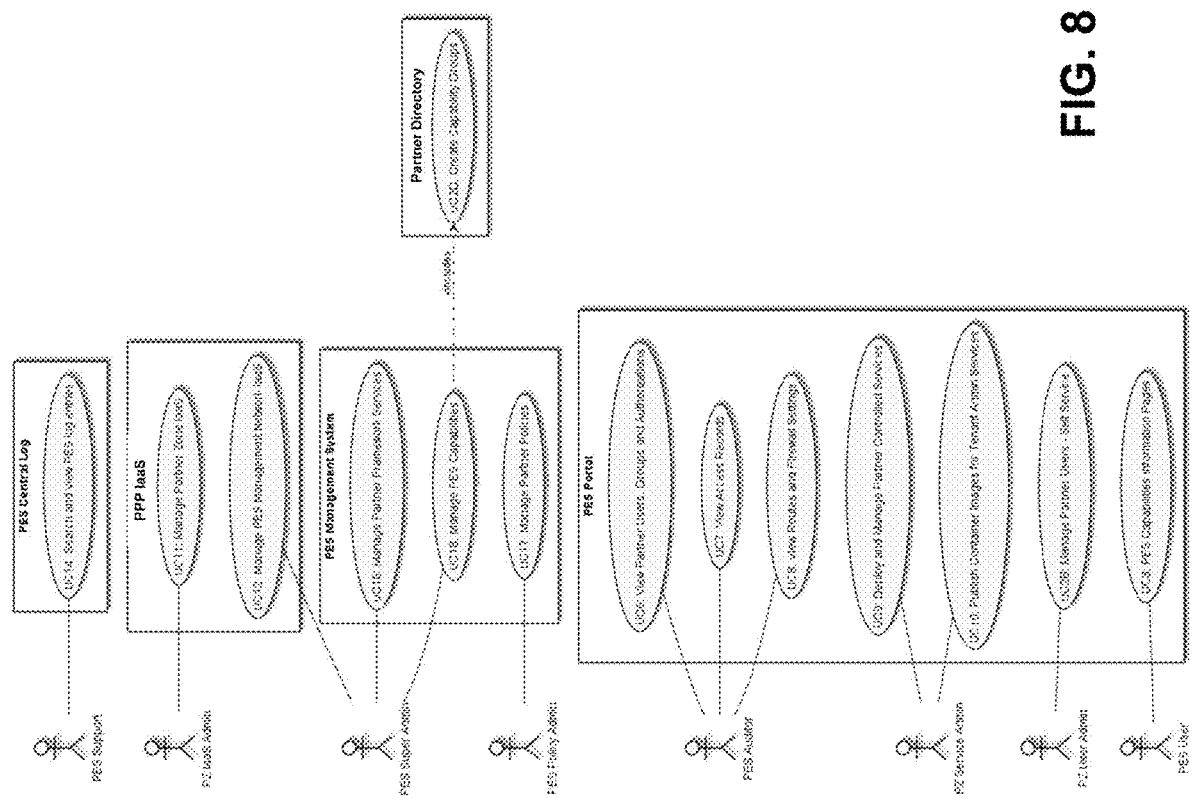
FIG. 8 shows a set of use cases for ongoing management in a partner enablement services framework in an illustrative embodiment.

FIG. 7 shows a set of use cases for onboarding and activation of services in the PES framework, and FIG. 8 shows a set of use cases for ongoing management in the PES framework. The various use cases involve one or more PES framework components including a Partner Directory (e.g., a VPD), the PPP IaaS (e.g., VEC IaaS), PES Central Log, PES Management System, PES Network Control System and PES Portal. The various use cases may also involve actors or administrators of the PES framework, which may be at least partially automated entities, including PES Onboarding Engineer, Customer PES Admin, PES Support, PZ IaaS Admin, PES Super Admin, PES Policy Admin, PES Auditor, PZ Service Admin, PZ User Admin and PES User. Additional details regarding the various use cases shown in FIGS. 7 and 8 will be described in further detail below.

Figure 9:
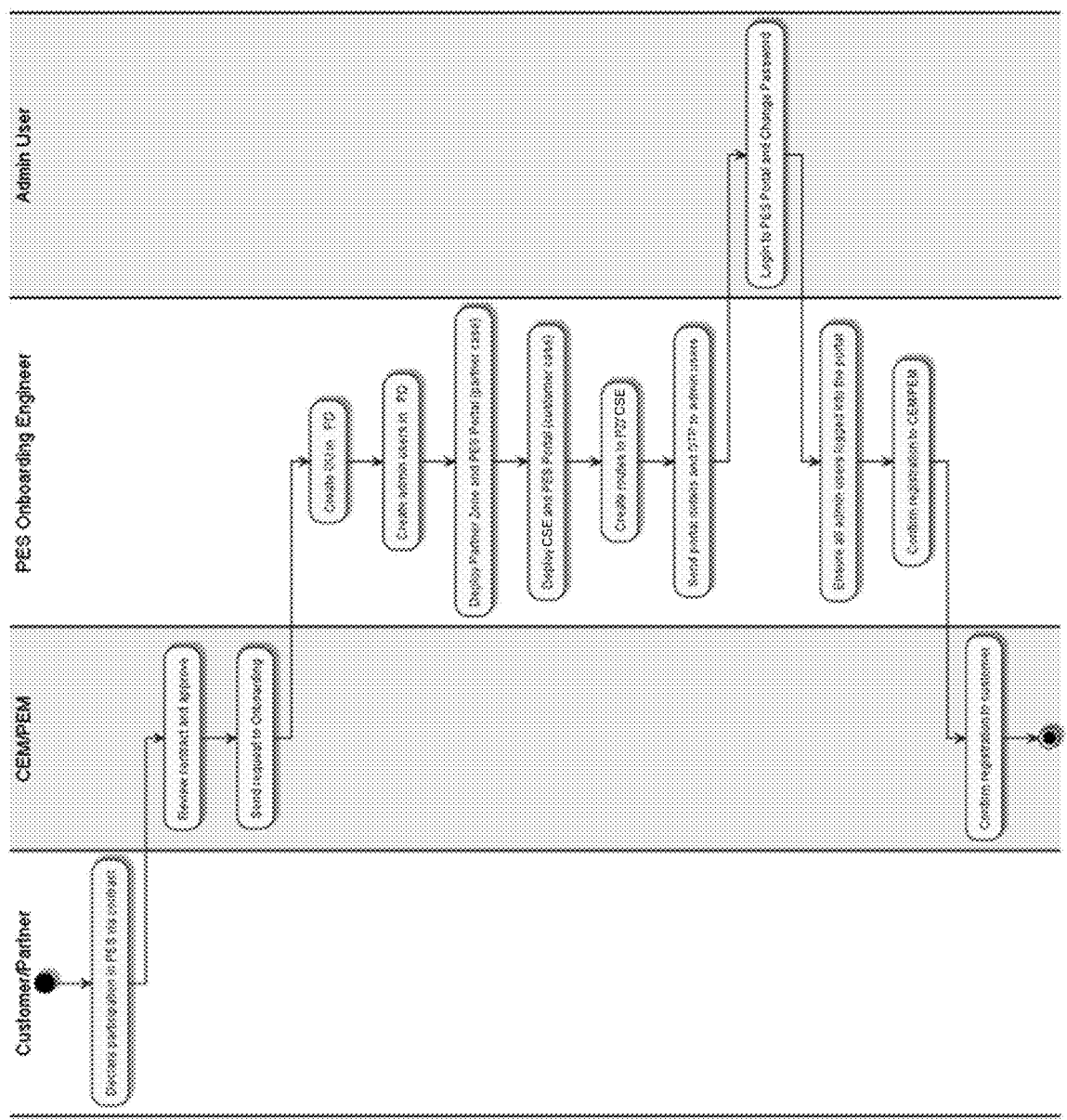
FIG. 9 shows a workflow for partner and customer registration in a partner enablement services framework in an illustrative embodiment.

FIG. 9 shows a workflow for partner and customer registration in the PES framework (e.g., UC1A for registering partners, UC1B for registering customers, UC2A for managing Customer Admins and UC2C for managing Partner Admins). Registration of partners and customers in the Partner Directory (e.g., the VPD) is not a self-service process in some embodiments, but is instead a managed process based on contracts signed by partners and customers, respectively. Partners and customers declare the corresponding persons, users or accounts for whom they want administrative rights. Only limited personnel of the PPP, including the PES Onboarding Engineers and PES Super Admin, have write access to the Partner Directory in some embodiments.

The workflows for registration of partners and customers are similar. The differences are:

1. The process is triggered and ended by the customer engagement manager (CEM) for customers and partner engagement manager (PEM) for partners.

2. For partners there will be a differentiation of administrative roles (PZ IaaS versus Service versus User Admin). IaaS admins will also receive user accounts for the PZ in xStream in some embodiments.

3. For customers the Onboarding Engineer will deploy a CSE and create the route from the CSE to the PES-MN. A PES Portal container will also be deployed into the CSE and a route from one CE to the CSE will be created so that the customer can securely connect to the PES Portal.

4. For partners the Onboarding Engineer will deploy a PZ and create the route from the PZ to the PES-MN. A PES Portal container will also be deployed into the PZ so that the partner can securely connect to the PES Portal.

Changes of administrative users, in some embodiments, must be declared by the customer or partner in writing or some other agreed-upon form. Such changes will be managed by the Onboarding Engineer accordingly.

UC2B includes managing partner users, and is a self-service in some embodiments. Partner user administrators can manage PES users (with the exception of admins) via the PES Portal. To-be-managed users first need to be registered. PES users will be assigned to groups and capabilities. Group assignments entail authorization for general PES Framework functions, such as PZ access. Capability authorizations entail permissions for selected CEs. Note that, in some embodiments, PES users can only be authorized for CEs for which the partner is activated (see UC5 for partner activation and deactivation), PES users can only be authorized for PES capabilities that have been published (see UC18 for managing PES capabilities) and for which the customer activated the partner (see UC22 for authorizing a partner for using PES capability in a CE), and that capability groups in the Partner Directory are created by the PES Super Admin (see UC18 for managing PES capabilities).

UC3 includes PES capabilities information pages. The PES Portal will provide information about the released capabilities, such as links to documentation or availability status.

UC4 includes PES activation and deactivation. While customers declare the general participation in PES (e.g., via a contract or agreement between the customer and the PPP), a representative of the customer (e.g., a Customer PES Admin) still needs to activate the PES framework for the customer's CEs. While the CSEs and their routes to the PES-MN are already created during PES Customer Onboarding (see UC1B), activation means the creation of routes from the CSE to the selected CEs. A prerequisite for the activation of a CE is the actual registration of that CE into PES. In some embodiments, CEs in clouds operated by the PPP (e.g., VEC environments for a Virtustream-operated PES framework) are automatically registered. Other CEs (e.g., non-VEC environments) need to be registered via the PES Portal. Deactivation of PES for a CE means the deletion of the route between that CE and the CSE.

UC5 includes partner activation and deactivation. For each PES-activated environment, the Customer PES Admin can use the PES Portal to activate a partner by choosing from a list of on-boarded partners (see UC19 for registering partner zones and CSEs). During activation, the PES Management System will register the associations between the partner OU and the customer's CE. Further, the system will create a route between the PZ for that partner and the CSE for that customer. By deactivating a partner for a CE, the corresponding routes and the registered association are deleted.

It should be noted that a route from a PZ to a CSE does not imply that the partner automatically has access to CEs of the customer. As an additional step the customer needs to authorize a partner for each CE. This will create policies for the PES Network Control System that will allow the partner to access such CEs via the CSE.

UC6 includes viewing partner users, groups and authorizations. The PES portal provides a feature with which PES Auditors can view all current users, group assignments and user authorizations for capabilities (see UC2B for managing partner users). The PPP will see all users, while partners will only see their respective users. Customers will see all users of all partners for which they have at least one activation.

UC7 includes viewing customer access records. With the PES portal, the PES Auditor can retrieve all records that entail access to CEs and PZs, respectively.

UC8 includes viewing routes and allowed ports. With the PES portal, the PES Auditor can review routes between the various environments (e.g., CEs, CSEs, PZs, PES-MN, etc.) and related allowed ports. PPP users will see all routes, while customers will see all routes to their CSEs and partners see all routes to and from their PZs.

UC9 includes deploying and managing PCSs. The PES Portal provides a function with which PZ Service Admins can deploy and manage services onto their Partner Zones.

UC10 includes publishing container images for TASs. With the PES Portal, partners (e.g., via PZ Service Admins) can publish container images to the PPP along with container metadata. The metadata may include descriptions of backend services (e.g., PCS) running in the PZ. The PPP will deploy and run these containers in all CSEs that are active for that partner, and will configure the firewalls such that these services can reach the declared backend services.

UC11 includes managing PZ IaaS. The PZ Admin will manage the infrastructure assets of the PZ (e.g., VMs, etc.) with a portal provided by the PPP. When Virtustream is the PPP, for example, this portal may be the VEC Portal using xStream.

UC12 includes managing PES MZ IaaS. The PES Super Admin will manage the infrastructure assets of the PES MZ (e.g., VMs, etc.) with a portal provided by the PPP. Again, if Virtustream is the PPP, this portal may be the VEC Portal using xStream.

UC13 includes managing CSEs. The PES Management System may automatically create and configure CSEs in the supported clouds using credentials that the Customer PES Admin provides to the system. Note that UC13 may not be needed if there is only one CSE per customer and may instead be provided via UC1A, UC1B, UC2A and UC2C described above.

UC14 includes searching and viewing PES log entries. All PES services (e.g., TAS, PAS, PFS) may write log entries into a central log hosted in the PES-MN. Various users, including PES Support users, can use the central log for root cause analysis (RCA).

UC15 includes activating and deactivating routes between the PES-MN, PZ and CSEs. During partner onboarding and activation, respectively, routes between the environments need to be created dynamically. TABLE 5 in the Appendix defines which routes are created when.

UC16 includes managing PES Containers via the PES Management System. The PES Management System allows the Super Admin to deploy and manage containers providing PFS, PAS, and TAS of all environments. The images of the respective services come from the PES Repository.

UC17 includes managing partner policies. The PFS, PAS, and TAS are policy controlled and will configure themselves in accordance with the entries in the PES Policy Engine.

UC18 includes managing PES capabilities, such as via a Super Admin. The PES Management System allows the Super Admin to activate new PES Capabilities and to deploy and manage all PAS and TAS belonging to these services.

UC19 includes registering PZs and CSEs. After successful onboarding of a partner, a new PZ must be registered in the PES Management System along with all required metadata. After successful onboarding of a customer, a new CSE must be registered in the PES Management System along with all required metadata.

UC20 includes activating and deactivating Configuration Management for CEs. Configuration Management is a central function of PES, and in some embodiments may be Salt-based (e.g., Salt CM). The rollout of a SaltStack or other configuration infrastructure is performed by the PES framework. Higher-level PES capabilities, such as software deployment via PZs, may be built on top of this configuration infrastructure. In some embodiments, as noted above, the configuration infrastructure may include a SaltStack infrastructure which includes:

1. The TSM running in the CSE (e.g., as a POD).
2. Minions running on the tenant VMs.
3. The GIT system for version control of Salt States and Pillars. This will be a central system running in the PES-MN.

In some embodiments, a customer has to explicitly declare the desire to bring the VMs of a specific environment under SaltStack control by virtue of an activation step in the PES Portal. After activation of a selected CE, the TSM is deployed as a POD and the minions are installed on the tenant VMs and connected to the TSM. Further, a GIT repository for that CE is created in the PES-MN GIT system. The firewall is configured such that the TSM can mount that branch remotely.

The SaltStack control can be deactivated by the customer as well. Deactivation will remove the minions from the tenant VMs and delete the TSM, but not the GIT repository for the tenant's Salt States.

Activation of the PES Salt CM for an environment does not yet enable anyone to use the new Salt infrastructure. If a customer wants a partner to take over control of the OS configuration, then the customer needs to activate that partner for Salt CM on the selected environment as well. Activation of a partner will allow the partner to commit Salt states and pillars to the GIT repository of the tenant and to apply them via the PES Portal (see UC21 for activating PES capability for an environment and UC104 for partner deployment).

UC21 includes activating PES capability for environments. Via the PES Portal, the Customer PES Admin can activate and deactivate a PES capability for a selected CE. After activation, all technical prerequisites for that capability with regard to the selected CE will be implemented (e.g., the deployment of the vault-ssh-helper on Linux VMs for tenant VM access via one-time secret).

UC22 includes authorizing a partner for using PES capability on an environment. Via the PES Portal, the Customer PES Admin can grant and revoke authorization for partners to use selected PES capabilities for selected CEs. Prerequisites for UC22 include:

1. PES is activated for the selected environment (e.g., UC4).
2. The partner is activated for the selected environment (e.g., UC5).
3. The capability is published by the PES Super Admin (e.g., UC18).

UC23 includes managing access control from a partner network to a PZ. As part of the PZ registration process, the SDP component of PES will be fed with policies that enable the partner users to access the PZ from the partner networks.

A set of control patterns (CPs) for functionality of the PES control plane will now be described.

Figure 10:
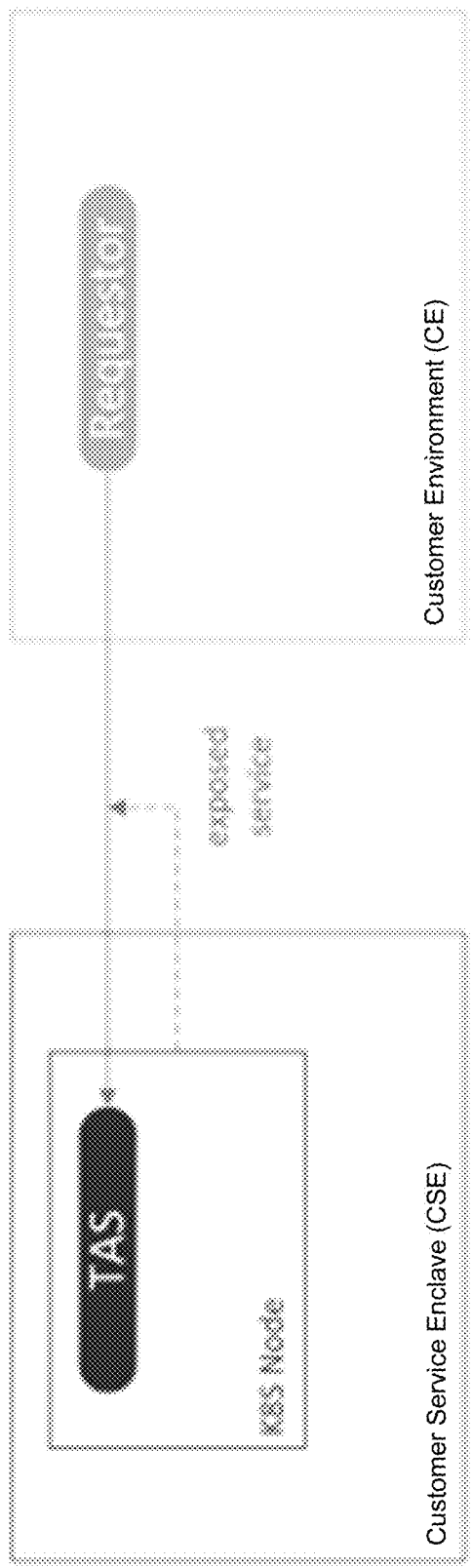
FIG. 10 shows a workflow for a tenant object in a customer environment sending a request to tenant administrative services running in a customer service enclave in an illustrative embodiment.

CP01 includes tenant object requests to the TAS. This control pattern describes a situation in which a piece of software running in the CE (e.g., an OS script or application) needs to request a TAS running in the CSE. The PES framework ensures that the TAS is exposed to the CE. Some examples of CP01 include monitoring proxies and SaltStack minion-to-master communication (here, TAS would be a TSM). FIG. 10 illustrates CP01, including interaction between a TAS running on a K8S node (e.g., a container) in the CSE and a requestor running on the CE.

Figure 11:
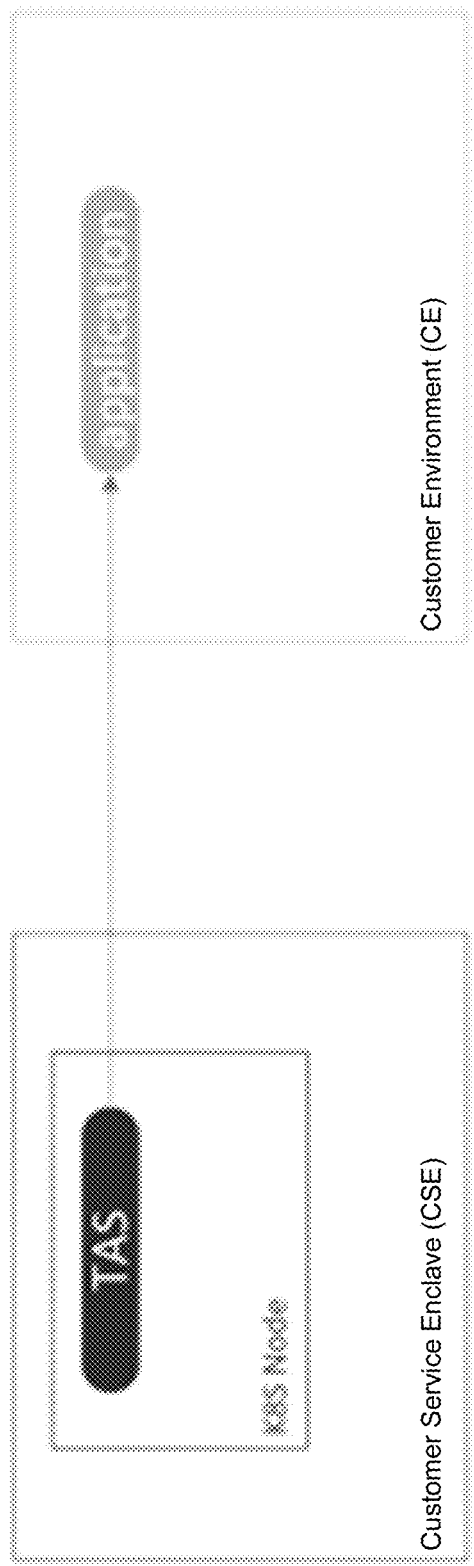
FIG. 11 show a workflow for a tenant administrative service running in a customer service enclave sending a request to an application running in a customer environment in an illustrative embodiment.

CP02 includes the TAS requesting a tenant object. This control pattern considers a scenario in which a TAS requests an application service running in the CE. This service could be exposed on any tenant IP address and any port. This scenario may also be referred to as xStream App Director, where an Orchestration Engine connects to SAP applications. An example of this control pattern is an App Controller querying a tenant DB via Java Database Connectivity (JDBC). FIG. 11 illustrates CP02, including interaction between a TAS running on a K8S node in the CSE and an application running on the CE.

Figure 12:
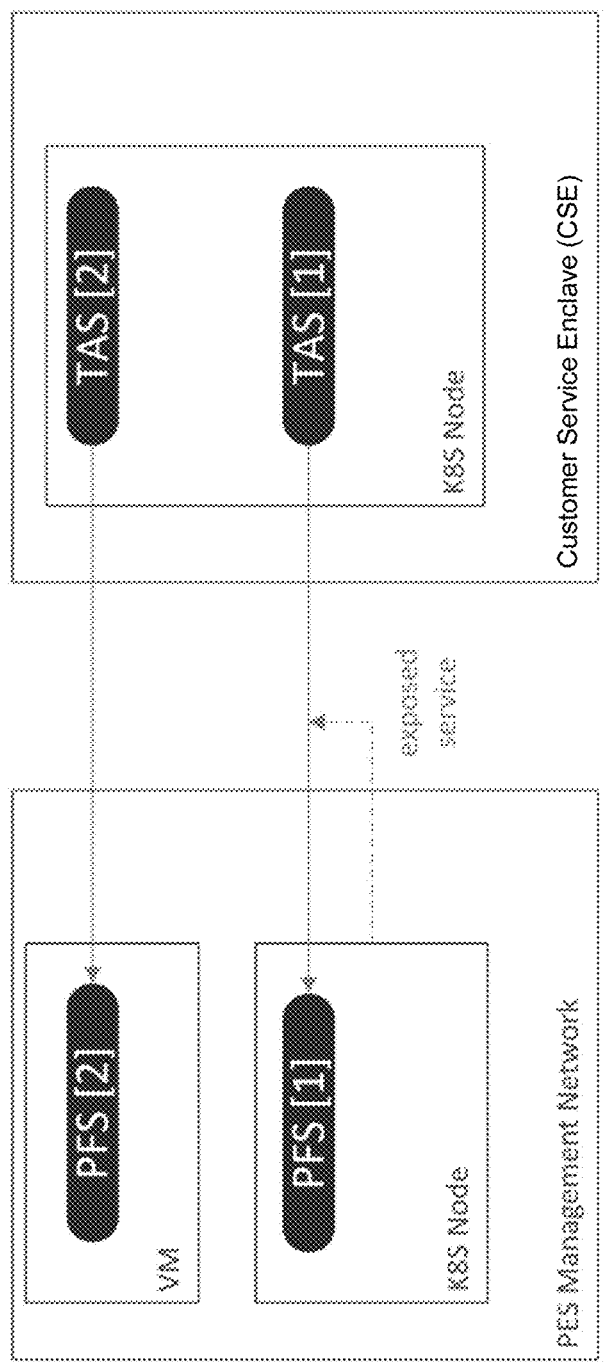
FIG. 12 shows a workflow for a tenant administrative service running in a customer service enclave to request partner framework services running in a partner enablement services management network in an illustrative embodiment.

CP03 includes TAS requesting PFS. This control pattern includes a scenario in which a TAS requests a PFS running in the PES-MN. The PFS can either be a K8S POD exposing a service, or an application running natively on a VM (e.g., the Partner Directory such as the VPD). The communication is initiated from the TAS as illustrated in FIG. 12. Examples of this control pattern include a Lightweight Directory Access Protocol (LDAP) proxy (e.g., TAS) queries to a Partner Directory (e.g., VPD) to expose LDAP information to a CSE, Jump Hosts (e.g., TAS) sending audit data to a PES Audit System, etc.

CP04 includes TAS requesting PES Capability Service. This control pattern is similar to CP03. The difference is that the service running in the PES-MN does not belong to the PES framework but to the PES capabilities, and therefore runs as separate PODs. In some embodiments, all capabilities run as K8S PODs. An example of this control pattern includes an App Controller sending configuration data to a PES CMDB service. Additional details regarding the functionality of the App Controller are described in U.S. patent application Ser. No. 16/054,176, titled "Standardized Microservices for Controlling Components of Distinct Applications in Multi-Tenant Clouds" filed Aug. 3, 2018, the disclosure of which is incorporated by reference herein in its entirety.

Figure 13:
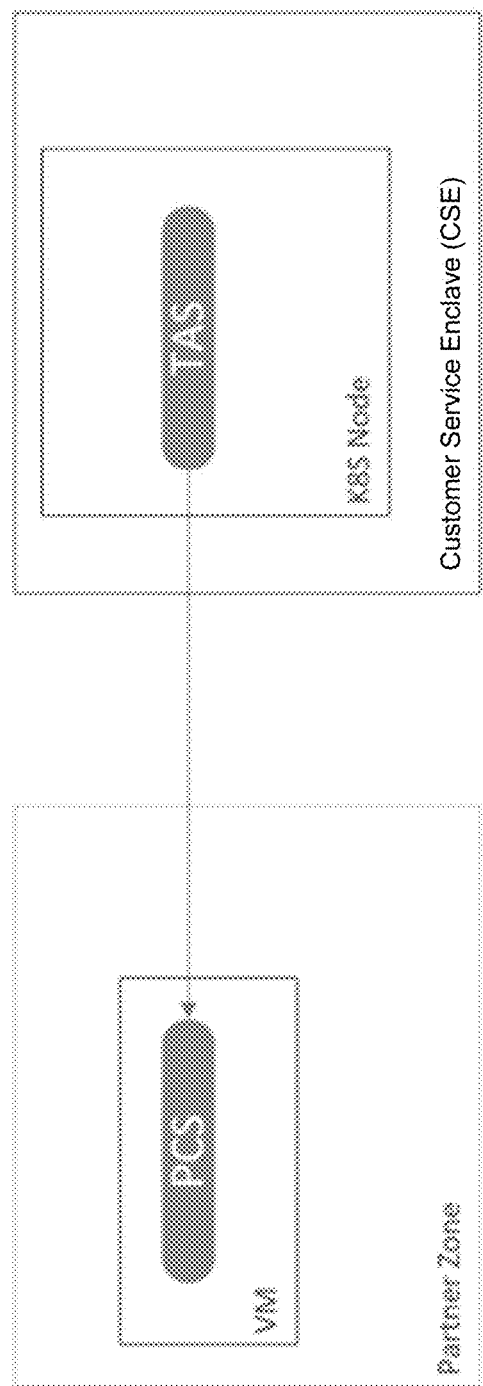
FIG. 13 shows a workflow for a tenant administrative service running in a customer service enclave to request partner controlled services running in a partner zone in an illustrative embodiment.

CP05 includes TAS requesting PCS. In this scenario, the TAS does not request a service of the PES-MN but instead requests a partner-owned service running in a PZ. Unless the partner is using a self-controlled container environment, it is expected that PCSs will run natively on VMs. The communication is initiated from the TAS running in the CSE as illustrated in FIG. 13. An example of this control pattern includes a partner-specific monitoring agent (e.g., TAS) sending data to a monitoring back-end (e.g., PCS).

Figure 14:
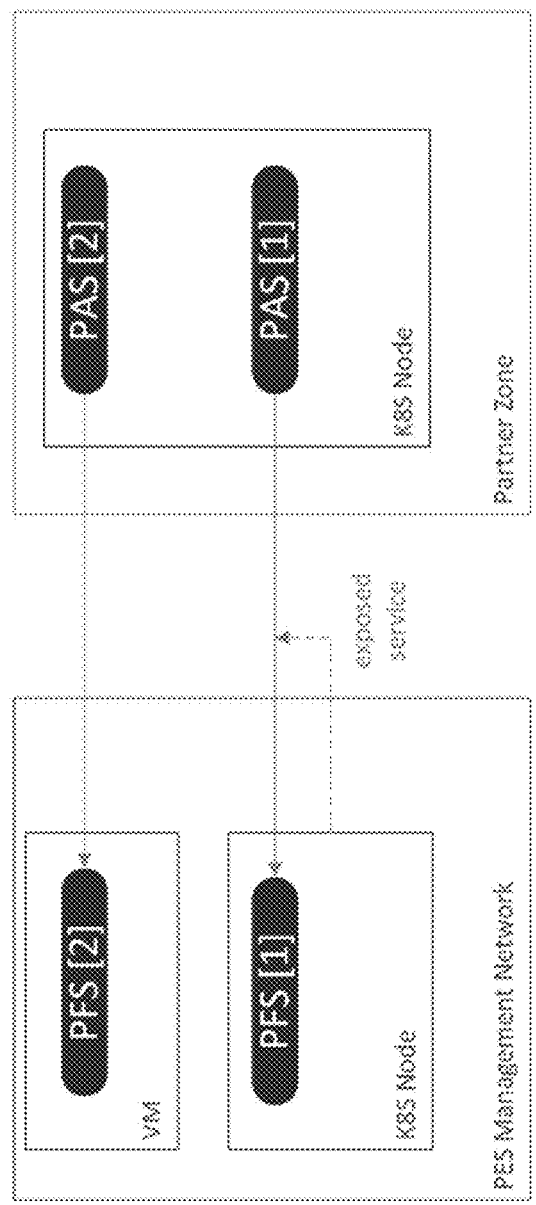
FIG. 14 shows a workflow for a partner administrative service running in a partner zone to request partner enablement services framework or capability services from a partner enablement services management network in an illustrative embodiment.

CP06 includes PAS requesting PFS or PES Capability services. In this scenario, a PAS requests a PFS or PES Capability service. As with CP03, the PFS or PES Capability service may run as a container or natively on a VM. The communication is initiated from the PAS running in the PZ as illustrated in FIG. 14. An example of this control pattern includes an LDAP proxy (e.g., TAS) querying a Partner Directory (e.g., VPD) to expose a partner-specific LDAP tree.

Figure 15:
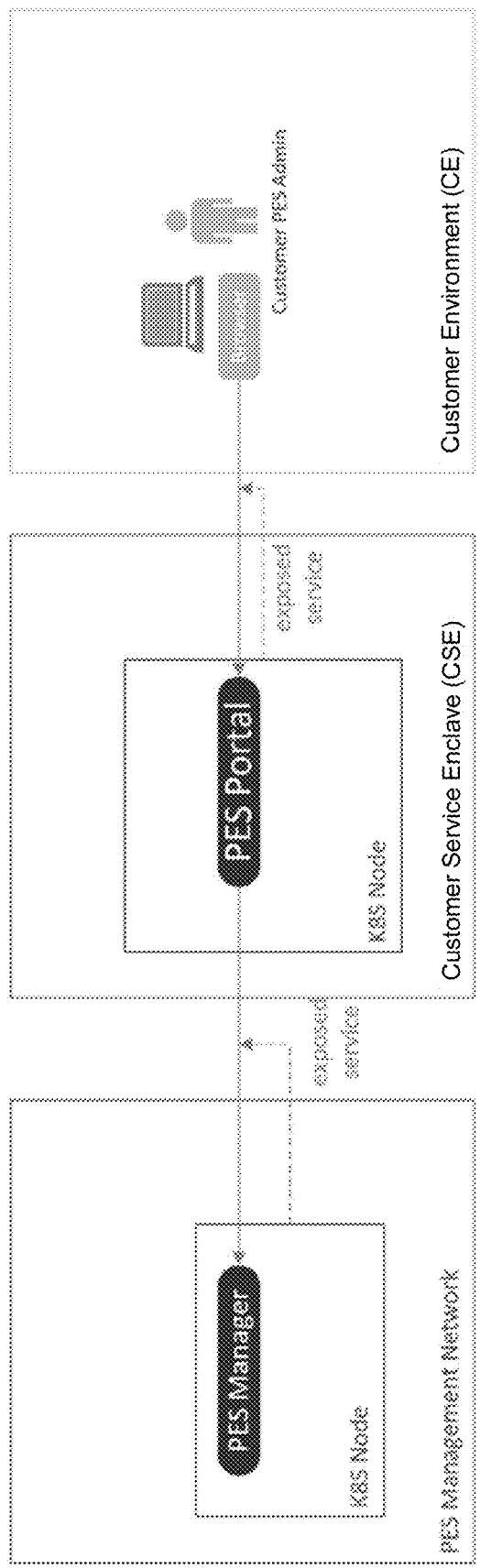
FIG. 15 shows a workflow for accessing a partner enablement services portal running in a customer service enclave in an illustrative embodiment.

CP07 includes customer user requests to the PES portal. In this scenario, a customer user connected to a CE uses a browser to access the PES Portal functionality. In some embodiments, the PES Portal is not accessible via the Internet and can only be accessed via CEs and partner networks which are connected to the PES-MN. As the PES-MN in some embodiments is not directly reachable from the CE, the PES Portal code may be run as a stateless TAS. In other embodiments, the PES Portal code may be provided by exposing application programming interfaces (APIs) in the CSE. This is illustrated in FIG. 15, which shows a Customer PES Admin accessing the PES portal from the CSE.

Figure 16:
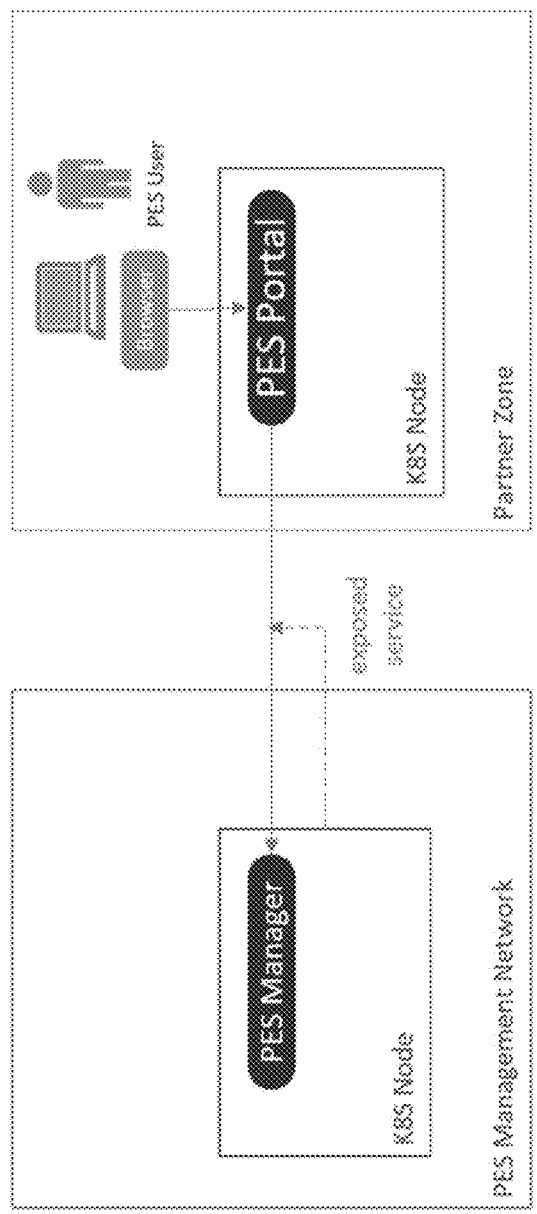
FIG. 16 shows a workflow for accessing a partner enablement service portal running in a partner zone in an illustrative embodiment.

CP08 includes a partner user request to the PES portal. This control pattern, similar to CP07, runs the PES Portal as a PAS in the PZ. Partners are authorized via role-based access control (RBAC). In some embodiments, the PES Portal may alternatively or further be secured via an authentication, authorization and accounting (AAA) micro-service (e.g., OAuth2-based authentication and application services) running as a PAS or PFS. FIG. 16 illustrates a partner user request to the PES Portal.

Figure 17:
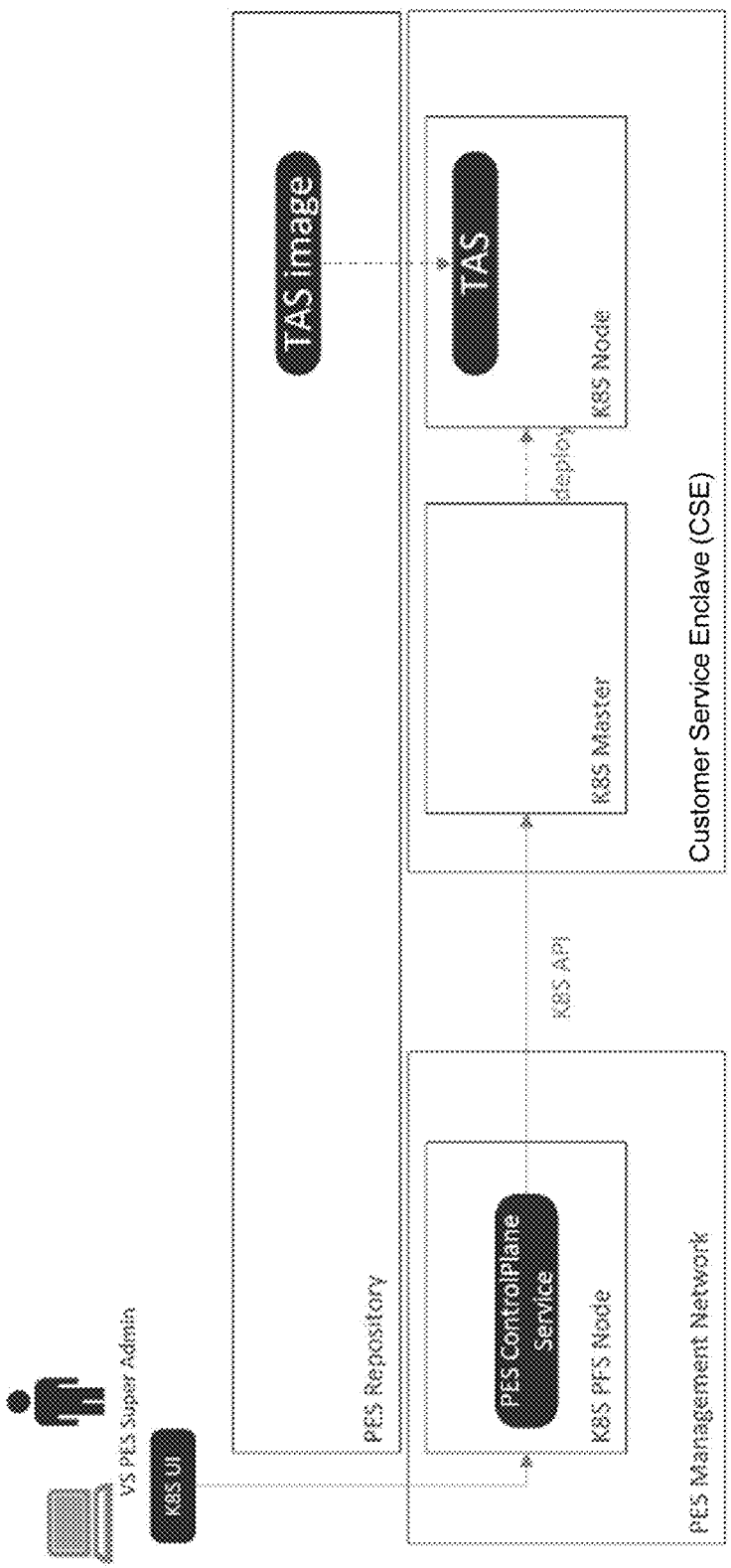
FIG. 17 shows a workflow for deploying a tenant administrative service via a super administrator in an illustrative embodiment.

CP09A and CP09B both include TAS deployment. CP09A deploys TAS via a Super Admin, while CP09B deploys TAS via a PES Capability service. CP09A describes the deployment or upgrade of TAS via the PES-MN. The software for the CSE is stored in the PES Repository to which all CSEs have access. In some embodiments, the PES Repository has functions to control the release of TAS images to selected customers' CSEs. Deployment may be automated in some embodiments by leveraging the K8S API of the CSE Kubernetes cluster. CP09A stipulates a microservice as part of the PES Management System; the PES ControlPlane Service provides functions for the management of PFS, TAS and PAS containers. FIG. 17 illustrates TAS deployment via a Super Admin from the PES repository to the CSE.

The TAS deployment descriptor contains metadata for the source image, the exposed services and the required back-end services to which the TAS is supposed to send data. The firewalls are adapted automatically according to these descriptions. In some embodiments, TAS images may come from partners, and the PPP will run them in the CSEs on the partner's behalf. A managed process is used to validate and check in partner-contributed TAS images to the PES Repository.

Figure 18:
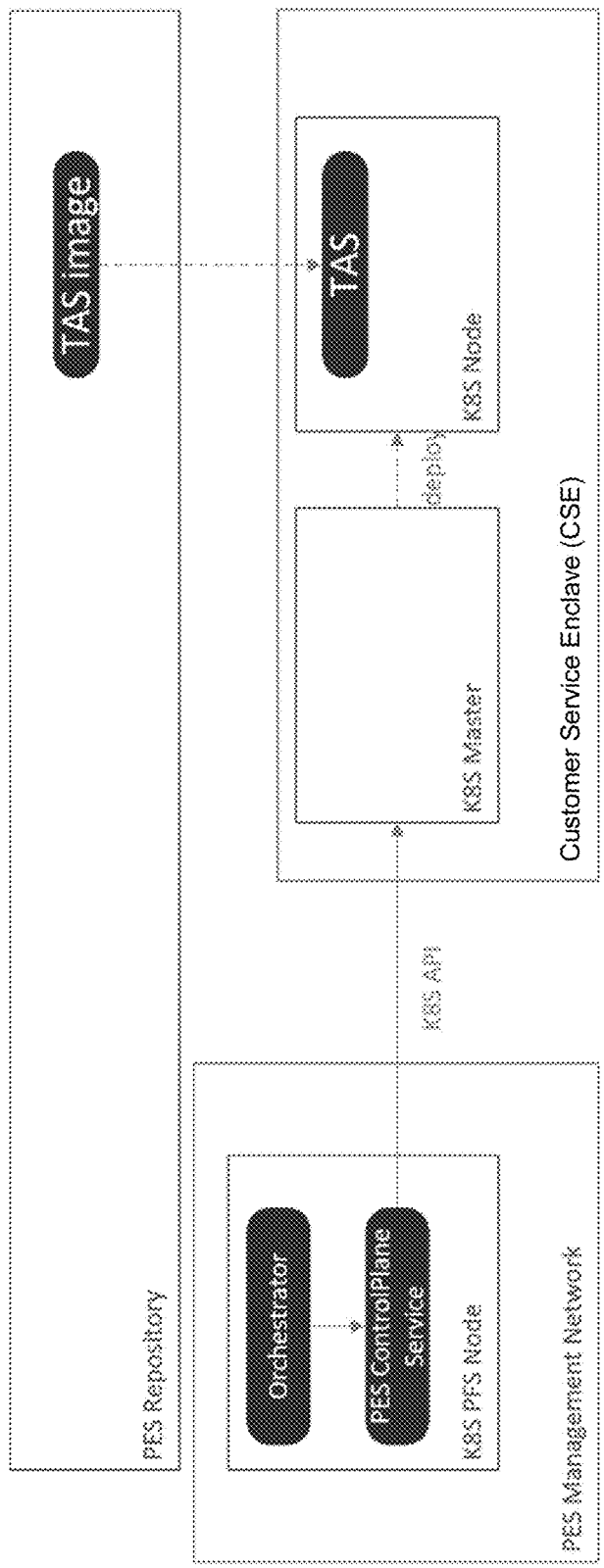
FIG. 18 shows a workflow for deploying a tenant administrative service via a partner enablement services capability service in an illustrative embodiment.

CP09B describes scenarios where one or more TASs have to be deployed or un-deployed automatically to fulfill a particular capability service. An orchestrating service running in the PES-MN uses the PES Management System to request deployment or un-deployment. An example of this control pattern includes a Jump Host Orchestrator deploying Jump Host. FIG. 18 illustrates TAS deployment via a PES Capability service.

Figure 19:
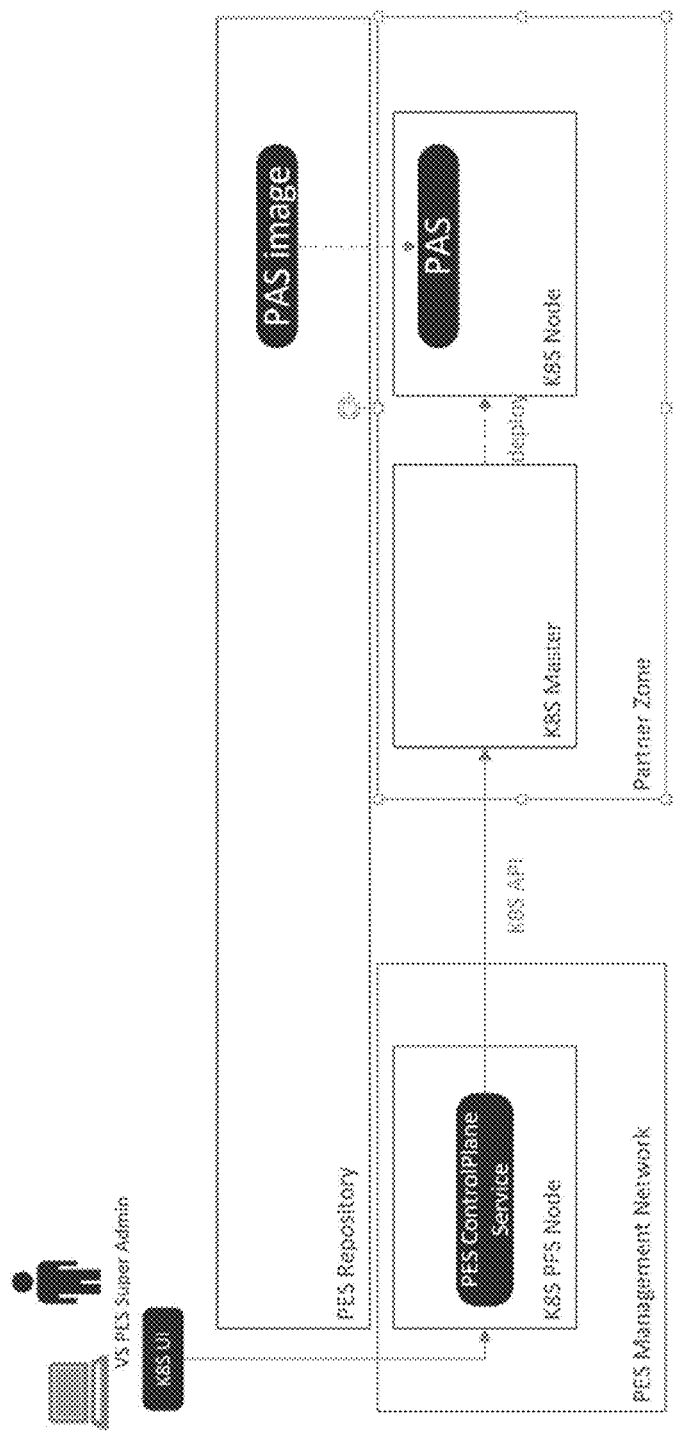
FIG. 19 shows a workflow for deploying a partner administrative service to a partner zone in an illustrative embodiment.

CP10 includes PAS deployment. This control pattern describes the deployment or upgrade of PAS into a PZ via the PES-MN. FIG. 19 illustrates PAS deployment to the PZ. An example of this control pattern includes a PES Super Admin deploying or upgrading an LDAP proxy into the PZ.

Figure 20:
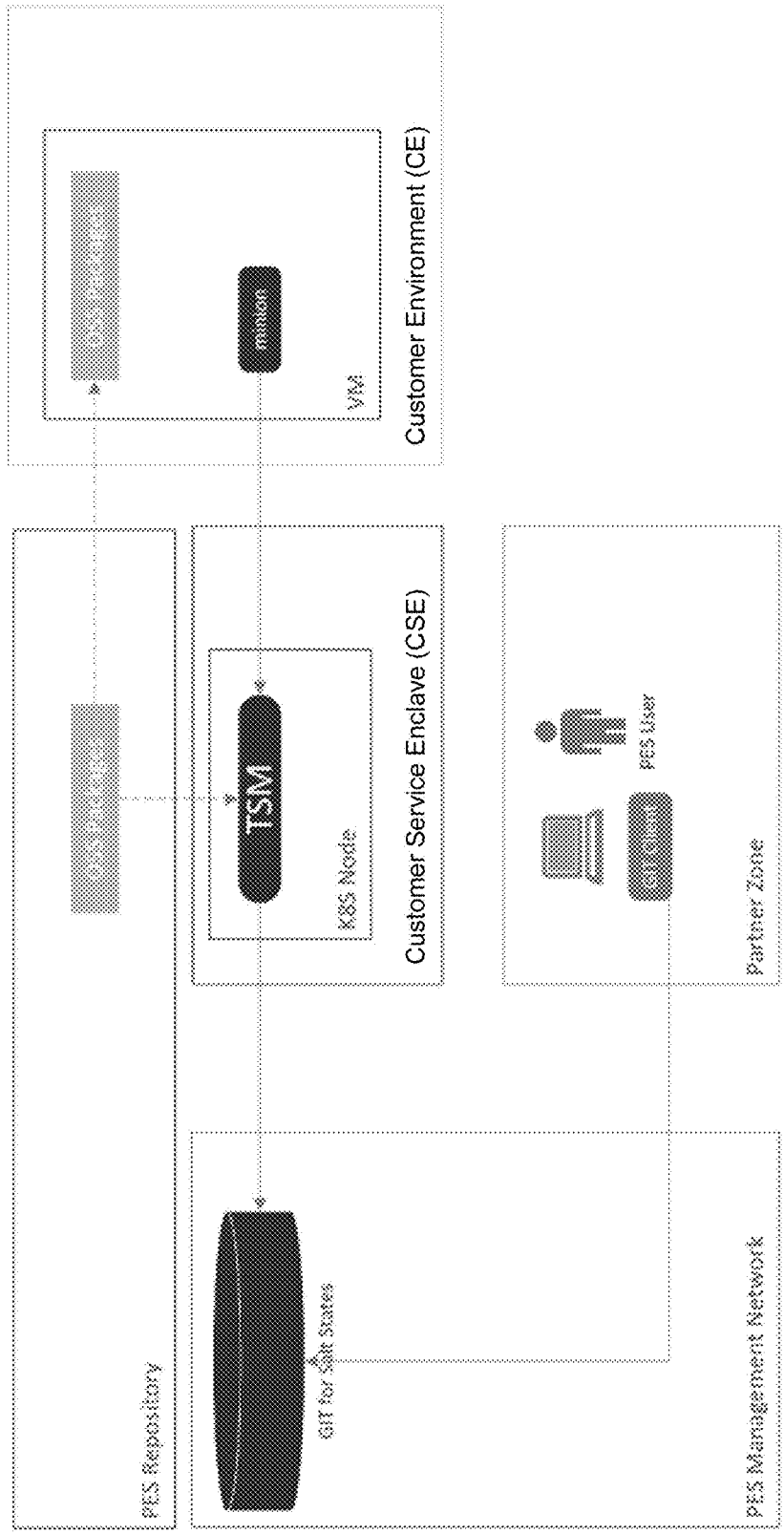
FIG. 20 shows a workflow for configuring tenant virtual machines in a customer environment in an illustrative embodiment.

CP11 includes configuration of tenant VMs, such as via SaltStack States and Pillars. This control pattern concerns UC20 described above, the use of SaltStack for tenant VM configuration management. Configuration management in some embodiments is controlled via Salt States and Pillars which are version-controlled in tenant-specific branches. The TSM runs as a K8S POD exposing the required ports to the minions. As with all TAS, the container image comes from the PES Repository. This repository can either be exposed to CEs, or additional repositories may be established to which the tenant VMs have access for software deployment (see CP12 described below). The TSM gets its States and Pillars from a GIT server running in the PES-MN. Eligible partners (see UC20) have the rights to commit into the tenant specific branch of that server. FIG. 20 illustrates the configuration of tenant VMs via SaltStack States and Pillars.

CP12 includes deployment of open source software (OSS) from a PZ to a CE. Legally approved OSS software can be distributed to CEs. OSS approval is an added value of PES, so the partners can just chose from a catalog of packages. The software can be deployed natively onto VMs or via containers if the customer runs a container platform. Artifacts are hosted in the PES Repository and proxied to the CE directly or via a Remote Repository hosted in the CSE (see CP11 described above). Deployment and configuration of software is achieved via SaltStack States in some embodiments. These States may be handcrafted. PES could be complemented with professional services helping the partners building Salt-based blueprints for their solutions.

Figure 21:
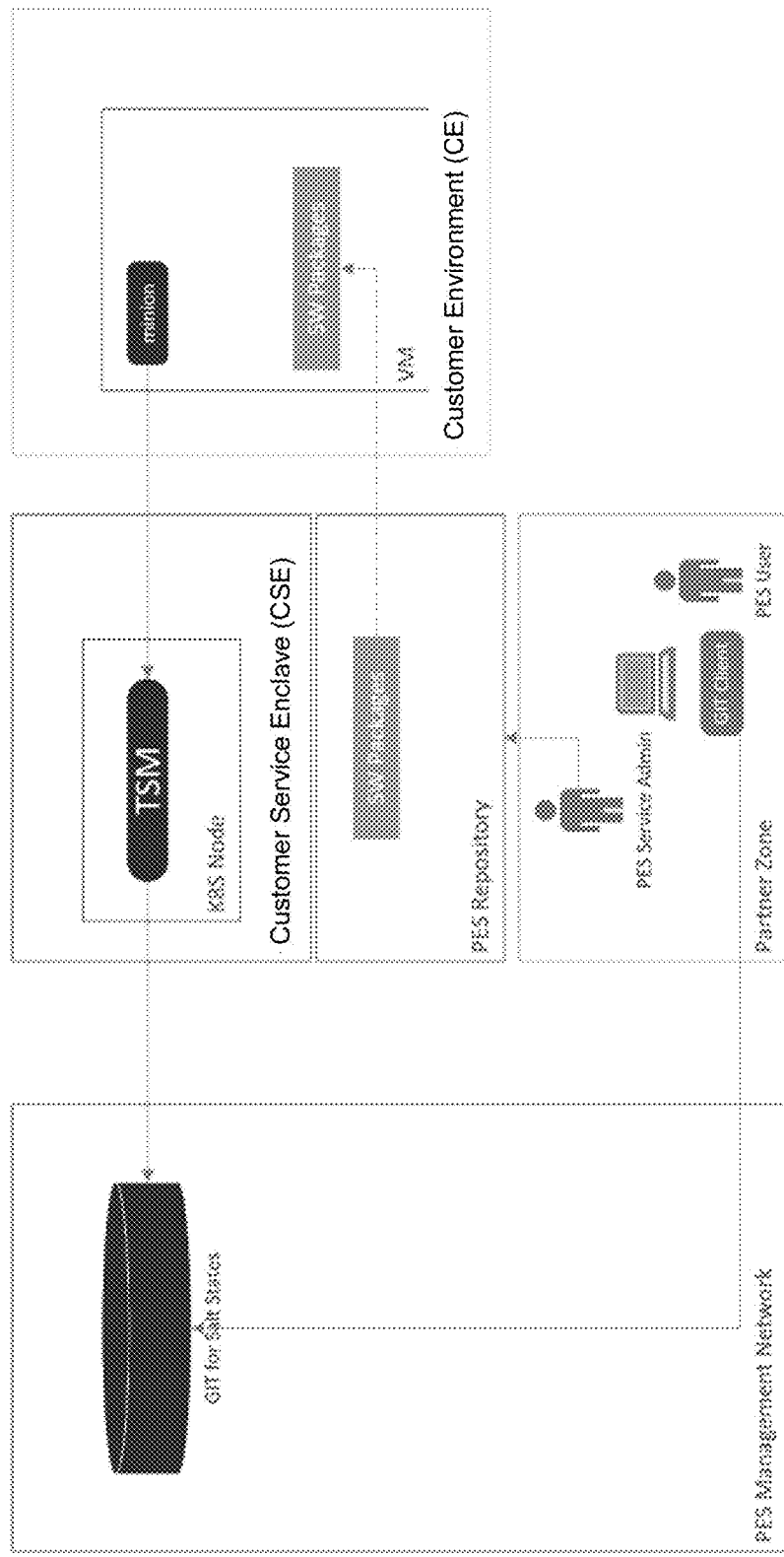
FIG. 21 shows a workflow for deploying software from a partner zone to a customer environment in an illustrative embodiment.

CP13 includes deployment of commercial software from a PZ to a CE. Commercial software should not be templatized or containerized and deployed to other organizations by the PPP, as this may be considered illegal software distribution. Exceptions are software packages for which the PPP has permission for distribution. Nevertheless, PES enables partners to distribute software to their tenants provided the partner contributes the software packages. For that purpose, the partner will have to check-in the software in a repository server running in its PZ. Deployment will work via Salt States similar to the OSS scenario of CP12. FIG. 21 illustrates deployment of commercial software from a PZ to a CE. An example of this control pattern includes deployment of SAP Cloud Connector, and templates for standardized stacks (e.g., Guidewire).

Figure 22:
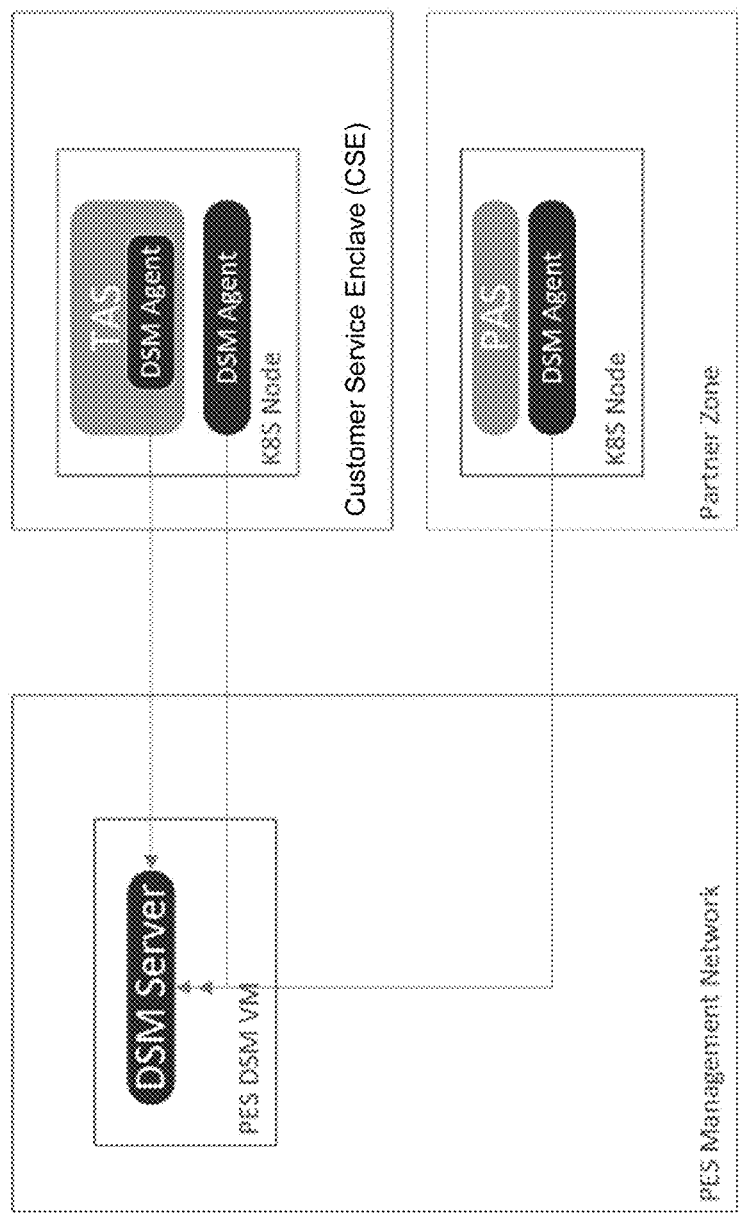
FIG. 22 shows a workflow for intrusion and malware detection in an illustrative embodiment.

CP14 includes intrusion and malware detection. As part of the PES framework, the PZs and CSEs may be secured via security monitoring tools (e.g., Trend Micro tools) against intrusions and malware. The PES-MN will run a Deep Security Management (DSM) server to which DSM agents connect. DSM agents will run on all protected VMs such as K8S nodes as well as certain TAS such as Jump Hosts which have to be protected against malware. FIG. 22 illustrates intrusion and malware detection using a DSM server on the PES-MN and DSM agents on the PZ and CSE.

Figure 23:
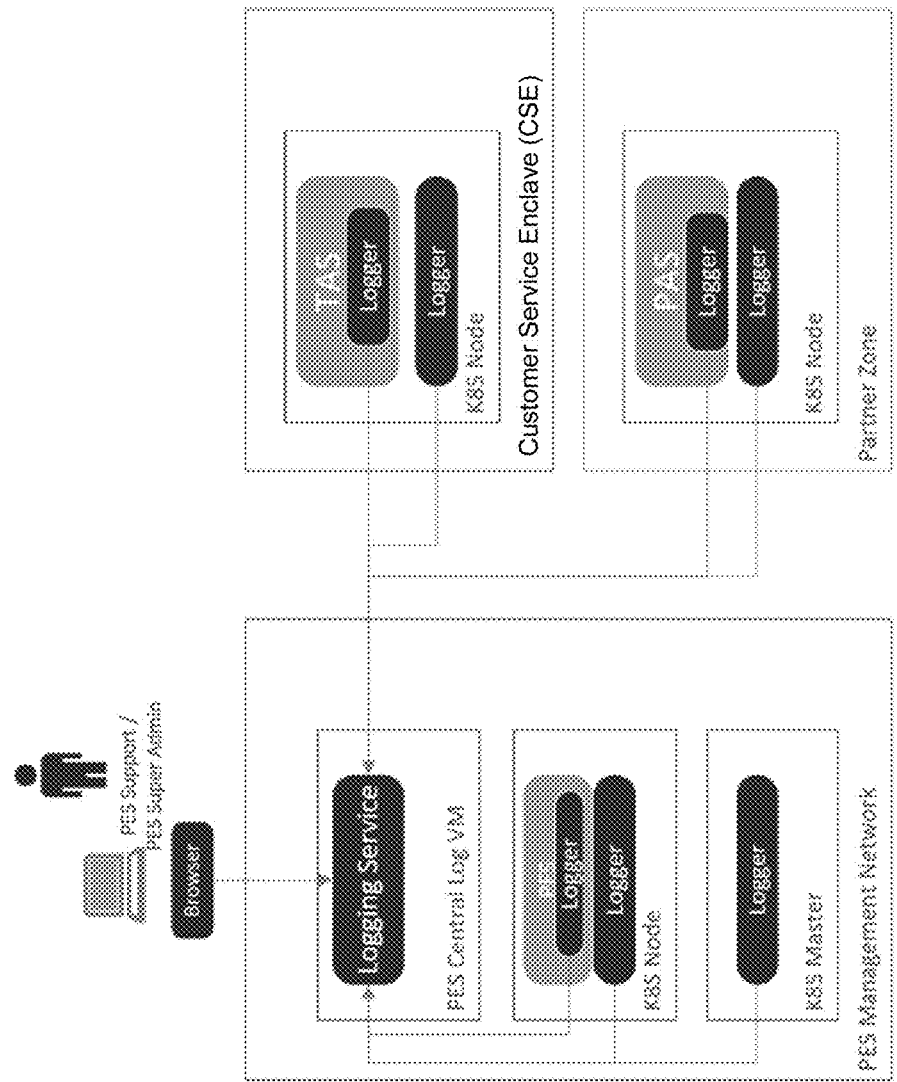
FIG. 23 shows a workflow for central logging in an illustrative embodiment.

CP15 includes central logging. For UC14 described above, all services and PES-related VMs such as K8S nodes write log entries into a central log running in the PES-MN. FIG. 23 illustrates such central logging, with loggers in the PES-MN, CSE and PZ writing to a logging service implemented on a PES Central Log VM on the PES-MN.

CP16 includes a central PES vault. In some embodiments, a Hashicorp Vault is integrated into K8S to maintain the service account tokens for PODs. For example, in the CSE the TAS can use K8S service account tokens to retrieve TAS specific tokens from Vault for their secrets management. The PES Vault cluster runs in multiple PES K8S nodes with podAntiAffinity configured for high availability (HA). In some embodiments, the cluster is configured for auto-unsealing with the unseal keys stemming from a key management service (KMS). In some embodiments, the PODs are run with IPC LOCK. Vault is configured for Transport Layer Security (TLS) with a custom certificate authority (CA).

CP17 includes multi-tenant and multi-partner TAS and PAS control. PES is a multi-tenant framework by virtue of the separated CSEs. All TASs are separated tenant-wise. However, there is a mix of workloads inside the CSEs running services for different organizations (e.g., the PPP and multiple partners). The PES architecture in some embodiments utilizes a viable pattern with a maximum degree of security acknowledging the fact that hard multi-tenancy is still a developing topic in Kubernetes. Thus, some embodiments may utilize the following architecture:

1. The PES-MN will have its own dedicated K8S cluster running the PFSs;
2. Each PZ will have its own dedicated K8S cluster running PASs; and
3. Each CSE will have its own dedicated K8S cluster running TASs. The CSE is the trust boundary for management of a tenant. TAS PODs of different organizations will run in separate namespaces. By activating a partner, a customer accepts the risk that theoretically partners could influence each other within the CSE as much as they could do this within the CE itself (as both have access to this network).

Figure 24:
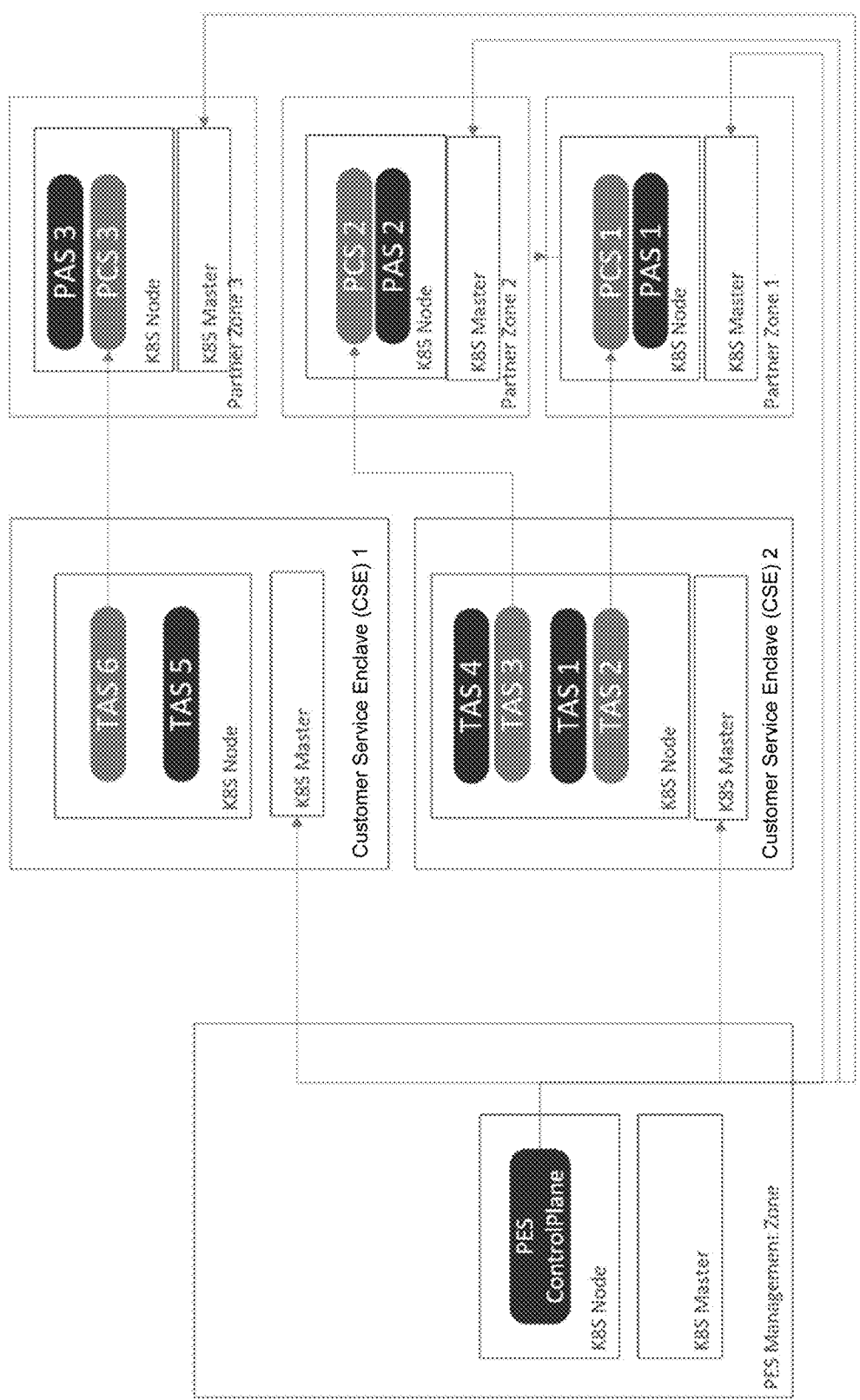
FIG. 24 shows a workflow for multi-tenant and multi-partner tenant administrative service and partner administrative service control in an illustrative embodiment.

The PES ControlPlane service, in some embodiments, has access to all masters of all K8S clusters. Also, some embodiments utilize cluster-to-cluster communication, such as TAS to PCS. FIG. 24 illustrates a multi-tenant and multi-partner K8S cluster setup for PES.

Figure 25:
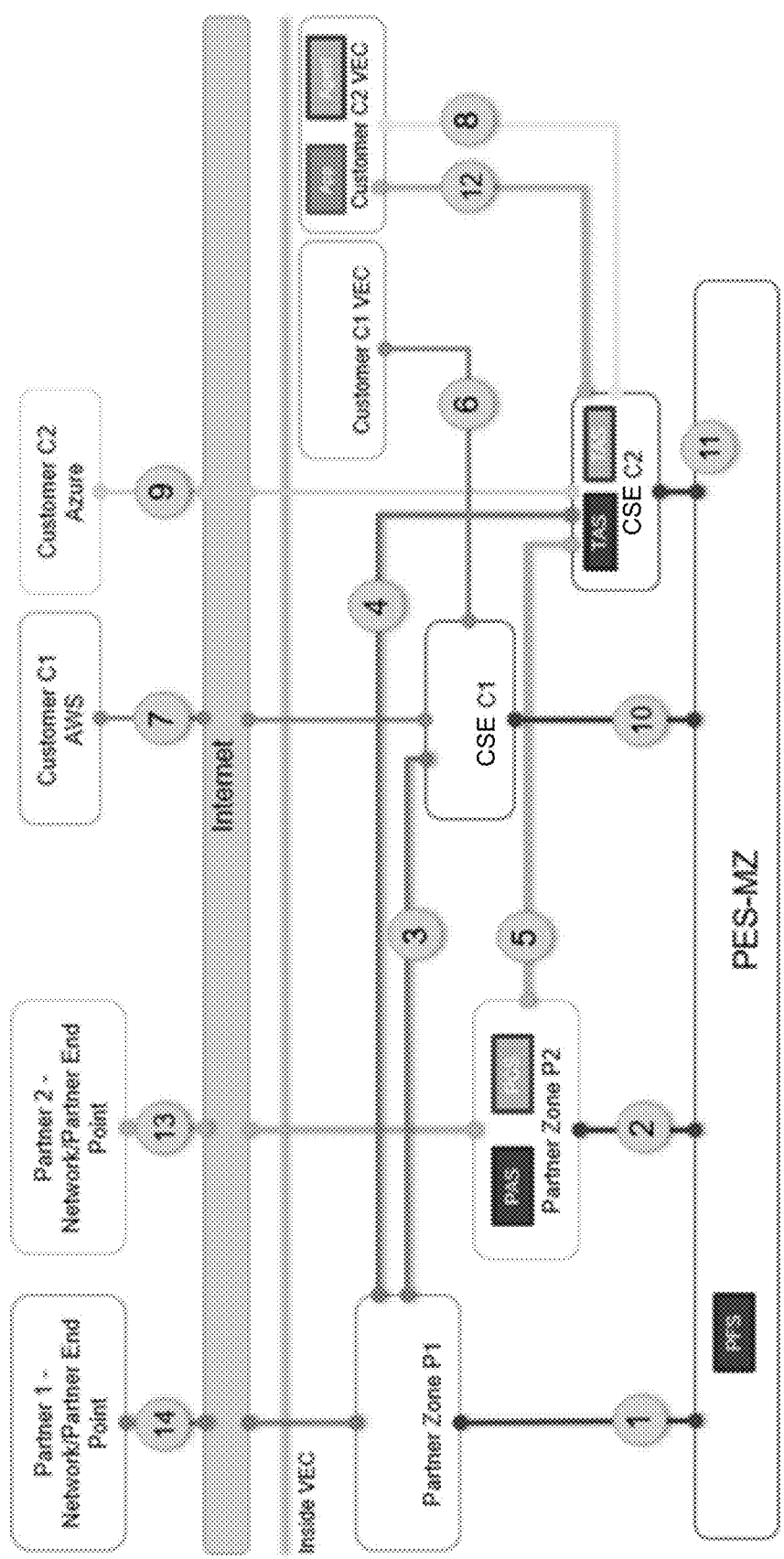
FIG. 25 shows an example of a partner enablement services environment with labeled connections in an illustrative embodiment.

For the inventory of network connections between PES environments, consider FIG. 25, which is a variant of FIG. 5 with numbers tagged to the various example connections. Although FIG. 25 is a more of a conceptual logical diagram than a network diagram, the connection numbers will be referred to in terms of:

North-South traffic: connection for (in Virtual Network/ NSX terms) traffic for Logical Interfaces (LIFs) added to a Distributed Logical Router (DLR) which are Uplinks (e.g., traffic exiting the DLR);

East-West traffic: traffic between components directly connected to the DLR; and North-South traffic: connections entering or leaving the PPP environment (e.g., the VEC environment when Virtustream is the PPP as is assumed in FIG. 25) out of the DC from the Internet and between DCs.

In PES, this traffic tends to cross trust boundaries, and will require Access Control Lists (ACLs) and routes for all traffic. For the numbered connections, the following conventions are used:

<N>N (North to South);
<N>S (South to North);
<N>W (West to East); and
<N>E (East to West);
where <N> is a connection number in the logical diagram.

A connection controller is anyone who can alter the connection route or availability of ACL rules. TABLE 6 in the Appendix lists the various connections shown in FIG. 25, along with examples of protocols and expected volumes. In FIG. 25, it is assumed that the PPP is Virtustream, and thus the PPP's cloud is VEC. As such, the CEs for Customer C1 AWS and Customer C2 Azure are non-PPP clouds or CEs. The Customer C1 VEC and Customer C2 VEC are PPP clouds or CEs.

Figure 26:
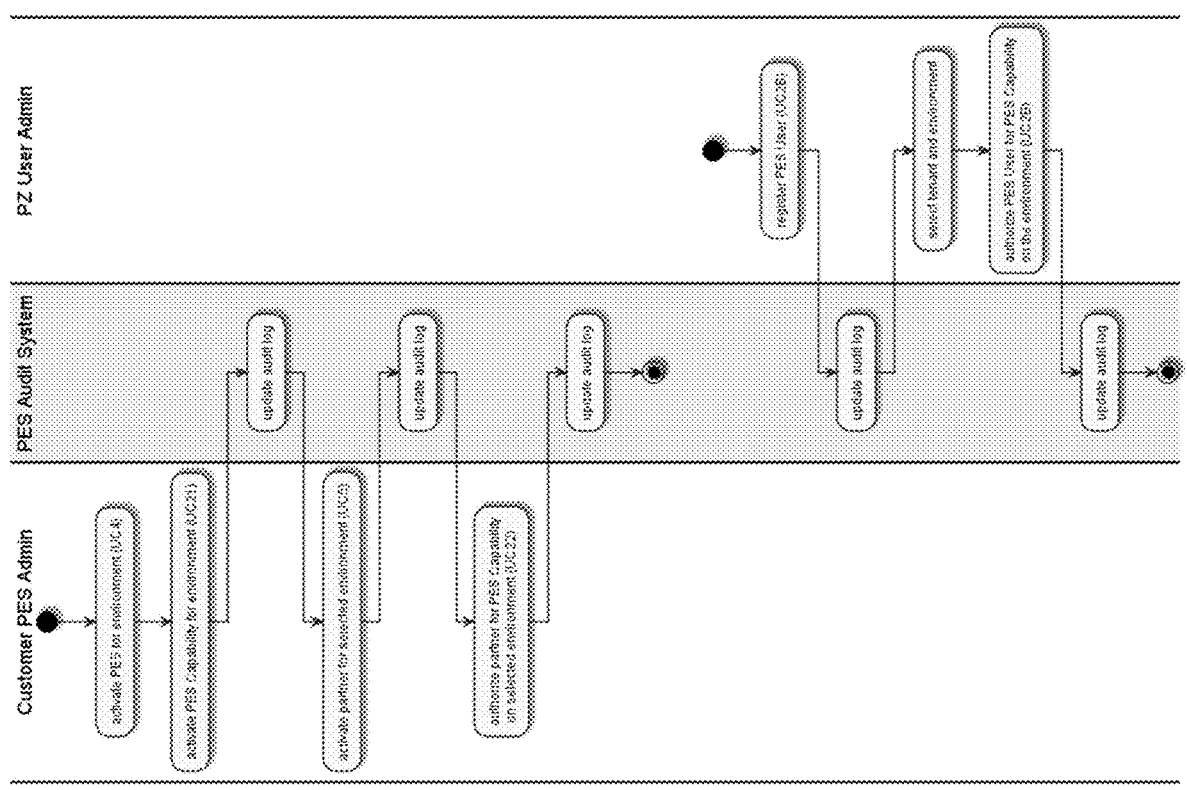
FIG. 26 shows a workflow for partner activation and authorization so that a partner user can leverage partner enablement services capabilities in an illustrative embodiment.

FIG. 26 shows a workflow for partner activation and authorization so that a partner user can leverage PES capabilities. As shown in FIG. 26, various steps reference the above-described use cases (e.g., UC4, UC21, UC5, UC22, UC2B).

Examples of PES capability use cases (e.g., those which are exposed to the PES user) will now be described. PES capabilities use cases will start with the numbering UC101.

UC101 includes "partner easy access" which is a combination of concepts including on-demand Jump Hosts and one-time credentials for tenant VMs. In this use case, the partner is able to contribute their Jump Host images (cf., UC10). In some embodiments, this is a special case of the PPP hosting TAS whose images come from a partner (cf. CP09A). Using the UC101 approach, partners can equip the Jump Host images with client software they need, and for which the PPP does not necessarily have any distribution rights. Note that for UC101, the customer must activate the capability (e.g., UC21) and authorize the partner for this capability (e.g., UC22). The prerequisite for activation of this capability, in some embodiments, is a SaltStack infrastructure that must be activated by the customer (e.g., UC20).

Figure 27:
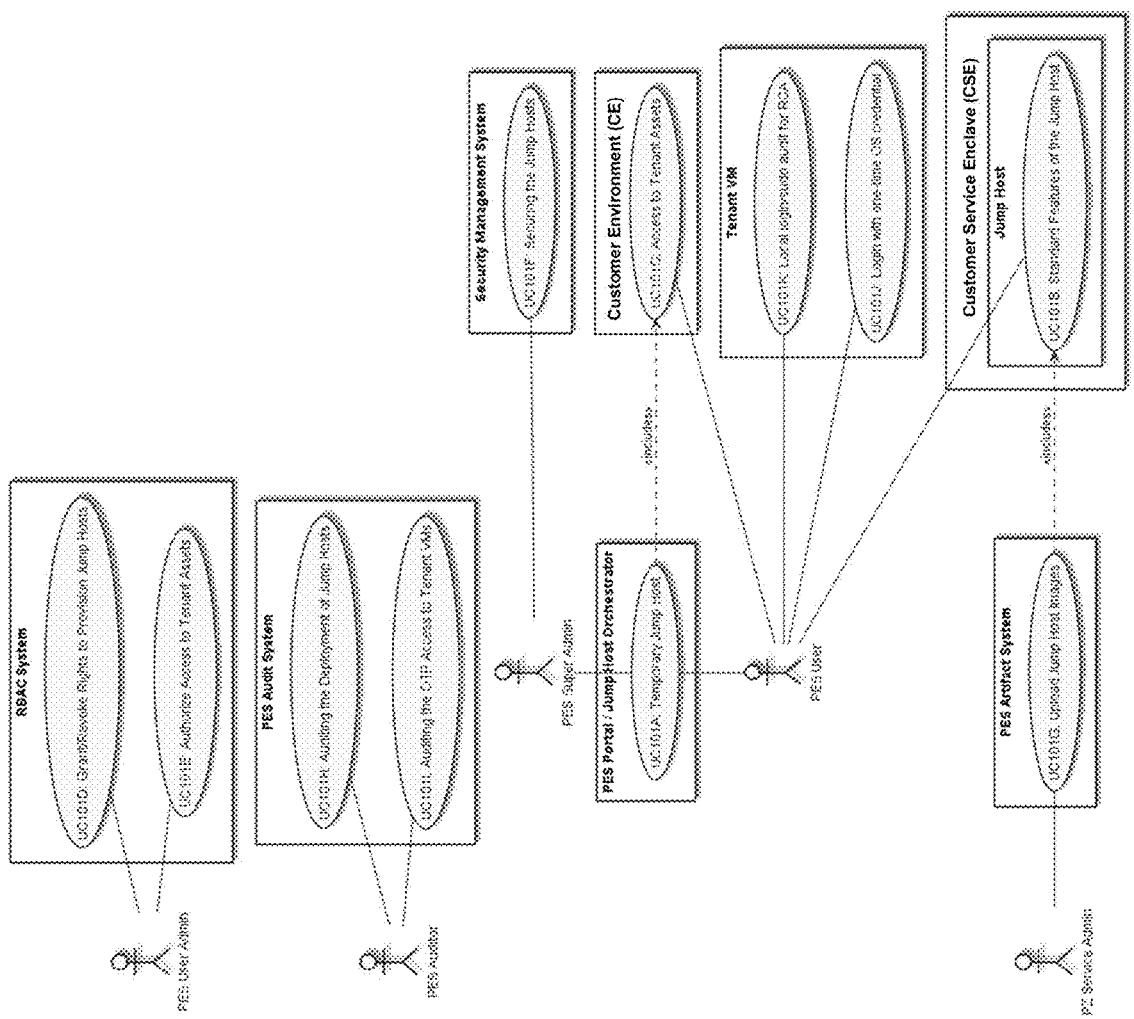
FIG. 27 shows a workflow including a number of use cases for partner access in an illustrative embodiment.

UC101 may be split up into a series of smaller use cases, that are connected to the various actors described herein. FIG. 27 illustrates these smaller use cases, denoted as UC101A through UC101K. TABLE 7 in the Appendix illustrates scenarios for UC101A through UC101K.

For security reasons, login to the Jump Hosts in some embodiments is not allowed via basic username and password authentication. Instead, Jump Hosts may be configured for secure shell (SSH) and remote desktop protocol (RDP) access with an OTP token, such as a Google OTP, an RSA SecurID OTP, etc. The Google OTP, for example, may be configured using the libpam-google-authenticator library on the Jump Host. This may be used with single-factor authentication, as the user has already authenticated to the respective PZ. When a user gets authorized for Jump Host access, the Jump Host Orchestrator service creates an OTP certificate for that user and stores that in the PES Vault.

Figure 28:
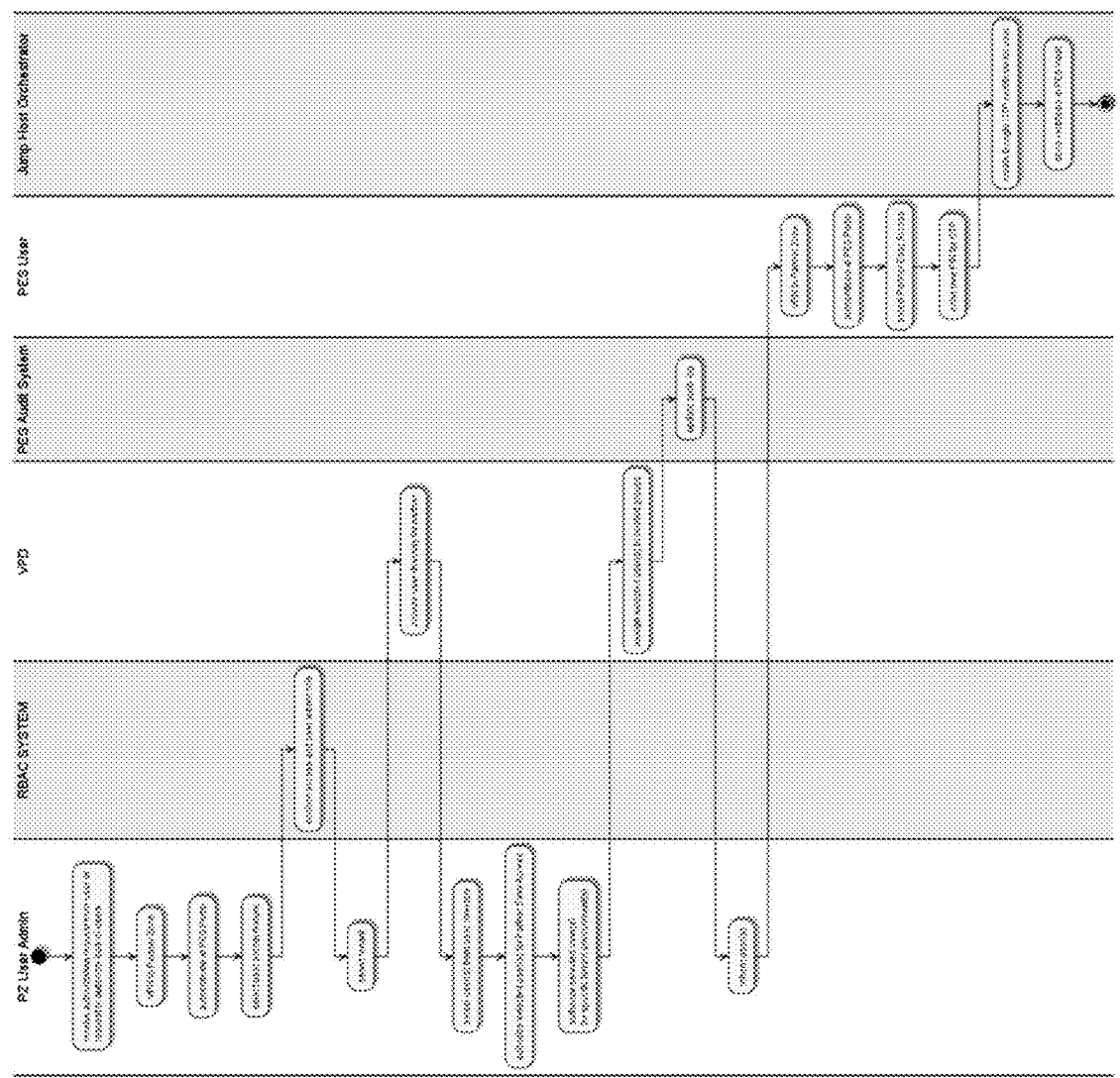
FIG. 28 shows a workflow for a partner zone administrator authorizing a user in an illustrative embodiment.

FIG. 28 illustrates a workflow for UC101D and UC101E, where a PZ Admin authorizes a user. Once a user of a partner has been registered by the PZ User Admin (see UC2B), this user can be authorized for "Partner Easy Access." In addition, authorizations are granted for tenant access. These authorizations apply to CEs, and possibly finer-grained domains (e.g., segments, application groups, etc.). In some embodiments, it is assumed that the PZ User Admin who belongs to a partner gets an authorization request from a user using a partner-internal workflow. When the PES User selects Partner Easy Access and there is no OTP certificate (e.g., no Google OTP certificate) since the user was just assigned to the related group, then the PES Portal asks for a new personal identification number (PIN) or other passcode and generates that certificate. Revoking access may follow a similar workflow as that shown in FIG. 28, and may also be performed by the PZ User Admin. Revoked users will be removed from the respective groups. In the FIG. 28 workflow, it is assumed that the Partner Directory is a VPD (e.g., that Virtustream is the PPP), though it should be appreciated that other Partner Directories may be used as desired.

Figure 29:
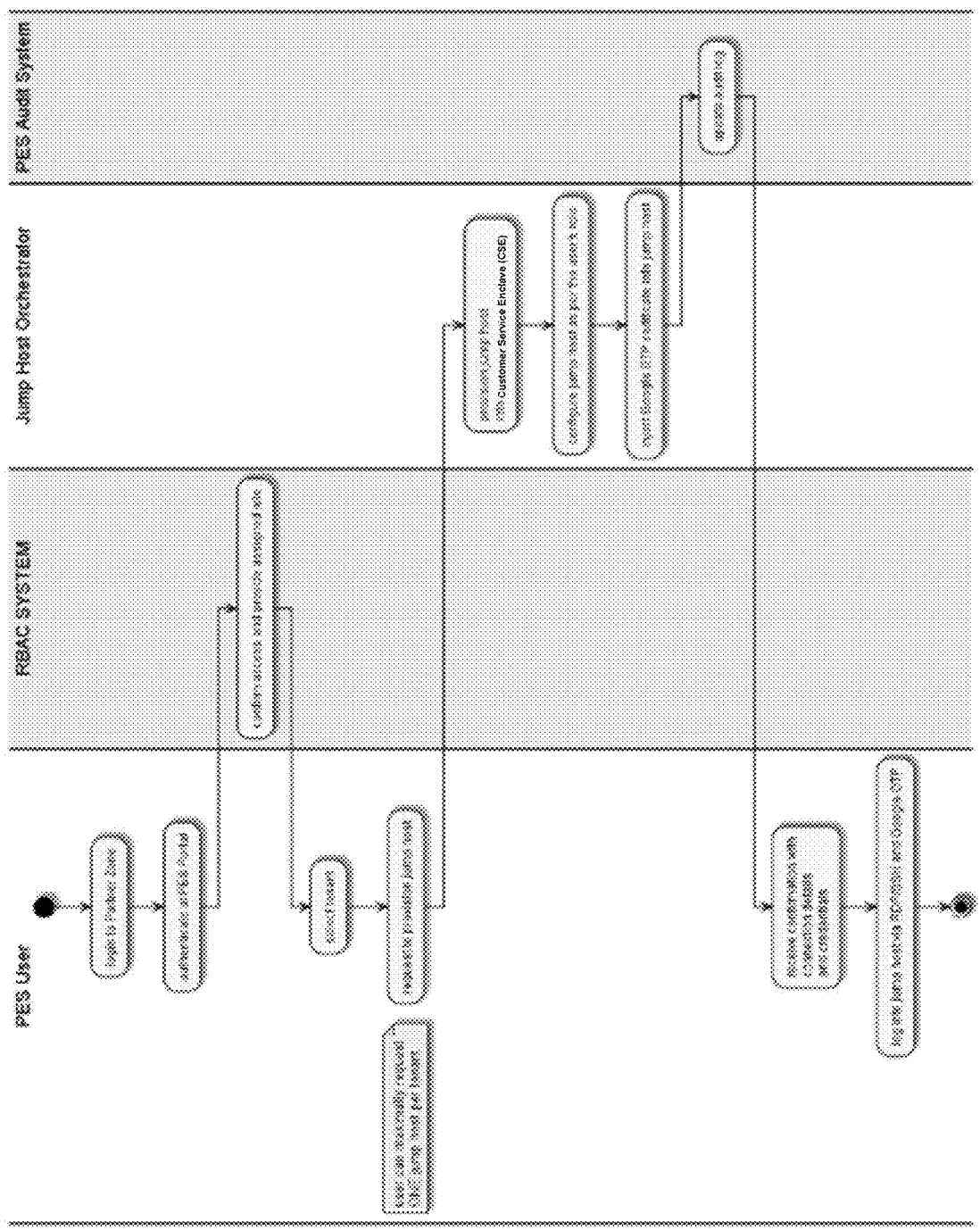
FIG. 29 shows a workflow for a partner enablement services user deploying a jump host in an illustrative embodiment.
Figure 30:
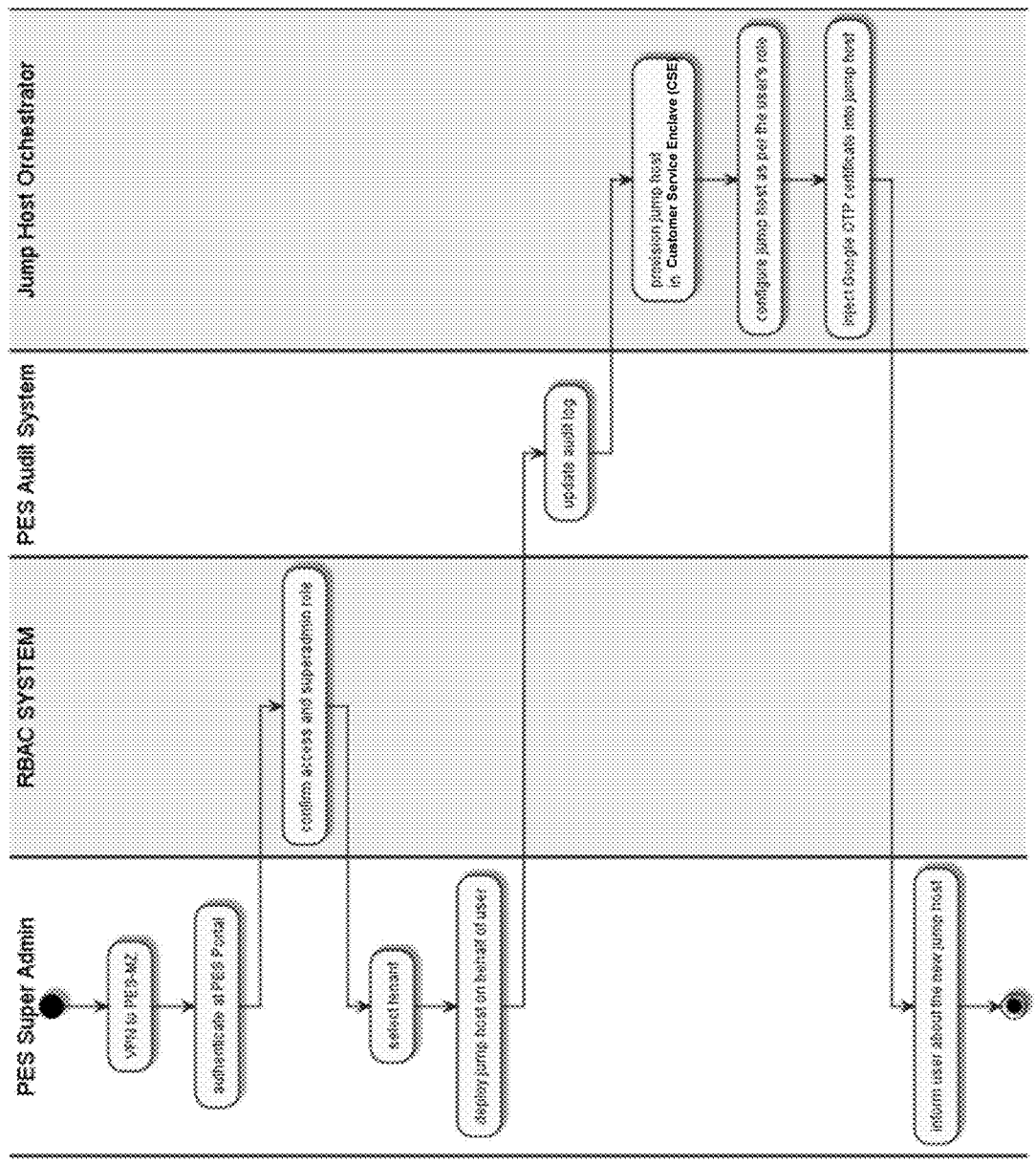
FIG. 30 shows a workflow for a partner enablement services administrator deploying a jump host on behalf of a user in an illustrative embodiment.

FIGS. 29 and 30 show workflows for UC101A where a Jump Host is deployed. FIG. 29 illustrates a workflow where a PES User deploys the Jump Host, and FIG. 30 illustrates a workflow where a Super Admin deploys the Jump Host on behalf of the PES User.

In order to improve the security of customer VM management, some embodiments introduce one-time credentials through Partner Easy Access for both Linux and Windows VMs of managed customers. The entitlements of personnel to generate these OTPs may be controlled automatically based on policies.

In some embodiments, the solution includes: (i) creating OS user accounts for PES users once in a central location (e.g., in a Partner Directory such as the VPD); (ii) PES users accessing only particular tenant VMs using only their individual local user accounts created on the target VM; (iii) using policies of the PES Network Control System to control access to the tenant VM IP address; (iv) fully automated provisioning of the above user accounts on the target system (e.g., via SaltStack, where SaltStack should be activated by the tenant on the managed environment first); (v) PES users will use OTPs only, which may be requested via a tool residing on the Jump Host; (vi) OTPs are automatically generated by a Tenant Vault Server running in the CSE; (vii) after successful logon to the target system, the OTP is invalidated (e.g., immediately); and (viii) changes to user accounts, creation of OTPs and actual access to the tenant VMs are fully audited.

Figure 31:
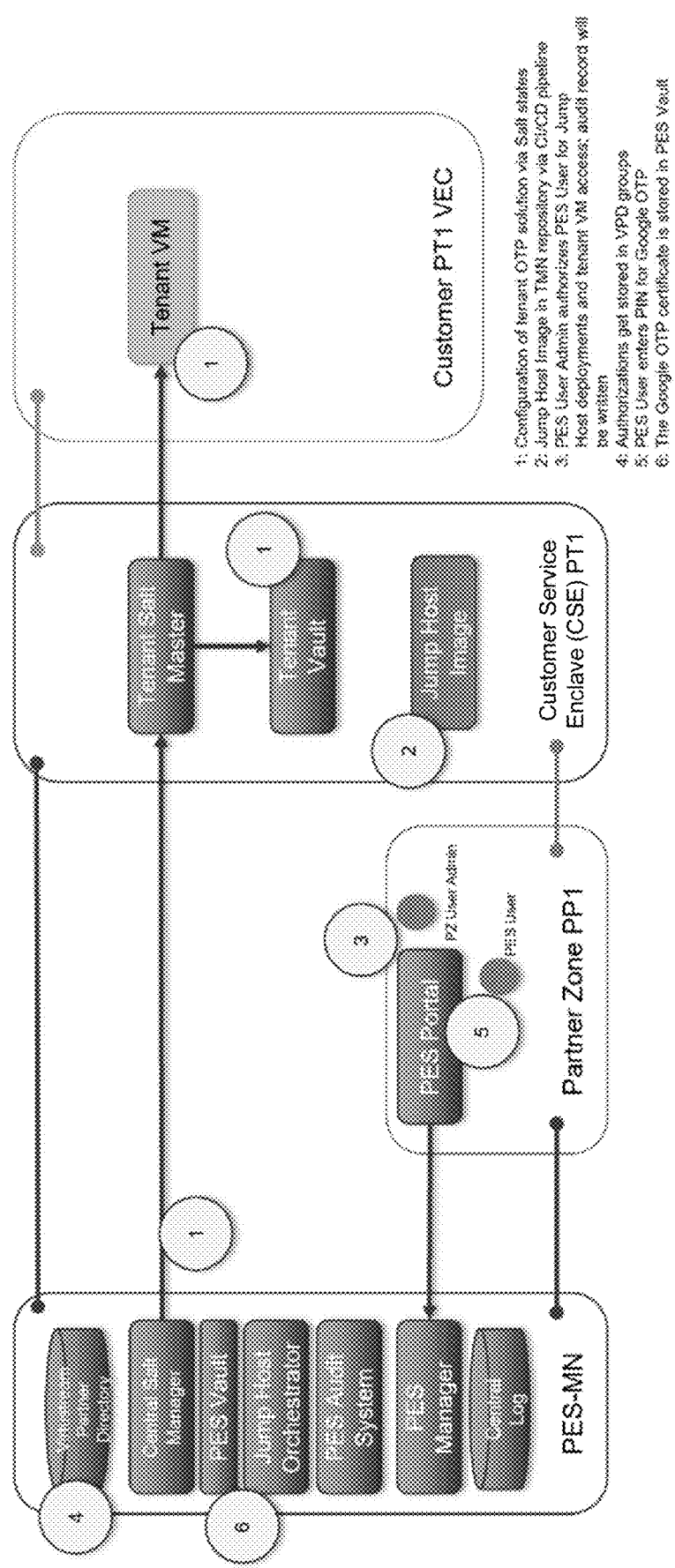
FIG. 31 shows an architecture for configuration of partner access services in an illustrative embodiment.
Figure 32:
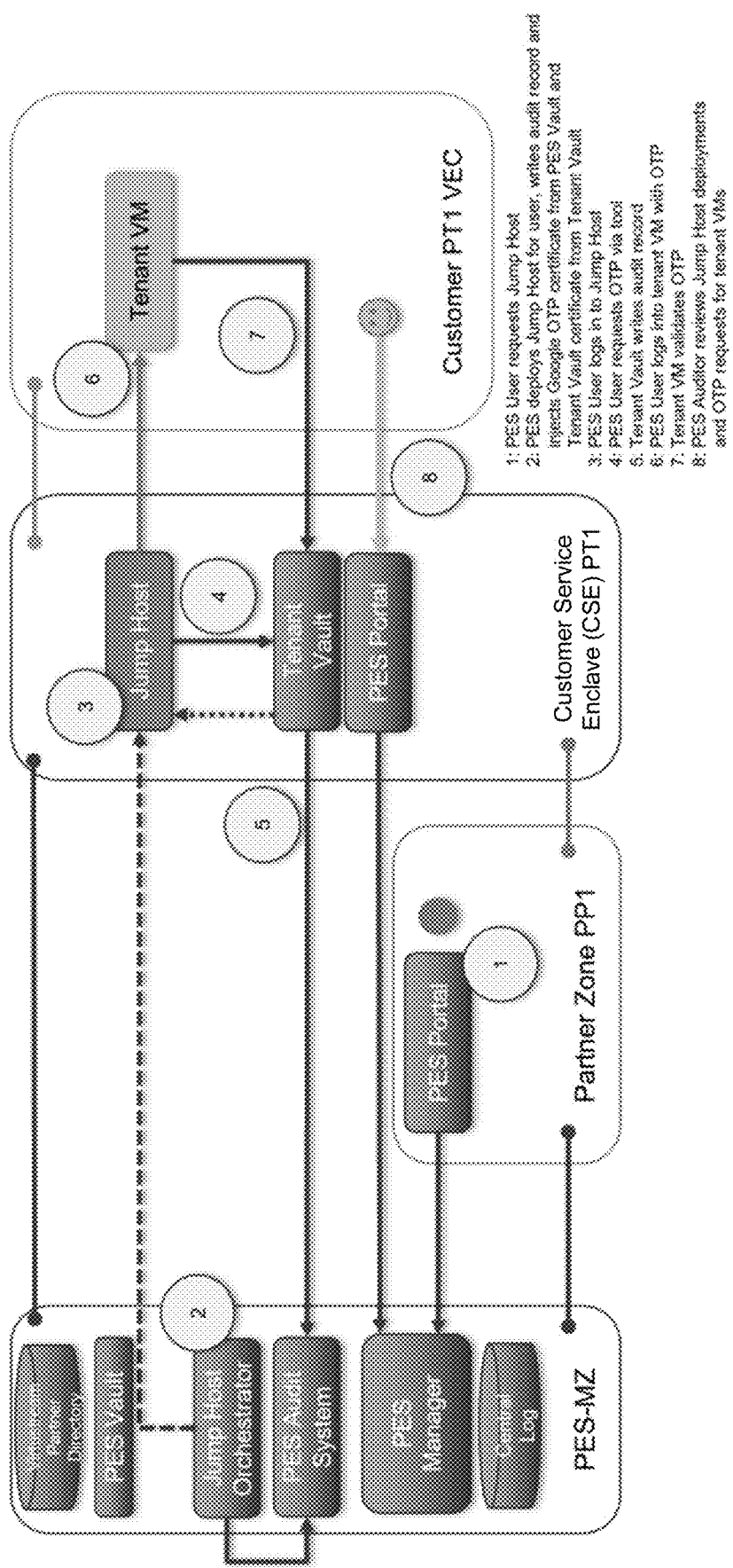
FIG. 32 shows an architecture for operation of partner access services in an illustrative embodiment.

FIG. 31 shows a high level architecture of the configuration of Partner Easy Access capability. FIG. 32 shows a high level architecture of the operation of the Partner Easy Access capability shown in FIG. 31. The various components of the architecture shown in FIGS. 31 and 32 will now be described. The VPD is an example of a Partner Directory, and is configured to store the PES users and groups as well as the assigned OS username of each PES user. The PES Portal provides a user interface (UI) for PES partners and customers. The PES Manager provides a PES back-end for the PES Portal. In some embodiments, the PES Manager exposes PES capabilities as Representational State Transfer (REST) APIs. The PES Manager provides a micro-service that delegates to the Audit System, Jump Host Orchestrator and other PES services. The PES Audit System is used to store and query audit records and other log entries. The PES Audit System may utilize the Central Log for persistence.

The Central Salt Manager controls the deployment and configuration of the tenant VM OTP solution. The Jump Host Orchestrator deploys Jump Hosts, removes expired Jump Hosts, manages the PES Users' OTP certificates (e.g., Google OTP certificates), etc. The PES Vault stores the OTP certificates of the PES users. The Jump Host, in some embodiments, is implemented as a container deployed from a certified partner image (e.g., a Ubuntu container).

The Tenant Vault issues OTPs for tenant VM access. In some embodiments, the PES User will seamlessly authenticate against the Tenant Vault using a user-specific certificate that gets injected into the Jump Host during post-deployment configuration. The TSM controls the deployment of the OTP solution in the CE, which in FIGS. 30 and 31 is assumed to be a VEC.

Partner Easy Access PES capabilities may, in some embodiments, be rolled out in phases. In a first phase, prototypical Jump Host images may be deployed into CSEs via the Jump Host Orchestrator, where such deployment creates audit records in the PES Audit System. In a next phase or wave, AMS Jump Host Images (e.g., with standard tools) may be deployed into the CSEs via the Jump Host Orchestrator. The AMS Admin can add and remove AMS users to the PES Portal, and authorize them for Jump Host deployment. Similar to the first phase, deployment creates audit records in the PES Audit System. The Jump Hosts may be secured in this phase, such as using various security tools (e.g., security tools offered by Trend Micro). The Jump Hosts will also be automatically removed after expiration. In the next phase or wave, Jump Host images will be validated and accepted from selected partners. Such partners can deploy the Jump Host images into CSEs via the Jump Host Orchestrator. OTP access may also be implemented from the Jump Host to tenant VMs. In further phases and waves, the previous phases may be opened up to additional partners.

UC102 includes customer cloud inventory management for partners, and UC103 includes customer asset health management for partners.

UC104 includes easy deployment for partners. The capabilities and tool chains for UC104 allow partners to deploy new software solutions for their customers in a highly automated and standardized way. In some embodiments, UC104 uses a SaltStack infrastructure that must be activated by the customer as a prerequisite (see UC20). Once a partner has been authorized by the customer to use the Salt or other configuration infrastructure in a selected CE, the partner can use the PES Portal and the PES GIT system to deploy and configure applications on the tenant VMs in that CE. In some embodiments, the customer must activate this capability (see UC21) and authorize the partner for this capability (see UC22).

Figure 33:
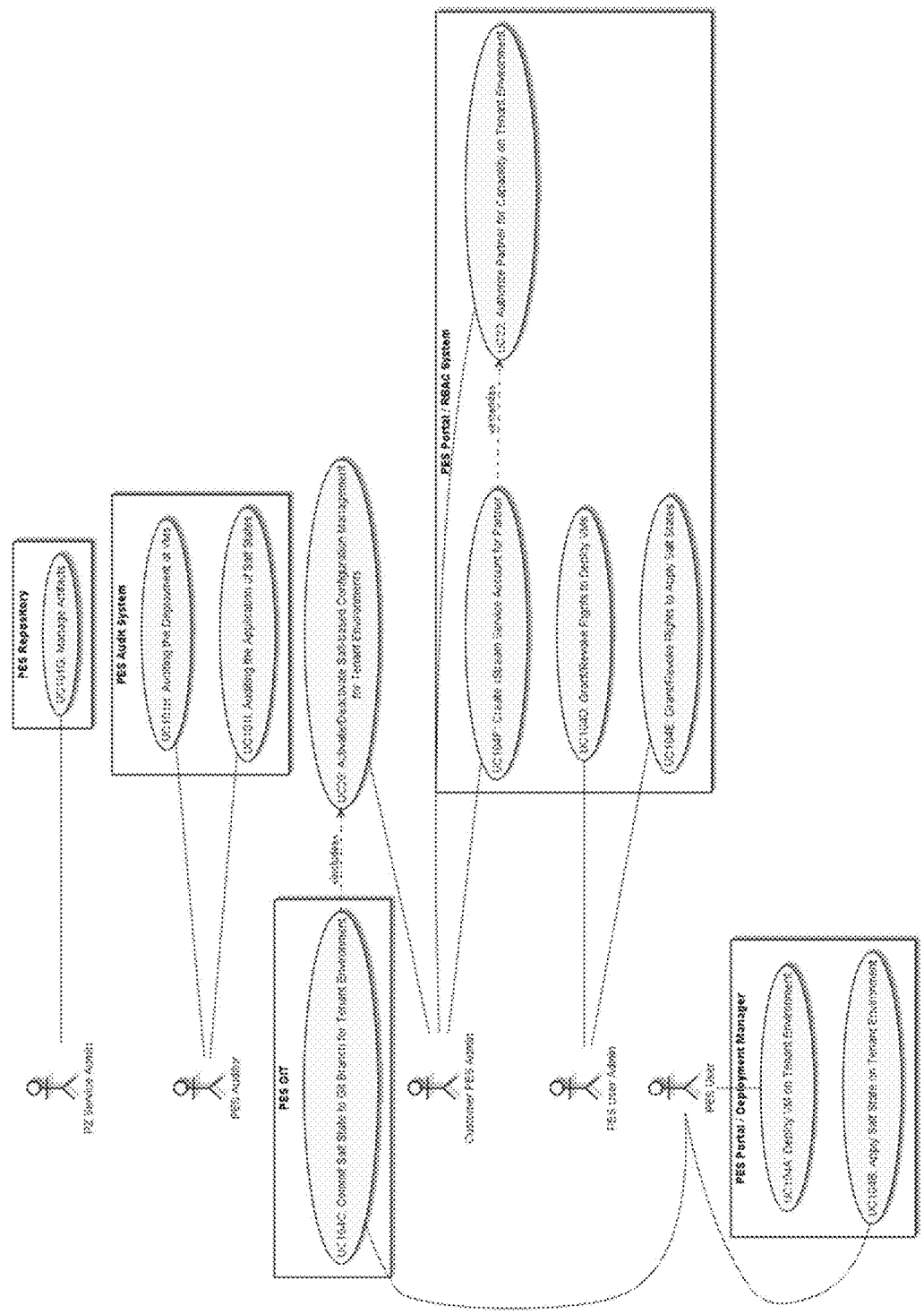
FIG. 33 shows a workflow including a number of use cases for partner deployment in an illustrative embodiment.

Similar to UC101, UC104 may be split up into a series of smaller use cases that are connected to various PES actors. FIG. 33 illustrates these smaller use cases, denoted as UC104A through UC104G. TABLE 8 in the Appendix illustrates scenarios for UC104A through UC104G.

Figure 34:
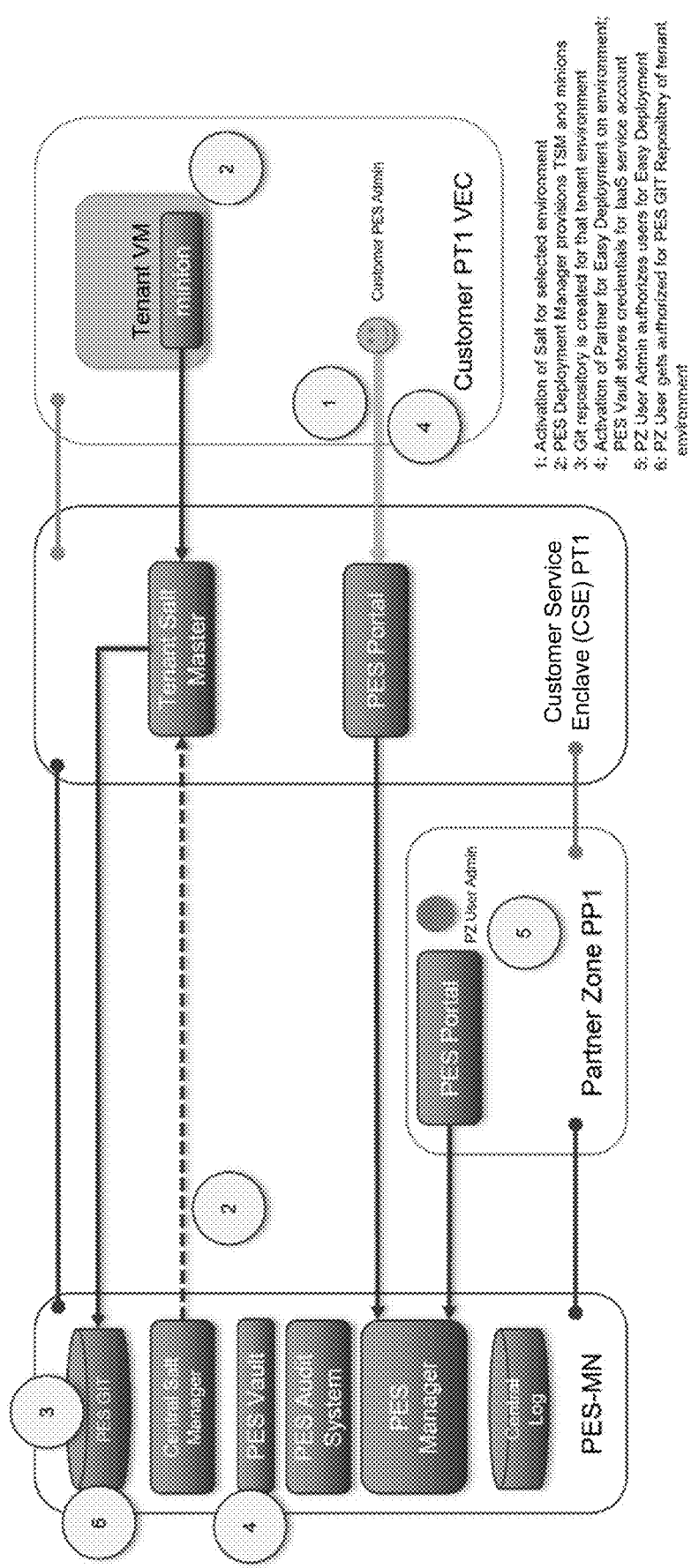
FIG. 34 shows an architecture for configuration of partner deployment capability for activation and authorization in an illustrative embodiment.
Figure 35:
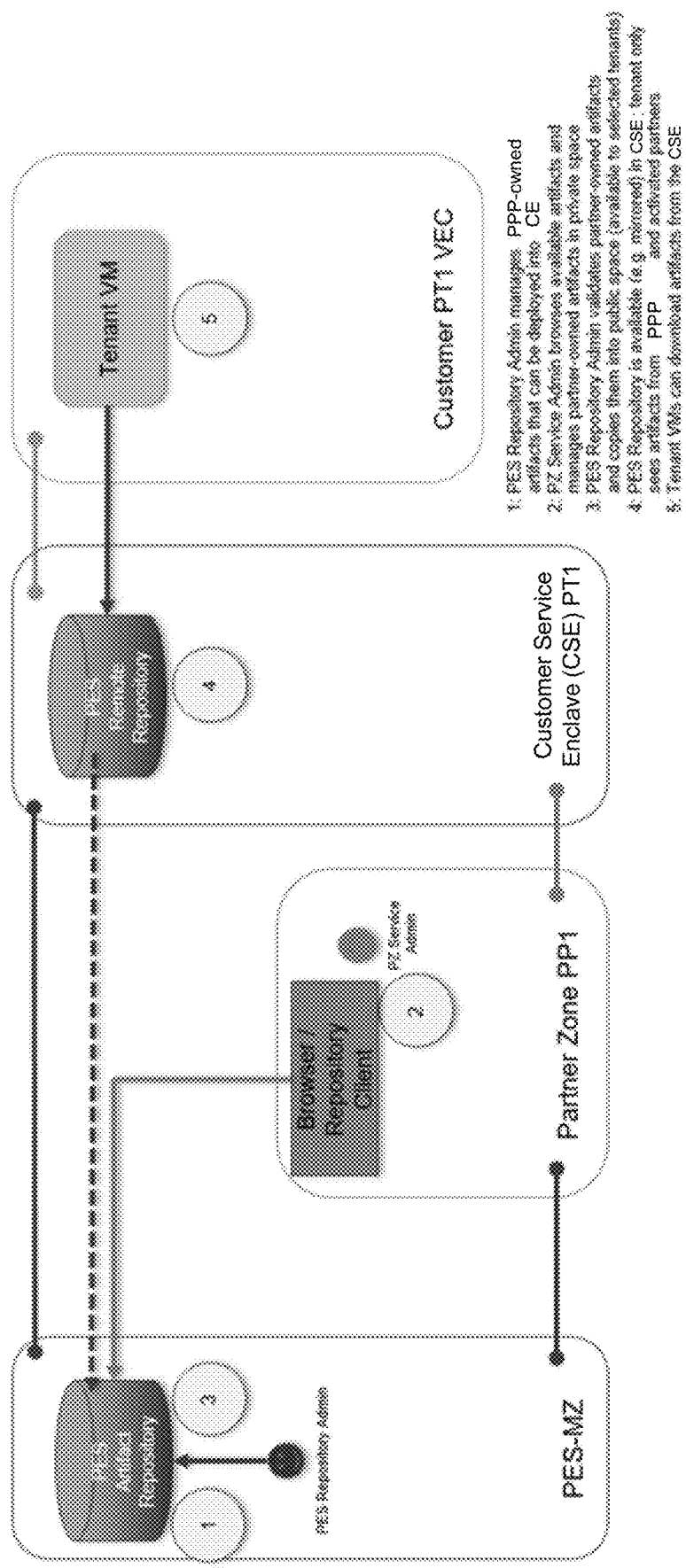
FIG. 35 shows an architecture for configuration of partner deployment capability for artifact management in an illustrative embodiment.
Figure 36:
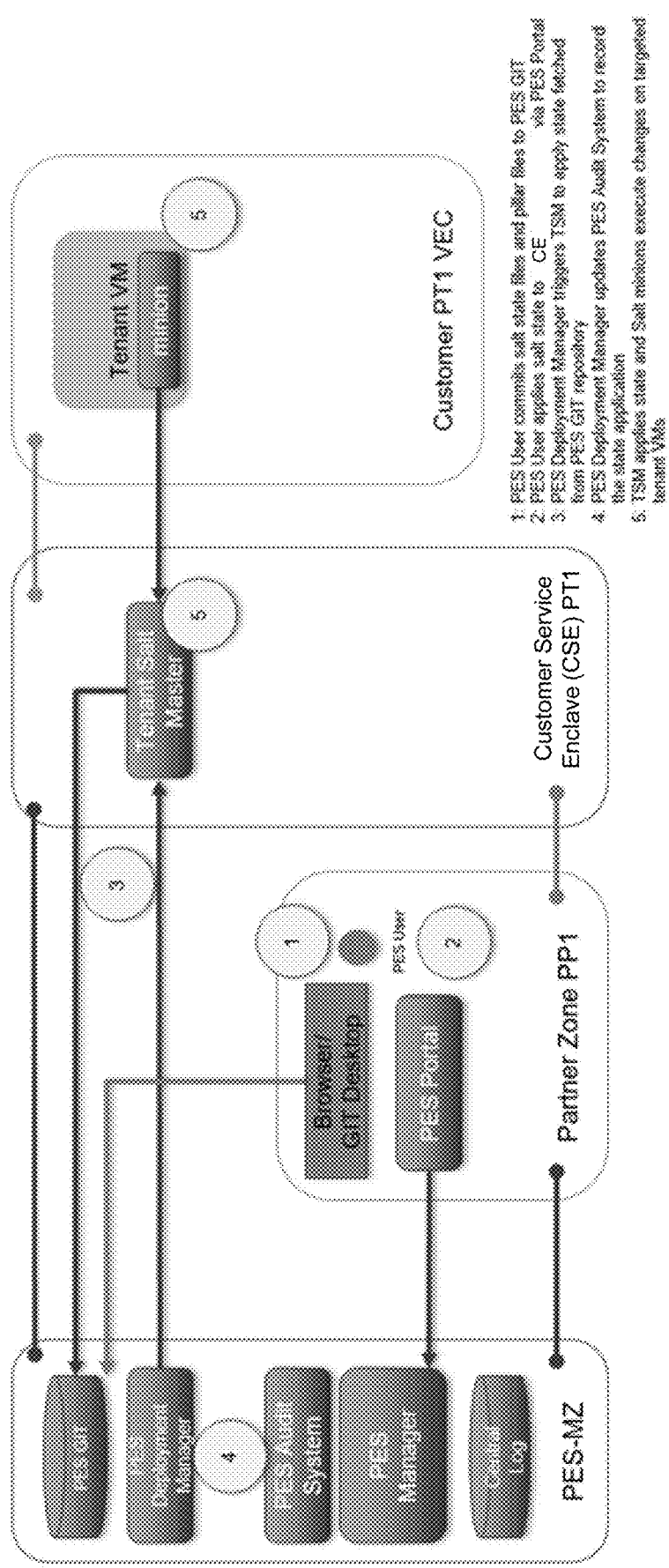
FIG. 36 shows an architecture for configuration of partner deployment capability for state commitment and application in an illustrative embodiment.

FIG. 34 shows a high level architecture of the configuration of Partner Easy Deployment capability for activation and authorization. FIG. 35 shows a high level architecture of the configuration of Partner Easy Deployment capability for artifact management. FIG. 36 shows a high level architecture of the configuration of Partner Easy Deployment capability for Salt State commitment and application. The various components of the architecture shown in FIGS. 34-36 will now be described. The VPD is an example of a Partner Directory, and is configured to store the PES users and groups. The PES Portal provides a UI for PES partners and customers. The PES Manager provides a PES backend for the PES Portal. In some embodiments, the PES Manager exposes PES capabilities as REST APIs. The PES Manager provides a micro-service that delegates to the Audit System, Central Salt Manager and other PES services. The PES Audit System is used to store and query audit records and other log entries. The PES Audit System may utilize the Central Log for persistence. The PES GIT stores the repositories for version-controlled Salt artifacts. The PES Repository and Remote Repositories store the deployable artifacts. The TSM controls the deployment and configuration of applications and workloads onto tenant VMs. The Central Salt Manager provisions and configure TSM and minions on the CE (e.g., in the embodiment of FIGS. 34-36, a VEC CE), triggers application of States (also in a test mode) and Pillars onto TSM, and monitors results. The PES Vault stores IaaS credentials for the CE.

Partner Easy Deployment PES capabilities may, in some embodiments, be rolled out in phases. In a first phase, for example, VMs and Salt States may be deployed to CEs via the PES Portal. In a next phase or wave, the PES User can version-control Salt States and Pillars (see UC104C), the PZ User Admin can manage the authorizations for capabilities (see UC104D), artifacts may be managed by a PES team, and deployments are made auditable (see UC104G). In a next phase or wave, capabilities for partners may be activated (see UC104E), along with management of partner-controlled artifacts (see UC104F) for selected partners and customers. In further phases or waves, such capabilities may be extended to additional partners and customers.

In some embodiments, PES may be deployed with limited numbers of the above-described use cases for testing, demonstration, etc. Such use cases may include:

Tenant onboarding automation;

Customer and partner registration (e.g., UC1 and UC19), such as partner and customer onboarding to PES using a command line interface (CLI) including the networking aspects and metadata handling of PES environments (see UC19);

Management of Customer Admins, Partner Admins and Partner Users (e.g., UC2), which may include a manual update of a Partner Directory such as the VPD;

PES Activation and Deactivation (e.g., UC4) via the PES Portal and via API-controlled access management for certain CEs (see UC15). Such CEs may include PPP-controlled CEs and non-PPP-controlled CEs. For example, where Virtustream is the PPP, the PPP-controlled CE may be VEC environments and the non-PPP-controlled CEs may include AWS environments;

Partner Activation and Deactivation (e.g., UC5) via the PES Portal and via API-controlled access management for certain CEs using user policies. Similar to above, such CEs may include PPP-controlled and non-PPP-controlled CEs;

Viewing Customer Access Records (e.g., UC7) via the PES portal, such as in the context of UC101A;

Deployment and Management of PCS (e.g., UC9) via the PZ Salt Master and Salt States that manage a PCS;

Publishing Container Images for TAS (e.g., UC10) illustrating the TAS publication workflow;

Management of PES Containers (e.g., PFS, PAS, TAS, etc.) via the PES Management System (e.g., UC16) using a PES Manager REST API;

Activation and Deactivation of Salt-based Configuration Management for CEs (e.g., UC20) using the PES Manager REST API and a prerequisite for UC104;

SDP access to PZs (e.g., UC23);

Temporary Jump Hosts (e.g., UC101A) via the PES Portal;

Access to Tenant Assets (e.g., UC101C) including access to the Jump Host via the PES Portal and access to a CE by SSH-ing to a tenant VM from the Jump Host;

Auditing the Deployment of Jump Hosts (e.g., UC101H) via the PES Portal; and

PZ-controlled Deployment of Workloads to Tenant VMs (e.g., UC104A, UC104B).

In some embodiments, a PES framework implements the systems and micro-services described in TABLE 9 of the Appendix. TABLE 9 indicates potential implementations for the various systems, though it should be appreciated that these potential implementations are presented by way of example only, and that embodiments are not limited to use with these specific implementations. It should be noted that the potential implementations in TABLE 9 assume that Virtustream is the PPP, and thus that the Partner Directory is a VPD, the PES framework utilizes VEC, etc. Again, this is presented by way of example only.

The Partner Directory LDAP Server, which may be a VPD LDAP Server, provides a single source of truth for managed environments (e.g., to reflect ownership, PES activation status, etc.), organizations, users, groups, etc. in PES. Therefore, in some embodiments it is assumed that the Partner Directory (e.g., VPD) will store and provide information for: (i) all PZs, CSEs and CEs along with ownership attributes; (ii) partner companies and organizations on-boarded to PES, possibly with attributes for certification status; (iii) business units or other entities of the partners that own PZs; (iv) the PPP (e.g., as PES provider and partner); (v) business units or other entities of the PPP, either as "partners" of the PES framework or as PES maintainers; (vi) customers on-boarded to PES; (vii) PES activation status for CEs; (viii) partner activation status for CEs; (ix) PES Admins and users of the PPP, customers and partners with globally unique user identifiers (UIDs) that may also be used, for example, as local tenant VM account names; (x) groups expressing access rights for the PES framework and its capabilities.

In some embodiments, it is further assumed that the Partner Directory (e.g., VPD) provides an LDAP tree. It should be noted that embodiments are not limited to use with Microsoft Active Directory as the LDAP. For example, some embodiments may utilize LDAPv3. The Partner Directory will be updated via the PES Manager REST API or the PES Portal, such as by the PES Onboarding Engineer or when a PZ User Admin adds additional users.

The Partner Directory (e.g., VPD) in some embodiments is also secured (e.g., via Secure Sockets Layer (SSL), TLS, etc.) and is not directly exposed to other networks such as the Internet. The Partner Directory (e.g., VPD) in some embodiments is also structured such that relevant parts of its tree can be exposed to other PES networks using the LDAP proxy service (e.g., running as PFS). In such cases, it is assumed that no user passwords will be exposed into PES networks other than the PES-MN, that operational IDs of PES users along with group assignments should be exposed to CSEs only for activated partners, and that operational IDs of PES users along with group assignments should be exposed to PZs but only for the activated partners.

The Partner Directory (e.g., VPD) may also implement a Directory Information Tree (DIT), referred to as a PES-DIT.

Authentication against the Partner Directory (e.g., VPD) may use LDAPv3 authentication protocols such as Simple Authentication and Security Layer (SASL). Some embodiments may also or alternatively use the AAA micro-service for authentication, and LDAP as a AAA user source backend. Therefore, one of the PFSs running in the PES-MN in such embodiments may be a PES AAA service. Some embodiments may further use two-factor or multi-factor authentication.

Figure 37:
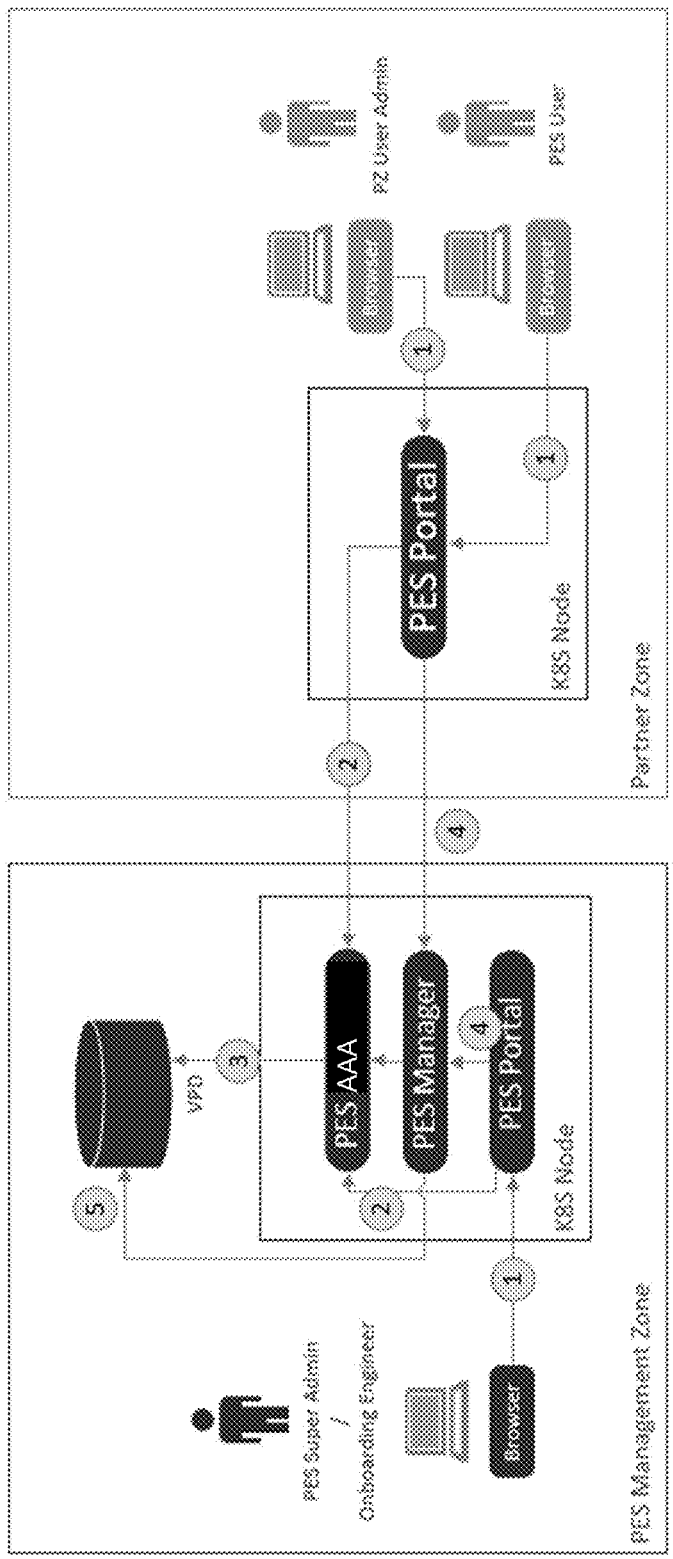
FIG. 37 shows a workflow for performing authentication to a partner directory in a partner enablement services framework in an illustrative embodiment.

FIG. 37 illustrates a workflow for performing authentication in PES. All users (e.g., PES Super Admins, PES Onboarding Engineers, PZ User Admins, PES Users, etc.) authenticate in some embodiments at the PES Portal running in the respective zone as shown in step 1 (FIG. 25 omits the Customer PES Admin case for clarity of illustration, which would work in a similar manner). A client token is fetched from PES AAA which is exposed to the other zones in step 2. The AAA micro-service will authenticate the user using LDAP information of the Partner Directory (shown in FIG. 25 as a VPD) in step 3. The PES Portal authenticates at the PES Manager service via the client token in step 4. The LDAP updates to users are done via the PES Manager. The PES Portal will therefore expose functionality to: (i) change the user password or two- or other multi-factor authentication token; (ii) change a user record, including group assignments (e.g., PES Super Admins, PES Onboarding Engineers, PZ User admins, etc.); (iii) add organizations and organizational units (e.g., PES Super Admins, PES Onboarding Engineers, etc.) and (iv) add authorization groups (e.g., PES Super Admins, etc.). Authorization is performed via the PES Manager Service which looks up group membership in the Partner Directory (e.g., VPD).

Figure 38:
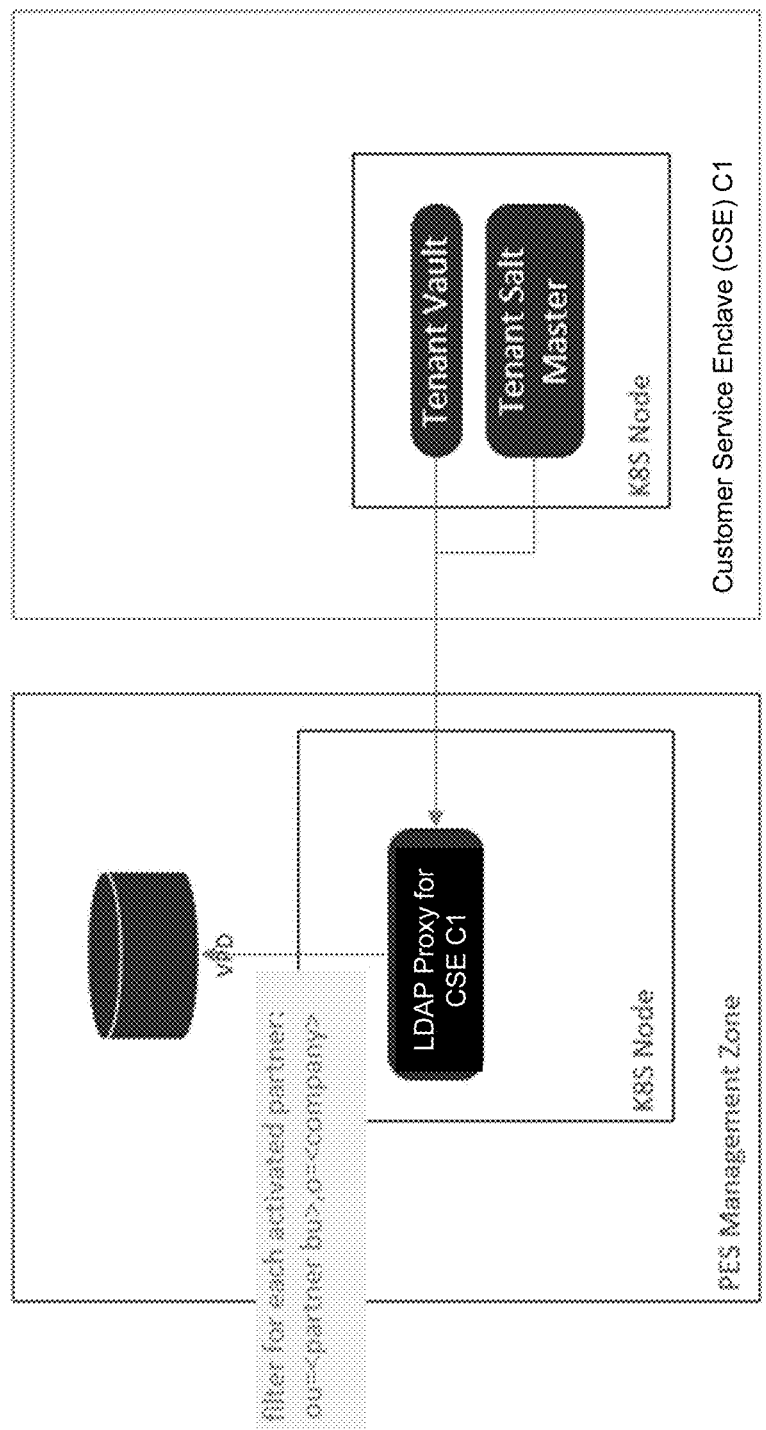
FIG. 38 shows a workflow for exposing operational identifiers to customer service enclaves in an illustrative embodiment.

In order to automatically create local accounts in tenant VMs (e.g., via TSM), and to enable users to request OTPs for the services via the Tenant Vault, the operational IDs of the activated partners will be exposed to the respective CSEs via the LDAP proxy service as illustrated in FIG. 38. By running the LDAP proxy service in the PES-MN and not in the CSEs, there is no need to expose the Partner Directory LDAP to any outside network.

TABLE 10 in the Appendix defines which PES components fulfill requirements for various ones of the use cases described herein, with the exception of component 5 (K8S clusters), which are assumed to be used throughout the PES framework in some embodiments.

In some embodiments, PES components fall into one of the following layers:

1. IaaS including networking for PES Environments;
2. PES-MN Container Orchestration (K8S) and CI/CD;
3. Partner Directory (e.g., VPD) and Identity Management;
4. Network Control Plane (e.g., SDP, VPNs, VPC peering, etc.);
5. PZ and CSE Container Orchestration (K8S) and CI/CD;
6. Service Control Plane;
7. Management including activation framework;
8. Capabilities, including: (on demand) Jump Hosts; (SAPRouter) TAS; PCS; Salt Infrastructure; VEC or other CE Tenant Creation; and
9. Presentation.

TABLE 11 in the Appendix illustrates examples of components in the various layers 1 through 9, along with examples of implementation solutions for such components. It should be appreciated, however, that the particular implementation solutions listed in TABLE 11 are presented by way of example only, and that embodiments are not limited to use with these specific solutions.

Figure 39:
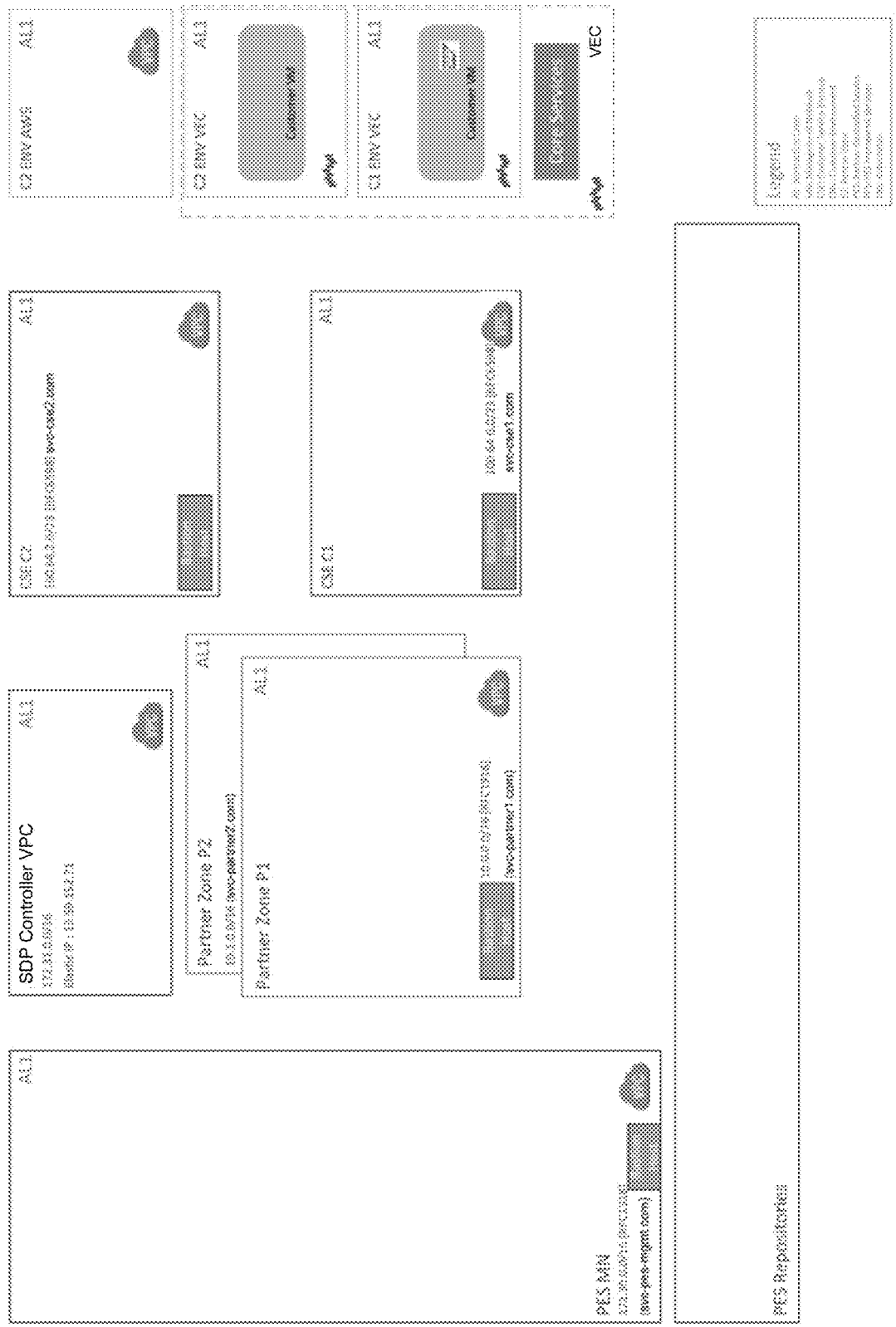
FIG. 39 shows a partner enablement services Infrastructure-as-a-Service abstraction layer in an illustrative embodiment.

Each of the layers 1 through 9 will now be described in further detail. FIG. 39 shows a PES IaaS abstraction layer (e.g., layer 1). This abstraction layer comprises all IaaS services for PES environments (e.g., PES-MN, PZs, CSEs, SDP controller, Repositories if they utilize IaaS and are not provided as SaaS, etc.) along with the CEs that are to be connected to the PES framework, including the basic networking of these environments (such as network segments, DNS domains, external IP addresses, etc.) but not the interconnectivity which is reserved for abstraction layer 4. In some embodiments, network segments for PZs, the SDP controller and PES-MN follow RFC1918, while the CSE networks will follow RFC6598 to avoid overlap with customer networks. These IP address ranges provide 4 million IP addresses (e.g., 10.64.0.0/10) and are "reserved" for service providers. The CSE IP ranges, in some embodiments will not overlap with PPP CSE IP address ranges (e.g., VEC CSE/TSS IP address ranges). CEs are defined in some embodiments as respective sets of contiguous networks combined with all parameters that sufficiently specify how to connect to these from a PES CSE.

In some embodiments, AWS environments are used as illustrated in TABLE 11. It is assumed in such embodiments that all AWS environments are separate (e.g., different AWS Virtual Private Clouds (VPCs)). AWS supports a maximum number of VPCs times security groups not exceeding 10,000 per region (e.g., which allows for 2000 VPCs with a maximum of 5 security groups per region). All AWS VPCs have a private and public subnet. The public subnet is used for outbound access to required services. It is also required for the "utility subnet" from a Kubernetes Operations (kops) perspective (e.g., in topology, "private").

In some embodiments, each PZ and CSE subnet will be /24. If a partner or customer needs a larger IP address range, the PPP (e.g., Virtustream) may offer an upgrade service to enlarge the PZ or CSE address range as desired.

All environments that will host K8S clusters in some embodiments are provided with Bastion Hosts for management purposes. These may be Ubuntu VMs to which administrators will authenticate via SSH key. In the description that follows, it is assumed that there are two PZs and two customers (e.g., C1 and C2) operating on VEC, with customer C2 also operating on AWS in addition to VEC. VEC and AWS for C1 and C2 thus represent different CEs. Although in this instance the CEs are cloud environments, it should be appreciated that CEs are not required to be cloud environments. TABLE 12 in the Appendix shows a set of settings for PES environment IP address ranges. In TABLE 12, /16 Classless Inter-Domain Routings (CIDRs) are used for the PZ for practical reasons (e.g., in case there is a requirement for more than two subnets in a PZ). Other types of CIDRs (e.g., /20 or/21) may be used in other embodiments.

Figure 40:
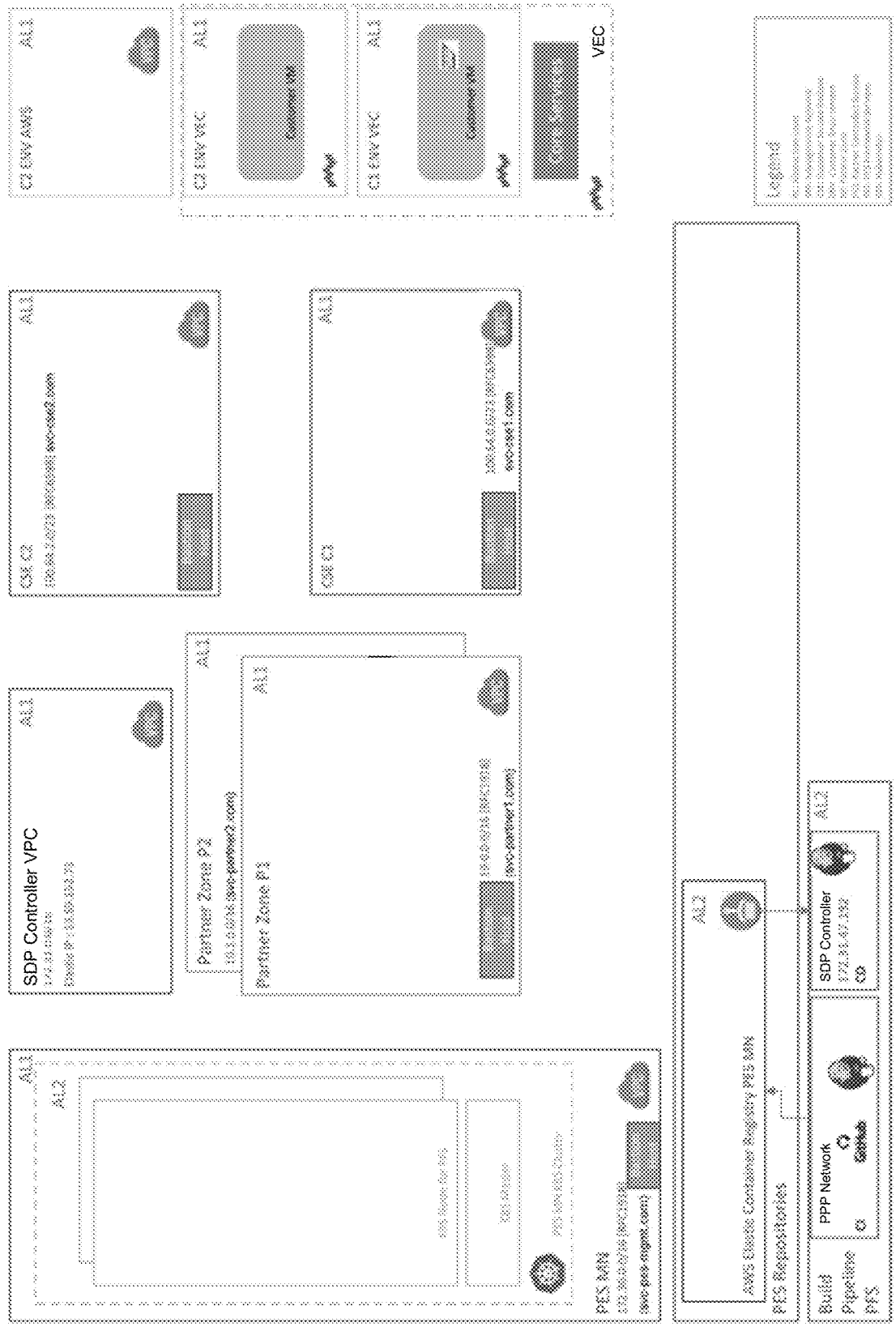
FIG. 40 shows a partner enablement services management network container orchestration abstraction layer in an illustrative embodiment.

FIG. 40 shows a PES-MN Container Orchestration abstraction layer (e.g. layer 2). In some embodiments, all PFSs that are enabled to run in Docker containers will run in the PES-MN K8S cluster. On AWS, this cluster may be provisioned via kops. In some cases, the minimal setup includes one master and one worker node. Each POD that needs to be externally accessible may be exposed via AWS ELB in some embodiments, which automatically maps the POD's IP address. This is achieved by annotations in the respective POD deployment YAML file. Also, in some embodiments the load balancers are bound to private subnets only. This keeps setup as simple as possible, despite ELB-related limits. Alternative setups such as ingress controllers (e.g., HyperText Transfer Protocol (HTTP)/HTTP Secure (HTTPS) only), direct POD access, or other extensions (e.g., ingress-nginx, K8S ingress ELB combinations, etc.) may also be used. The K8S cluster will be managed via a Bastion Host to which admins have access via an SDP controller (e.g., Cyxtera AppGate), described in further detail below in connection with abstraction layer 4.

PFS container images, in some embodiments, are stored in an AWS Elastic Container Registry (ECR) account dedicated to the PES-MN. These images may be built via the Build Pipeline for PFS. In some embodiments, this pipeline is split between CI in a PPP network (e.g., GitHib plus lab Jenkins) and CD on AWS (e.g., Jenkins in the SDP controller VPC with access to all relevant VPCs). This split is due to a lack of connection between the PPP network and AWS, but if they are suitably connected the pipeline need not be split.

Figure 41:
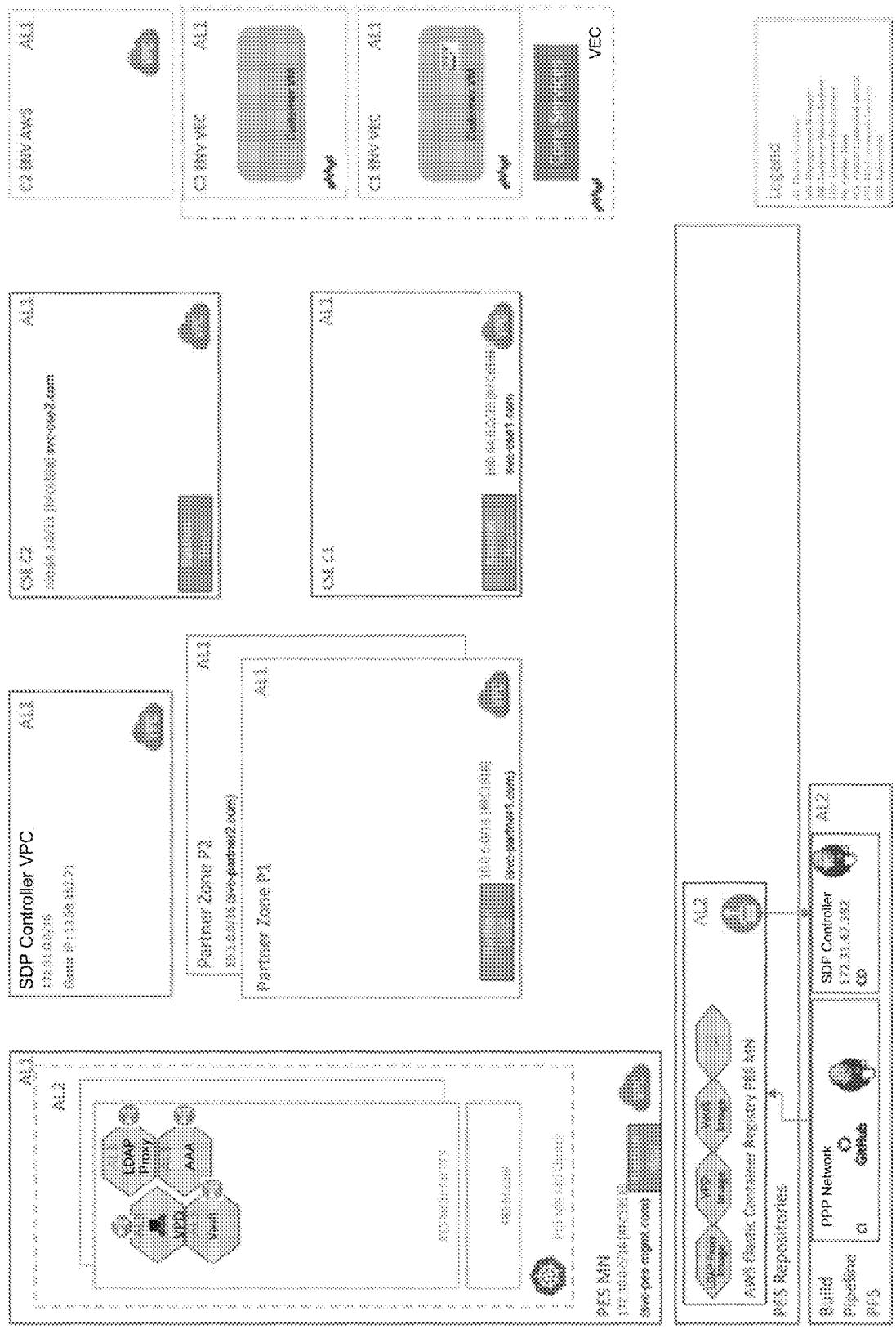
FIG. 41 shows a partner enablement services partner directory and identity management abstraction layer in an illustrative embodiment.

FIG. 41 shows a Partner Directory and Identity Management abstraction layer (e.g., layer 3). In some embodiments, VPD provides the Partner Directory. This abstraction layer covers the identity management (IM) of PES. The VPD or other Partner Directory, in some embodiments, is hosted as an OpenLDAP POD in the PES-MN. The Partner Directory is the LDAP backend of both the SDP (see abstraction layer 4 described in further detail below) and the AAA service which is used for user authentication to the PES Portal in some embodiments.

As noted above, in some embodiments an authentication service for the PES Portal utilizes an AAA micro-service that implements the OAuth 2.0 authorization protocol. In terms of OAuth, the client will be the PES Portal or any REST Client of the PES Manager (see abstraction layer 7 described in further detail below) which will be the resource owner. As the AAA micro-service is the authorization server, its authentication endpoint must be exposed to other PES environments in which PES Manager clients are running (e.g., PZs, CSEs). In some implementations, PES utilizes Javascript Object Notation (JSON) Web Tokens (JWT). The AAA micro-service, in some embodiments, also acts as an authentication server for additional REST APIs exposed from the PES-MN.

The AAA micro-service in some embodiments supports various client integration workflows. As an example, the PES Portal design described elsewhere herein provides details for a portal-specific workflow.

Each PES Manager request will be protected by a AAA-issued token in some embodiments. The PES Manager will contact the AAA micro-service (e.g., via a PES-MN internal communication) to request context information of the client or user account. Rule-based and fine-grained authorization may be provided using a Rules Engine micro-service.

In some embodiments, the tenant functionality of the AAA micro-service is not leveraged for PES. Instead, partner and customer registration as well as user management may be performed via the PES Manager REST API. From the AAA micro-services' perspective, all users would be under a single tenant. The users will authenticate with that tenant's domain as part of the login.

In some embodiments, the LDAP proxy service is used as a "Virtual Directory Service" acting as a façade to LDAP directories. In PES, the LDAP proxy service may be used to expose specific parts of the Partner Directory into PES environments. For example, the LDAP tree of a partner could be exposed to the partner's PZ so that services running in this PZ could leverage Partner Directory information. In this way, the Partner Directory does not have to be exposed outside of the PES-MN. In some cases, the SDP controller is exposed outside of the PES-MN as described elsewhere herein.

In some embodiments, Hashicorp Vault is utilized as a credentials store. Some specific use cases for Vault include the secure storage of certificates (e.g., Google two-factor authentication certificates of PES users).

Figure 42:
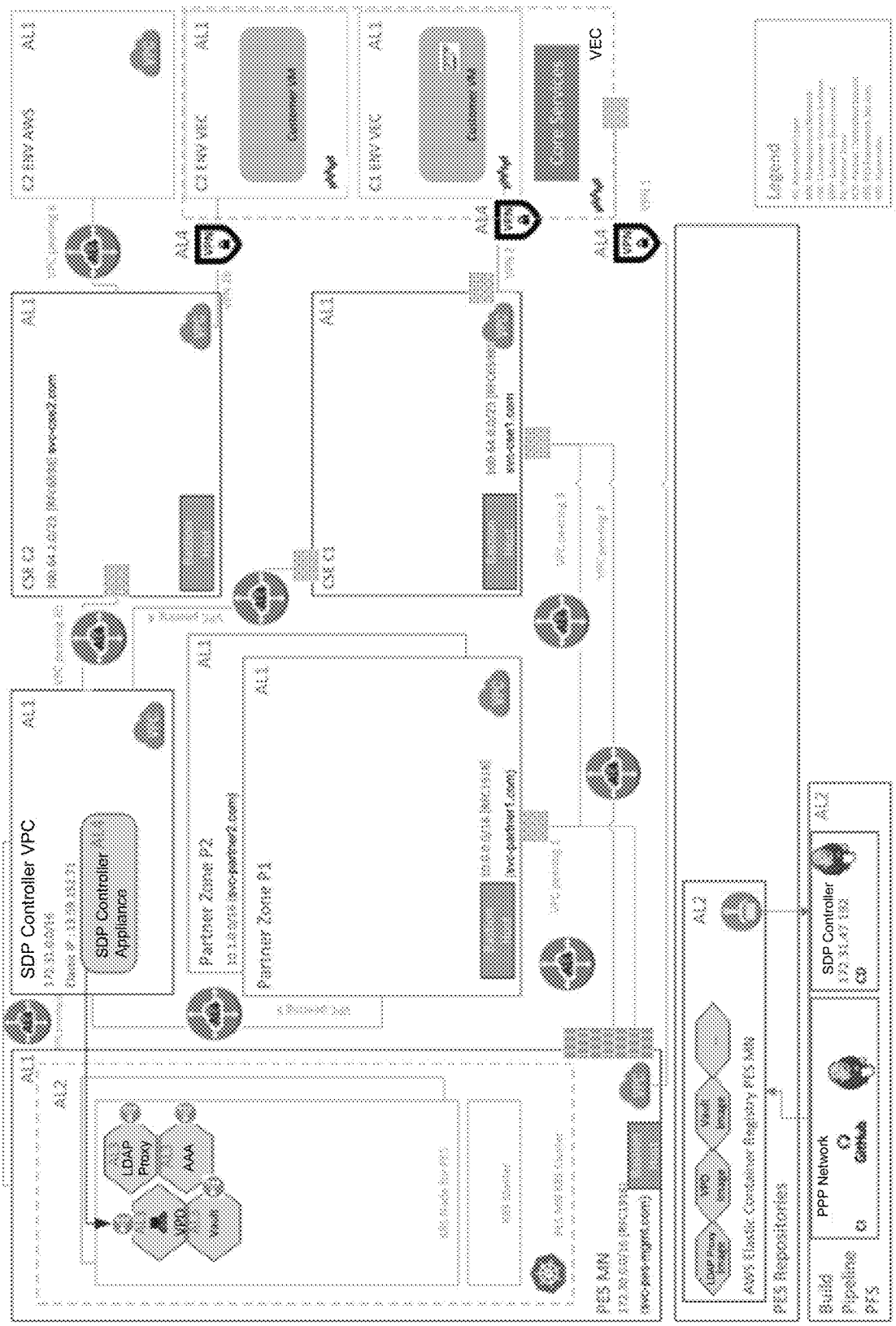
FIG. 42 shows a partner enablement services network control plane abstraction layer in an illustrative embodiment.

FIG. 42 shows a Network Control Plane abstraction layer (e.g., layer 4). This abstraction layer covers the control plane controlling all connectivity between PES environments as well as PES environments and CEs. This control plane consists of multiple APIs to manage: SDP (e.g., via AppGate or another suitable SDP controller); VPC Peerings including Security Groups; and Virtual Private Networks (VPNs) (e.g., SD-WAN, IPsec, etc.) and related firewalls.

Access to PES environments in some embodiments is controlled via the SDP controller, which uses the Partner Directory as the user authentication back-end. The SDP controller may be configured to enforce two- or other multi-factor authentication during user authentication. VPC Peerings may be secured with AWS Security Groups configured with a deny-all default policy.

The CMDB of the IP networks, in some embodiments, utilizes an IP Address Management (IPAM) solution such as NIPAP running in the PES-MN K8S cluster. In some embodiments, the VPC Peerings shown in TABLE 13 of the Appendix are utilized. All services exposed by a partner from a PZ will be accessible by all activated partners of customers to which the partner has access as a result of VPN Peerings 3 and 3b in TABLE 13. TABLE 14 in the Appendix shows examples of VPN connections utilized in some embodiments.

Figure 43:
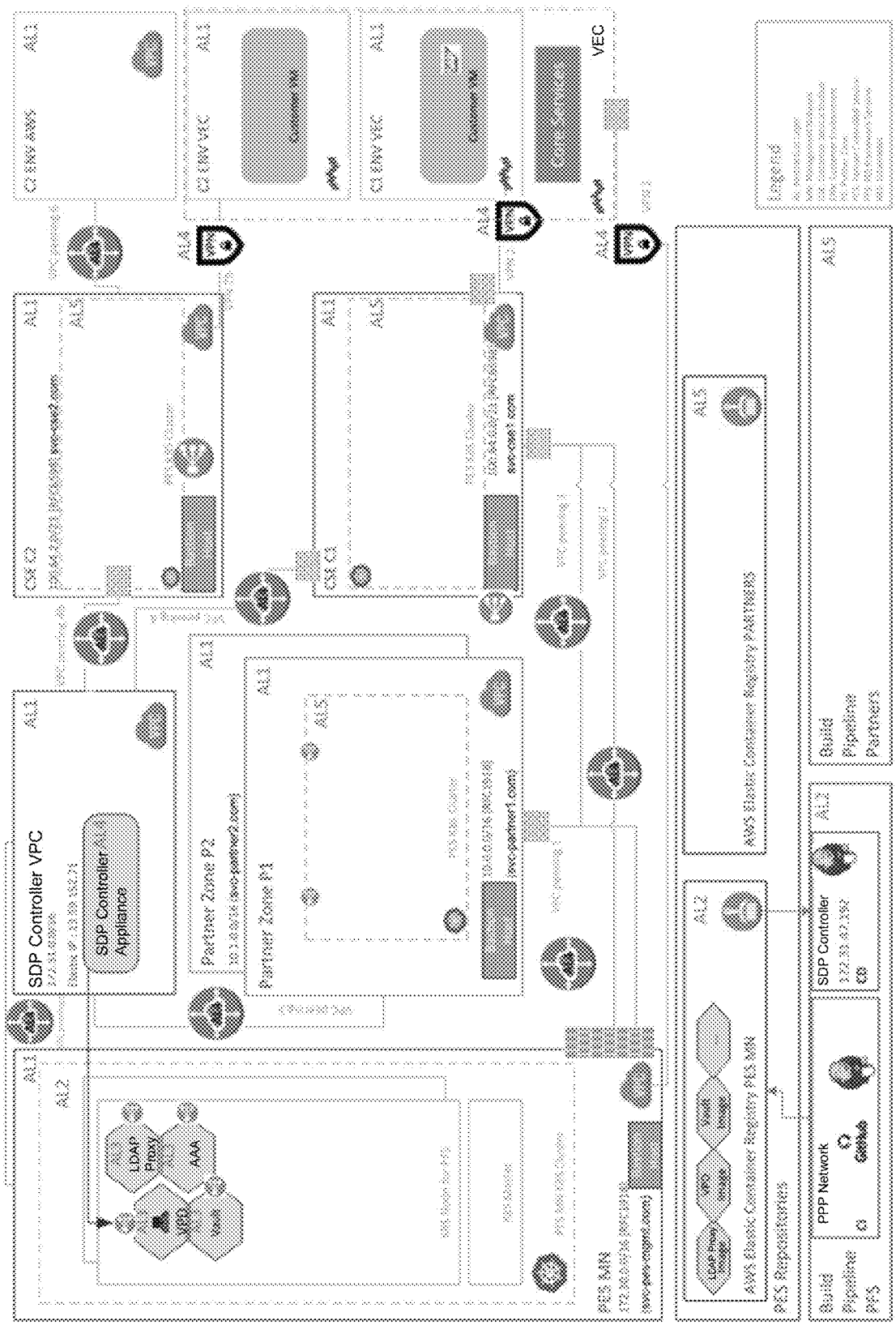
FIG. 43 shows a partner enablement services partner zone and customer service enclave container orchestration abstraction layer in an illustrative embodiment.

FIG. 43 shows a PZ and CSE Container Orchestration abstraction layer (e.g., layer 5). In some embodiments, all PAS, PCS and TAS that are enabled to run in Docker containers will run in the K8S clusters of the respective environment. On AWS, these clusters may be provisioned via kops. The minimal setup in some embodiments is one master and one worker node. In some embodiments, each POD that needs to be externally accessible will be exposed via AWS ELB which automatically maps the POD's IP address. The K8S clusters may be managed via Bastion Hosts to which admins have access via the SDP controller (see abstraction layer 4 discussed above).

PAS, TAS and PCS container images may be stored in ECR accounts dedicated to the appropriate partner/customer combination. These images may be built via a Build Pipeline for Partners.

Figure 44:
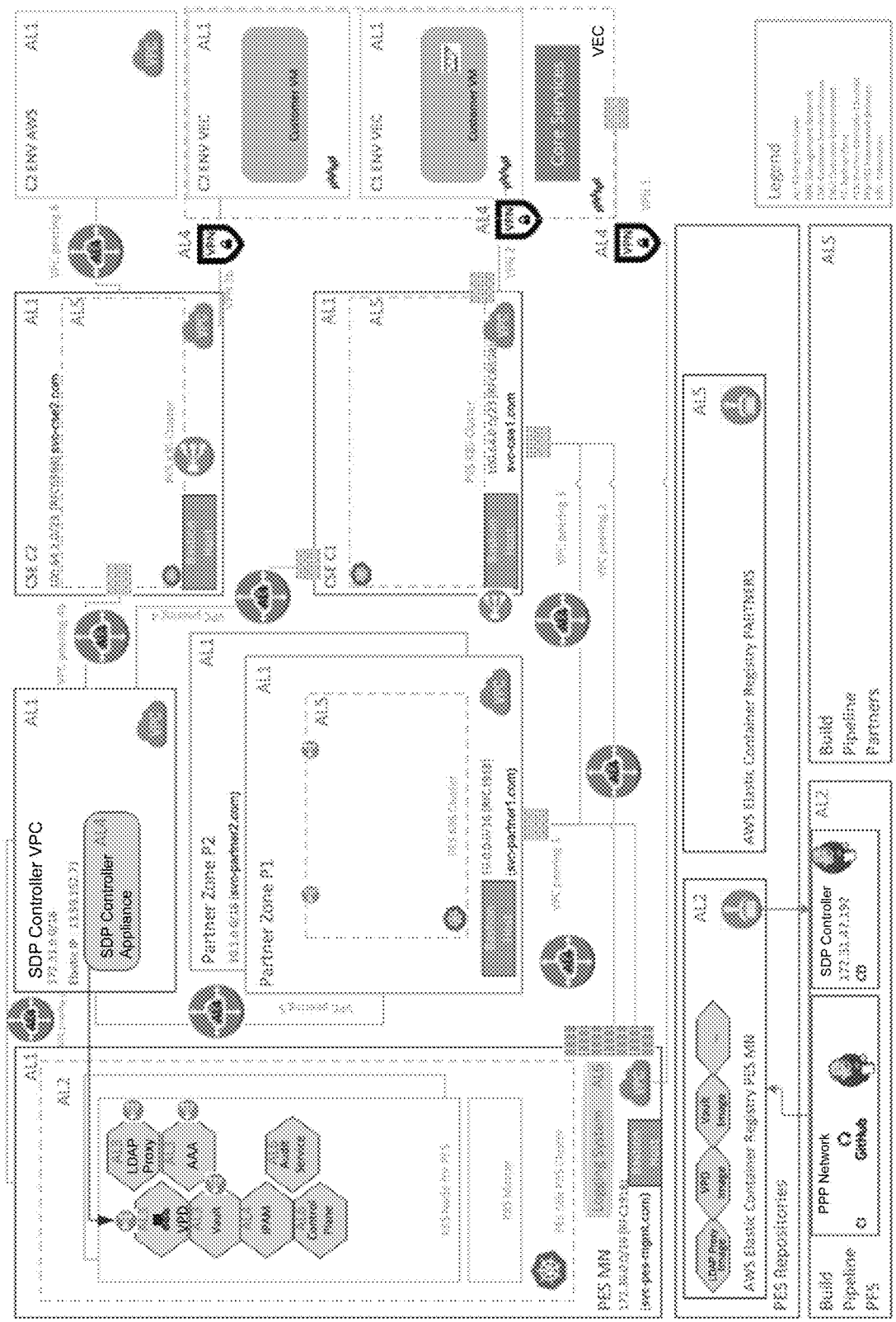
FIG. 44 shows a partner enablement services control plane abstraction layer in an illustrative embodiment.
Figure 45:
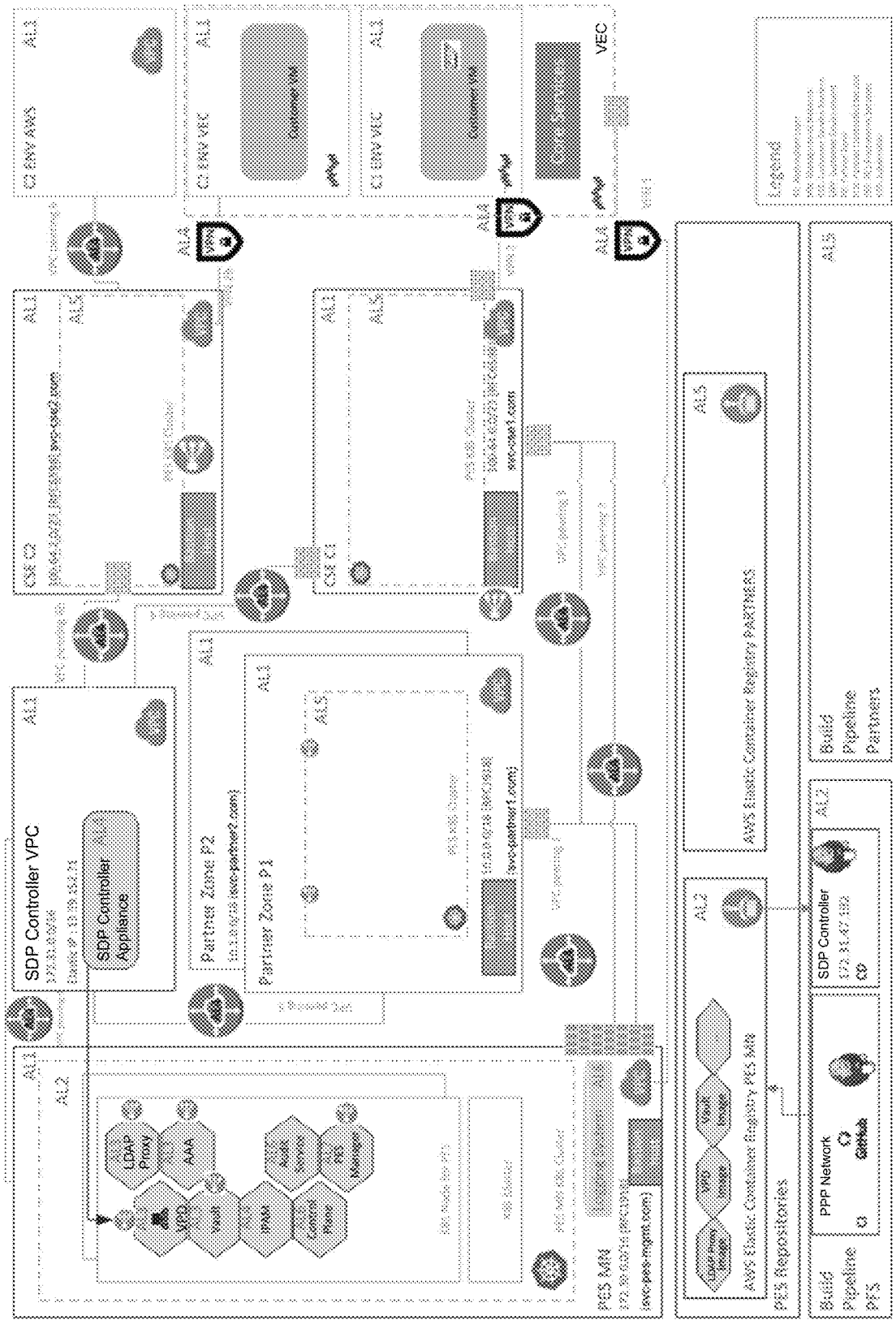
FIG. 45 shows a partner enablement services management abstraction layer in an illustrative embodiment.

FIG. 44 shows the Service Control Plane abstraction layer (e.g., layer 6), and FIG. 45 shows the Management and Activation Framework abstraction layer (e.g., layer 7). The Management and Activation Framework abstraction layer concerns the PES Manager and its entities, including customers, partners, users, groups, environments, capabilities (and instances), capability authorization, and policies. The PES manager in some embodiments runs as PODs in the PES-MN K8S cluster, and exposes a REST API that is accessible from the PZs and CSEs. Activations of partners, environments, etc. will happen through this REST API in some embodiments. Partners also consume capabilities via this REST API (e.g., via scripts, via the PES Portal, etc.).

Figure 46:
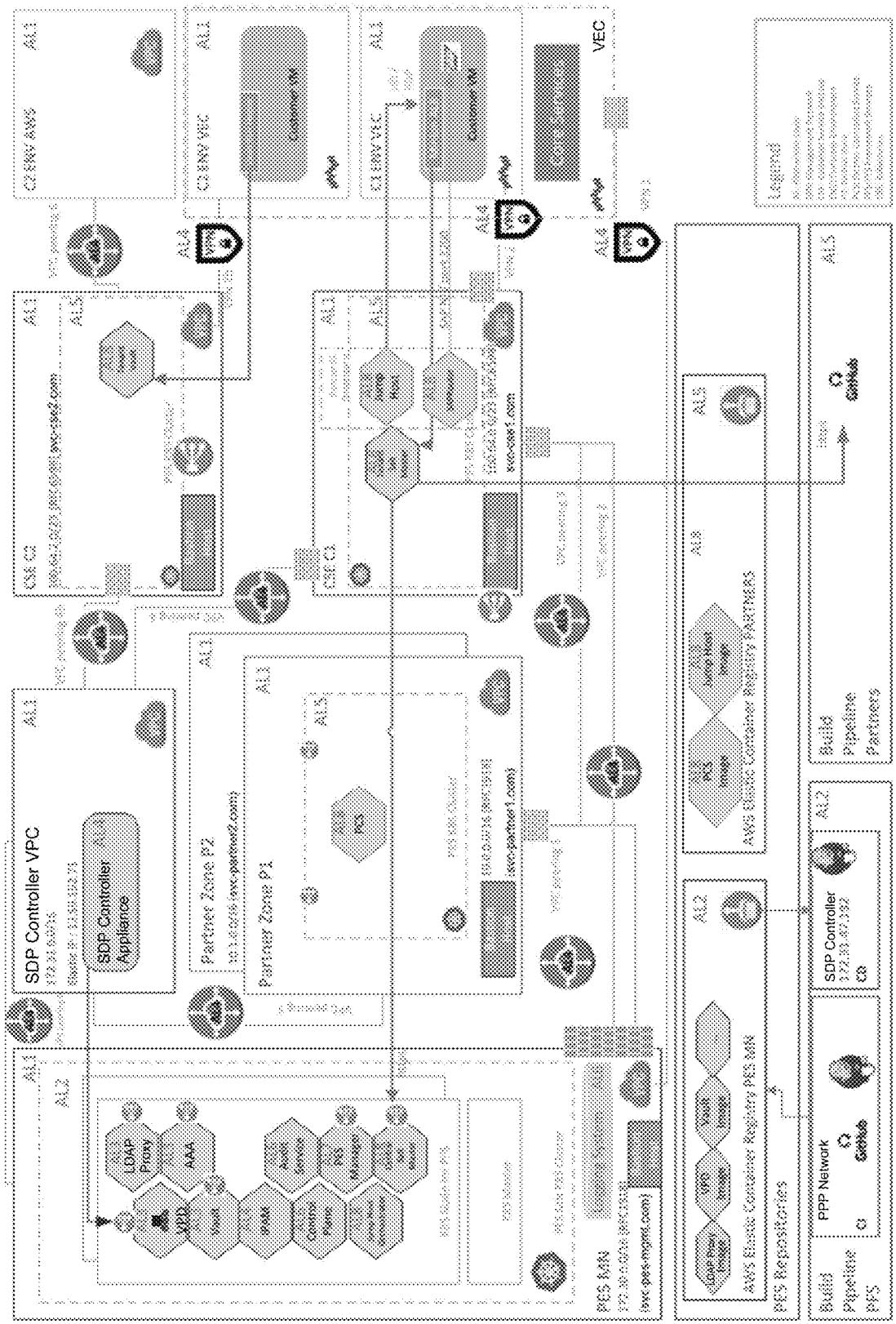
FIG. 46 shows a partner enablement services capabilities abstraction layer in an illustrative embodiment.

FIG. 46 shows a PES Capabilities abstraction layer (e.g., layer 8). This abstraction layer covers all artifacts, PODs and other resources that provide PES capabilities and are not assigned to another abstraction layer. For example, this abstraction layer includes: PODs running in the PES-MN such as the Central Salt Master; PCS PODs running in the PZs; Jump Hosts or TSMs running in the CSEs; services deployed on the CEs; container images in the partner/customer ECR; etc.

Figure 47:
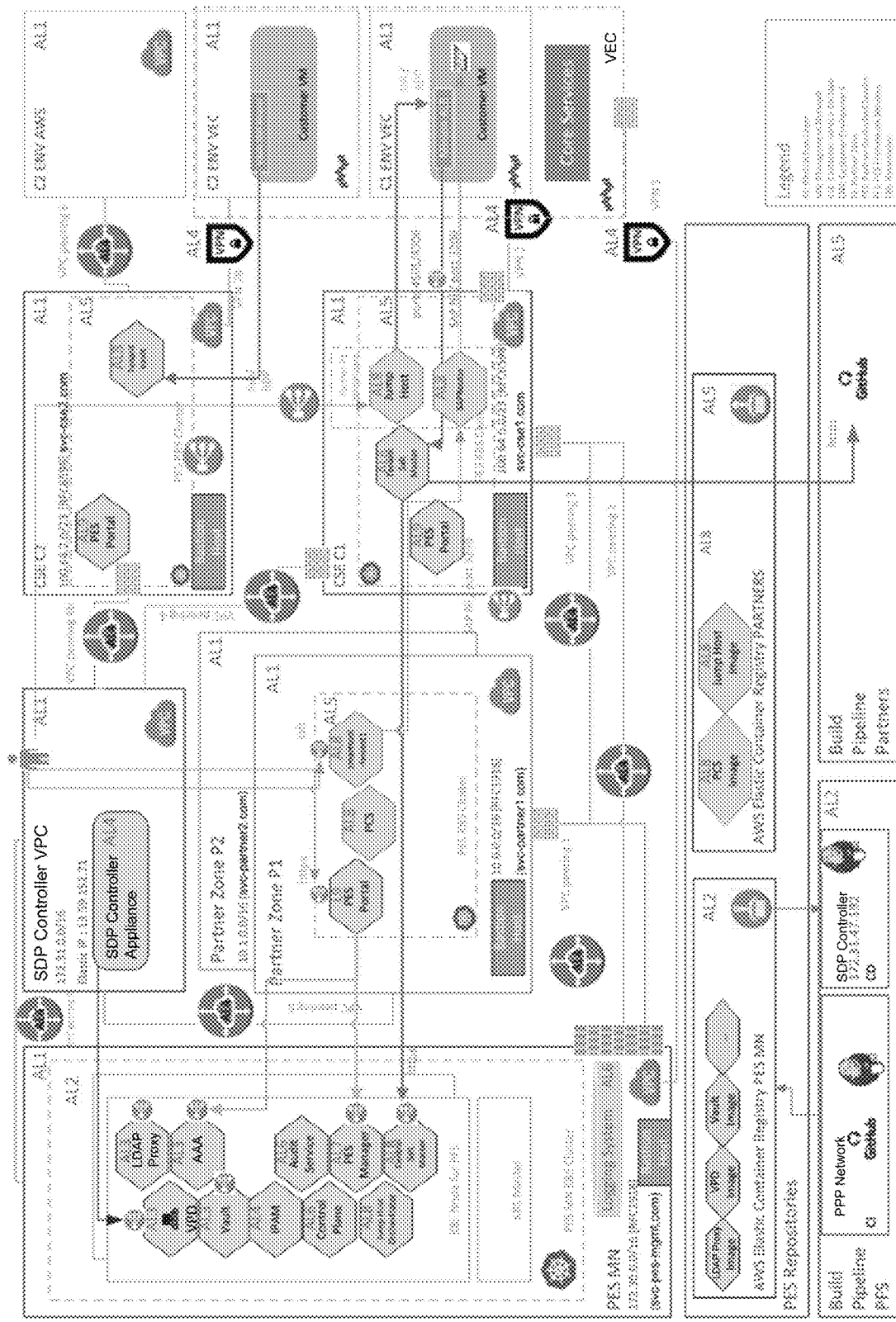
FIG. 47 shows a partner enablement services presentation abstraction layer in an illustrative embodiment.

FIG. 47 shows a PES Presentation abstraction layer (e.g., layer 9). This abstraction layer provides the PES Portal. In some embodiments, the PES Portal runs as PODs in the K8S clusters of PZs for partners, and in the CSEs for customers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for partner enablement services for managed service automation will now be described in greater detail with reference to FIGS. 48 and 49. Although described in the context of system 100, these platforms may also be used to implement at least portions of other information processing systems in other embodiments.

Figure 48:
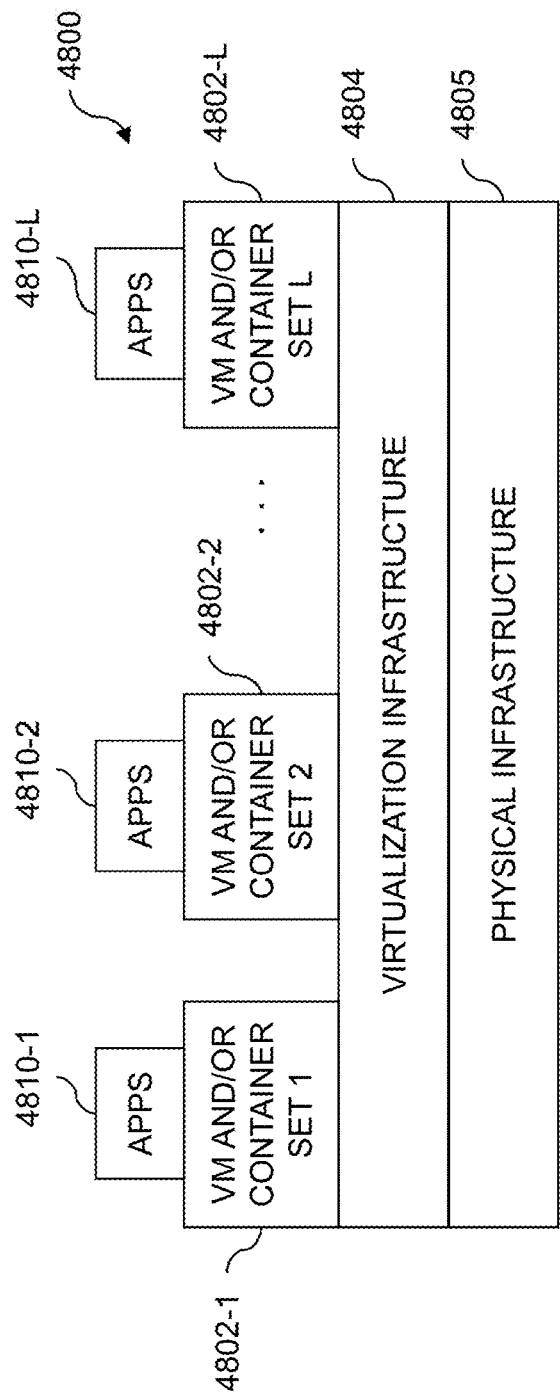

FIG. 48 shows an example processing platform comprising cloud infrastructure 4800. The cloud infrastructure 4800 comprises a combination of physical and virtual processing resources that may be utilized to implement at least a portion of the information processing system 100. The cloud infrastructure 4800 comprises multiple VMs and/or container sets 4802-1, 4802-2, . . . 4802-L implemented using virtualization infrastructure 4804. The virtualization infrastructure 4804 runs on physical infrastructure 4805, and illustratively comprises one or more hypervisors and/or operating system level virtualization infrastructure. The operating system level virtualization infrastructure illustratively comprises kernel control groups of a Linux operating system or other type of operating system.

The cloud infrastructure 4800 further comprises sets of applications 4810-1, 4810-2, . . . 4810-L running on respective ones of the VMs/container sets 4802-1, 4802-2, . . . 4802-L under the control of the virtualization infrastructure 4804. The VMs/container sets 4802 may comprise respective VMs, respective sets of one or more containers, or respective sets of one or more containers running in VMs.

In some implementations of the FIG. 48 embodiment, the VMs/container sets 4802 comprise respective VMs implemented using virtualization infrastructure 4804 that comprises at least one hypervisor. An example of a hypervisor platform that may be used to implement a hypervisor within the virtualization infrastructure 4804 is the VMware® vSphere® which may have an associated virtual infrastructure management system such as the VMware® vCenter™. The underlying physical machines may comprise one or more distributed processing platforms that include one or more storage systems.

In other implementations of the FIG. 48 embodiment, the VMs/container sets 4802 comprise respective containers implemented using virtualization infrastructure 4804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 4800 shown in FIG. 48 may represent at least a portion of one processing platform. Another example of such a processing platform is processing platform 4900 shown in FIG. 49.

The processing platform 4900 in this embodiment comprises a portion of system 100 and includes a plurality of processing devices, denoted 4902-1, 4902-2, 4902-3, . . . 4902-K, which communicate with one another over a network 4904.

The network 4904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 4902-1 in the processing platform 4900 comprises a processor 4910 coupled to a memory 4912.

The processor 4910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 4912 may comprise random access memory (RAM), read-only memory (ROM), flash memory or other types of memory, in any combination. The memory 4912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 4902-1 is network interface circuitry 4914, which is used to interface the processing device with the network 4904 and other system components, and may comprise conventional transceivers.

The other processing devices 4902 of the processing platform 4900 are assumed to be configured in a manner similar to that shown for processing device 4902-1 in the figure.

Again, the particular processing platform 4900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for partner enablement services in managed service automation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, clouds, micro-services, container types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

APPENDIX

TABLE 1

| PES Framework Actors | | |
| --- | --- | --- |
| Actor | Function | Affiliation |
| Customer PES Admin | Manages the activation and deactivation of PES as well as single partners for the customer ("partner activation"); also authorizes partners to use selected PES capabilities | Customer |
| PES Auditor | Reviews partner users and authorizations as well as audit records for access to the customer's environment as well as existing routes from PES-MN and PZs to the CEs including allowed ports | Customer/ Partner/ PPP |
| PZ IaaS Admin | Manages the PZ (e.g., via xStream) | Partner |
| PZ Service Admin | Deploys and manages PCS running in the PZ; publishes services to VS which need to run in the CSEs | Partner |
| PZ User Admin | Manages the users of the partner and their authorizations | Partner |

TABLE 1-continued

PES Framework Actors

| Actor | Function | Affiliation |
|---|---|---|
| PES User | Leverages a PES Capability exposed to the partner (e.g., a generic user of a partner organization) | Partner |
| PES Support | Maintains and supports CSEs and PZs | PPP |
| PES Super Admin | Manages the PES-MN IaaS and configures the PES framework (e.g., partner framework services in PES-MN including Software Defined Perimeter services as well as PAS and TAS) | PPP |
| PES Repository Admin | Manages the artifacts in the PES Repository; validates artifacts coming from the partner | PPP |
| PES Policy Admin | Manages the PES policies in accordance with the Service Governance Model | PPP |
| PES Onboarding Engineer | Creates the PZ and all required initial configurations for a partner including update of the Partner Directory; also registers customers who want to participate and deploys the CSEs | PPP |
| Customer PES Admin | Manages the activation and deactivation of PES as well as single partners for the customer (e.g., partner activation); also authorizes partners to use selected PES capabilities | Customer |
| PES Auditor | Reviews partner users and authorizations as well as audit records for access to the customer's environment as well as existing routes from PES-MN and PZs to the CEs including allowed ports | Customer/ Partner/ PPP |

TABLE 2

PES-Related Relationships

| Party 1 | Party 2 | Relationship and Responsibilities |
|---|---|---|
| PPP | Customer | The PPP provides the PES framework to customers so that they can leverage 1) the efficiency gains and 2) security gains when consuming partner services; the PPP is responsible for the framework including authorization, security and auditability but not for the actions performed by the partners on customer assets; The PPP is responsible for the CSEs but charges the IaaS costs to the customer; As a special case, the PPP may be like a partner when providing managed services (the personnel has a PZ, etc.) |
| PPP | Partner | The PPP provides to certified and registered partners: 1) the PES framework including PAS; 2) a PZ on a cloud of the PPP; 3) Routes to the CSEs; 4) TAS hosted in the CSEs; and 5) PES Capabilities. All services are described and charged via PES SKUs. The partner is responsible for all workloads running on the PZ not counting as PAS, such as PCS. |
| Partner | Customer | The partner provides managed services to customers on the cloud environment operated by the PPP and non-PPP cloud environments, both of which use the PES framework to streamline the delivery of these services. |

TABLE 3

PES Service Types and Governance

| Service Type | Short Form | Definition | Examples | Owner |
|---|---|---|---|---|
| Tenant Admin Service | TAS | Service used for administrative purposes in the context of managed services for a particular tenant. | Tenant SALT Master; Tenant Vault; Jump Host; App Controller | PPP |
| Partner Admin | PAS | Service used for administrative purposes in | PES Portal; LDAP Proxy (LDAP | PPP |

TABLE 3-continued

PES Service Types and Governance

| Service Type | Short Form | Definition | Examples | Owner |
|---|---|---|---|---|
| Service | | the context of PES for a particular partner | exposure of the Partner Directory) | |
| Partner Framework Service | PFS | Central Services used for the PES framework | Partner Directory; PES Management Services; PES Policy Engine; PES Vault; PES Audit System; PES Central Log; Jump Host Orchestrator | PPP |
| Partner Controlled Service | PCS | Service used for delivery of managed services to the customer | Onapsis server for SAP compliance | Partner |

TABLE 4

PES-related Environments and Governance

| Service Type | Short Form | Definition | Platform Owner | Platform Consumer | Workload Owner |
|---|---|---|---|---|---|
| Customer Environment | CE | Cloud environment hosting customer workloads | VEC, AWS, Azure, GCP, etc. | Customer | Customer |
| Customer Service Enclave | CSE | Cloud environment hosting TAS; it is a controlled zone into the CE | VEC, AWS, Azure, GCP, etc. | Customer | PPP |
| Partner Zone | PZ | Cloud environment hosting PAS and partner-controlled workloads such as SaaS components | PPP | Partner | PPP for PAS, partner for others |
| PES Management Network | PES-MN | Cloud environment hosting PFS and other central PES components such as the Partner Directory | PPP | PPP | PPP |

TABLE 5

Activation of Routes between PES-related Environments

| Use Case Variant | Action | PES-MN | PZ | CSE | CE |
|---|---|---|---|---|---|
| A | Onboard Customer | X | | X | |
| B | Activate PES for CE | | | X | X |
| C | Onboard Partner | X | X | | |
| D | Activate Partner for CSE | | X | X | |

TABLE 6

Activation of Routes between PES-related Environments

| No. | From | To | Initiator | Controller | User | Justification |
|---|---|---|---|---|---|---|
| 1N | PES-MN | PZ P1 | PPP (after partner P1 onboarding) | PPP | PPP | PPP needs to deploy and manage PAS containers in PZ P1 (e.g., CP 10) via a PES-MN K8S ControlPlane service |
| 1S | PZ P1 | PES-MN | PPP (after partner P1 onboarding) | PPP | Partner P1 (via PPP micro-services) | PES containers running in PZ P1 need to access services in PES-MN, for example the PES Portal container. See also CP06. |
| 2N | PES-MN | PZ P2 | PPP (after partner P2 onboarding) | PPP | PPP | Container deployment of PAS in PZ P2 via PES-MN K8S control |
| 2S | PZ P2 | PES-MN | PPP (after partner P2 onboarding) | PPP | Partner P2 (via PPP micro-services) | PES containers running in PZ P2 need to access services in PES-MN. |
| 3S | PZ P1 | CSE C1 | PPP (after C1 admin triggered | PPP, C1 | Partner P1 | Partner P1 provides services to C1 and needs to connect to certain TAS running in |

TABLE 6-continued

Activation of Routes between PES-related Environments

| No. | From | To | Initiator | Controller | User | Justification |
|---|---|---|---|---|---|---|
| | | | activation of partner P1) | | | CSE C1 such as On Demand Jump Hosts. |
| 3N | CSE C1 | PZ P1 | PPP (after C1 admin triggered activation of partner P1) | PPP, C1 | Partner P1 | Partner P1 provides services to C1 and runs services in C1's CSE that need to connect to P1's software running in PZ P1 (cf. CP05). |
| 4S | PZ P1 | CSE C2 | PPP (after C2 admin triggered activation of partner P1) | PPP, C2 | Partner P1 | Partner P1 provides services to C2 and needs to connect to certain TAS running in CSE C2 such as On Demand Jump Hosts. |
| 4N | CSE C2 | PZ P1 | PPP (after C2 admin triggered activation of partner P1) | PPP, C2 | Partner P1 | Partner P2 provides services to C2 and runs services in C2's CSE that need to connect to P1's software running in PZ P1. |
| 5S | PZ P2 | CSE C2 | PPP (after C2 admin triggered activation of partner P2) | PPP, C2 | Partner P2 | Partner P2 provides services to C2 and needs to connect to certain TAS running in CSE C2 such as On Demand Jump Hosts. |
| 5N | CSE C2 | PZ P2 | PPP (after C2 admin triggered activation of partner P2) | PPP, C2 | Partner P2 | Partner P2 provides services to C2 and runs services in C2's CSE that need to connect to P2's software running in PZ P2. |
| 6N | CSE C1 | C1 VEC Network | PPP (after C1 admin activated PES for PPP network) | PPP, C1 | All activated partners | Partners provide services to C1 and need to connect from Jump Hosts running in CSE C1 to C1's tenant network in PPP (e.g., VEC). See CP02. |
| 6S | C1 VEC Network | TMN C1 | PPP (after C1 admin activated PES for PPP network) | PPP, C1 | All activated partners as well as C1 admins | Partners provide services to C1 and need data from the OSes and applications running in C1's tenant network in VEC (e.g., CP01); these data flow through the CSE; further the C1 admin uses the PES Portal running in the CSE as well (e.g., CP07). |
| 7N | CSE C1 | C1 AWS Network | PPP (after C1 admin activated PES for AWS network) | PPP, C1 | All activated partners | Partners provide services to C1 and need to connect from Jump Hosts running in CSE C1 to C1's tenant network in AWS |
| 7S | C1 AWS Network | CSE C1 | PPP (after C1 admin activated PES for AWS network) | PPP, C1 | All activated partners | Partners provide services to C1 and need data from the OSes and applications running in C1's CE in AWS; this data flows through the CSE |
| 8N | CSE C2 | C2 VEC Network | PPP (after C2 admin activated PES for PPP network) | PPP, C2 | All activated partners | Partners provide services to C2 and need to connect from Jump Hosts running in CSE C2 to C2's tenant network in VEC |
| 8S | C2 VEC Network | CSE C2 | PPP (after C2 admin activated PES for VEC network) | PPP, C2 | All activated partners as well as C2 admins | Partners provide services to C2 and need data from the OSes and applications running in C2's CE in VEC; this data flows through the CSE |
| 9N | CSE C2 | C2 Azure Network | PPP (after C2 admin activated | PPP, C2 | All activated partners | Partners provide services to C2 and need to connect from Jump Hosts running in CSE |

TABLE 6-continued

Activation of Routes between PES-related Environments

| No. | From | To | Initiator | Controller | User | Justification |
|---|---|---|---|---|---|---|
| | | | PES for Azure network) | | | C2 to C2's tenant network in Azure |
| 9S | C2 Azure Network | CSE C2 | PPP (after C2 admin activated PES for Azure network) | PPP, C2 | All activated partners | Partners provide services to C2 and need data from the OSes and applications running in C2's CE in Azure; this data flows through the CSE |
| 10N | PES-MN | CSE C1 | PPP (after C1 was on boarded to PES) | PPP | PPP | PPP needs to deploy and manage TAS containers in the C1 CSE (such as Tenant Vault), see CP09. |
| 10S | CSE C1 | PES MZ | PPP (after C1 was on boarded to PES) | PPP | PPP | Certain TAS running for C1 need to report back to framework services in PES-MN, such as the central log |
| 11N | PES-MN | CSE C2 | PPP (after C2 was on boarded to PES) | PPP | PPP | PPP needs to deploy and manage TAS containers in the C2 CSE (such as Tenant Vault) |
| 11S | CSE C2 | PES MZ | PPP (after C2 was on boarded to PES) | PPP | PPP | Certain TAS running for C2 need to report back to framework services in PES-MN, such as the central log |
| 12N | CSE C2 | VEC C2 | Connection from CSE C2 by Partner P2 client or service in PZ P2 | PPP, C2 | Partner P1 | Partner zone connection through CSE C2 to CE in VEC C2 |
| 13S | P1 EP | PZ P1 | Client connection to PZ P1 by P1 End Point (Client) | PPP, P1 | Partner P1 | Partner tunnel into their partner zone (P1 client to P1 PZ) |
| 14S | P2 EP | PZ P2 | Client connection to PZ P2 by P2 End Point (Client) | PPP, P2 | Partner P2 | Partner tunnel into their partner zone (P2 client to P2 PZ) |

TABLE 7

Partner Easy Access Use Case Scenarios

| ID | Use Case | Scenario |
|---|---|---|
| UC101A | Temporary Jump Host in the CSE with Access from the PZ | S1.1: As a PES User I want to provision a temporary Jump Host in the CSE via the PES Portal; I will assign a comment that explains the reason for access.<br>S1.1B: I will assign an expiration date to the Jump Host so that it gets de-provisioned automatically when expired.<br>S1.2: As a PES User I want to de-provision my current temporary Jump Host via the PES Portal in order to free up resources.<br>S1.3: As a PES User I want to extend the expiration date of my current Jump Host via the PES Portal.<br>S1.4: As a PES User I want to access the Jump Host both via SSH and RDP from the PZ using Google OTP.<br>S1.5: As a PES Super Admin I want to provision and de-provision a Jump Host for me or on behalf of a user via the PES Portal either during an emergency, during smoke testing or during the boot strapping phase in which not all required components of the intended final solution are in place. |
| UC101B | Standard Features of the Jump Host | S2.1: As a PES User I want to run a set of standard tools on the Jump Host, e.g. in the case of AMS: RDP client, Internet Browser, SAPGUI, Vault UI or KeyPass (as long as Vault is not ready); the tools should be configured to the context of the tenant (e.g. SAPGUI system list) |

TABLE 7-continued

Partner Easy Access Use Case Scenarios

| ID | Use Case | Scenario |
|---|---|---|
| | | S2.2: As a PES User I want to copy and paste data from my local clipboard into the Jump Host. |
| | | S2.3: As a PES User I want to transfer data from my local PC into the Jump Host. |
| | | S2.4: As a PES User I want to share files between Jump Hosts (e.g., SAPGUI ini files or Remmina config files) |
| | | S2.5: As a PES User I want to access the Internet from my Jump Host |
| UC101C | Network Access to Tenant Assets | S3.1: As a PES User I want to have network access from the Jump Host to the tenant VMs and applications according to the authorizations that are associated with my user record. |
| UC101D | Grant and Revoke Rights to Provision Jump Hosts | S4.1: As a PZ User Admin I want to grant rights to and revoke rights from a partner employee to provision a Jump Host for a particular tenant. |
| UC101E | Authorize Access to Tenant Assets | S5.1: As a PZ User Admin I want to assign specific roles to the users; these roles determine to which CEs and applications the user will have access |
| UC101F | Securing the Jump Hosts | S6.1: As a PES Super Admin I want to ensure that the Jump Hosts are protected against malware and intrusions |
| | | S6.2: As a PES Super Admin I want to have the Jump Hosts monitored for compliance (e.g., Viewtrust) |
| | | S6.3: As a PES Super Admin I want to have my Jump Host sufficiently hardened (e.g., the users cannot sudo to root on the Jump Host). |
| UC101H | Auditing the Deployment of Jump Hosts | S7.1: As a PES Auditor I want to review the list of employees with rights to provision a Jump Host and their respective access rights to the CEs. |
| | | S7.2: As a PES Auditor I want to review the lifecycle of all Jump Hosts including the information: |
| | | for which CSE was it provisioned |
| | | who provisioned it |
| | | what was the reason for provisioning |
| | | when was it provisioned |
| | | from which container image was it provisioned |
| | | whether it is still alive and when will it expire |
| | | when was it de-provisioned (if it is not alive) |
| | | which access does the user have to the CE |
| | | optionally, which actions have been executed on it |
| UC101I | Auditing the OTP Access to Tenant VMs | S8.1: As a PES Auditor I want to review which user has which authorizations to access tenant assets. |
| | | S8.2 As A PES Auditor I want to list all OTPs that were generated for a particular CE in a selected time interval. |
| UC101J | Login with one-time OS credential | S9.1: As a PES User I want to use a one-time SSH key to authenticate against a tenant Linux VM; |
| | | S9.2: As a PES User I want to use a (ideally named) local Windows account to authenticate against a tenant Windows Server VM; the credentials should be invalidated after login |
| | | S9.3: As a PES User I want to retrieve the OS credential via UI or CLI from the Jump Server |
| UC101K | Local login/sudo audit for RCA | S10.1: As a PES User I want to query who logged into a tenant VM the last time (e.g., for RCA), I execute that query while logged on to the VM |
| | | S10.2: As a PES User I want to query who executed which sudo commands on a tenant Linux VM (e.g., for root cause analysis), I execute that query while logged on to the VM |

TABLE 8

Partner Easy Deployment Use Case Scenarios

| ID | Use Case | Scenario |
|---|---|---|
| UC104A | Deploy VM on CE | S1.1: As a PES User I want to deploy a VM or set of VMs into a selected CE; I will provide a reason for the deployment. |
| UC104B | Apply Salt State on CE | S2.1: As a PES User I want to select a CE and a Salt State from the GIT repository that is associated with that environment and then I want to apply that State to the CE; I will provide a reason for the application. |

TABLE 8-continued

Partner Easy Deployment Use Case Scenarios

| ID | Use Case | Scenario |
|---|---|---|
| | | S2.2: As a PES User I want to select a CE and a Pillar from the GIT repository that is associated with that environment and then I want to activate that Pillar for the CE; I will provide a reason for the activation.<br>S2.3: As a PES User I want to simulate a Salt state. |
| UC104C | Commit Salt State to GIT Repository for CE | S3.1: As a PES User I want to commit a Salt State to the GIT repository that is associated with a selected CE. |
| UC104D | User Management for Easy Deployment Capability | S4.1: As a PZ User Admin I want to grant or revoke rights to deploy VMs for a CE.<br>S4.2: As a PZ User Admin I want to grant or revoke rights to commit Salt States for a CE.<br>S4.3: As a PZ User Admin I want to grant or revoke rights to commit Salt Pillars for a CE.<br>S4.4: As a PZ User Admin I want to grant or revoke rights to apply Salt States to a CE.<br>S4.5: As a PZ User Admin I want to grant or revoke rights to activate Salt Pillars for a CE. |
| UC104E | Create IaaS Service Account for Partner | S5.1: As a Customer PES Admin I want to provide an xStream service account to a partner which can be used to deploy VMs (e.g., but not remove VMs) in a selected CE environment (e.g., the PPP environment such as a VEC environment).<br>S5.2: As a Customer PES Admin I want to provide a non-PPP IaaS service account (e.g., a non-VEC IaaS service account) to a partner which can be used to deploy VMs (e.g., but not remove VMs) in a selected non-PPP CE (e.g., a non-VEC environment). |
| UC104F | Manage Artifacts | S6.1: As a PZ Service Admin I want to browse the PES repository for deployable artifacts (e.g., from the PPP or from a partner organization) and want to see metadata from which I can infer how to address these artifacts in Salt States.<br>S6.2: As a PZ Service Admin I want to upload artifacts to the PES repository into a private space for validation by the PPP.<br>S6.3: As a PZ Service Admin I want to remove artifacts that belong to my partner organization.<br>S6.4: As a PES Repository Admin I want to validate and publish partner-owned artifacts. |
| UC104G | Auditing the Easy Deployment Capability | S7.1: As a PES Auditor I want to review the list of employees with rights to deploy VMs, rights to commit and apply Salt States, rights to commit and activate Pillars, respectively, on any of my environments.<br>S7.2: As a PES Auditor (e.g., PPP or Partner) I want to review changes to artifacts in the PES Artifact Repository.<br>S7.3: As a PES Auditor I want to review the deployment of VMs and application of Salt States and activation of Pillars, respectively, including:<br>for which tenant environment was it deployed, applied, activated, etc.<br>who executed it<br>what was the reason for execution<br>when was it executed<br>what the content of the execution |

TABLE 9

Technical Implementations for PES Framework Systems and Micro-Services

| PES System | Component | Implementation |
|---|---|---|
| Virtustream Partner Directory (VPD) | 1. VPD LDAP Server: single source of truth for managed environments (to reflect ownership, PES activation status, etc.), organizations, users and groups | 1: openLDAP running as K8S pod |
| PES Portal | 2. PES Portal: front end to PZ User Admins, PES Users and other actors | 2: Stateless UI5 application on nginx running as K8S pod |
| PES Central Log | 3. PES Log System: receives, stores and provides all logs from all PES services<br>4. PES Audit Server: provides standardized interface for managing audit records | 3: K8S pod<br>4: audit system is running as a K8S pod |
| PES Management | 5. Kubernetes clusters for PFS, TAS and PAS management | 5: AWS Virtual Private Clouds (VPCs) with |

TABLE 9-continued

Technical Implementations for PES Framework Systems and Micro-Services

| PES System | Component | Implementation |
|---|---|---|
| System | 6. PES ControlPlane Service: PES control functions for PFS, TAS, PAS and network management<br>7. PES AAA: authentication and authorization service<br>8. PES Vault: stores user secrets<br>9. PES Manager: back end of PES Portal, provides REST API for PES operations | K8S clusters<br>6: K8S pod<br>7: Standard core service<br>8: Hashicorp Vault running as K8S pod<br>9: K8S pod |
| PES Network Control System | 10. PES NW Virtualization: routes and firewall management for PES environments<br>11. SDP: for PZ access<br>12. SD-WAN: for non-VEC cloud connections | 10: AWS;<br>11: Cyxtera (SDP);<br>12: NSX SD-WAN (Velocloud) or IPsec |
| PES Repository | 13. PES Repository: stores PES artifacts<br>14. PES Remote Repository | 13: Amazon ECR<br>14: K8S pod |
| VEC IaaS | 15. IaaS Platform | 15: AWS |
| Others (for PES Capabilities) | 16. PZ Salt Master (PZSM) and PZ minions: configuration management system for PZ<br>17. TSM and tenant minions: configuration management system for CE<br>18. PES GIT for Salt States: version control system for configuration management<br>19. Jump Host Image: Ubuntu image for UC101<br>20. Jump Host Orchestrator: manages Jump Hosts in CSEs<br>21. Central Salt Manager: deploys, configures and operates CSEs | 16: K8S pod<br>17: K8S pod<br>18: K8S pod<br>19: K8S pod<br>20: K8S pod<br>21: K8S pod |

TABLE 10

Mapping of Use Cases to PES Framework Components

| UC ID and Name | 1: VPD LDAP | 2: PES Portal | 3: Log System | 4: PES Audit | 6: PES | 7: PES | 8: PES Vault | 9: PES Manager | 10: PES NW | 11: SDP | 12: SD-WAN | 13: PES | 14: PES Remote | 15: IaaS | 16: PZSM | 17: TSM | 18: PES GIT | 19: Jump Host | 20: Jump Host | 21: Central Salt |
|---|---|---|---|---|---|---|---|---|---|---|---|---|---|---|---|---|---|---|---|---|
| UC1 and UC19: Customer and Partner Registration | X | | | | X | X | | X | X | | | X | | X | | | | | | |
| UC2: Manage Customer/Partner Users | X | | | | | | | | | | | | | | | | | | | |
| UC4 and UC5: PES and Partner Activation and Deactivation | X | X | X | X | X | X | | X | X | | X | X | | | | | | | | |
| UC7: View Customer Access Records (Q: Who has rights to deploy jump hosts?) | X | | X | X | | X | | X | | | | X | | | | | | | | |
| UC9: Deploy and Manage PCS | X | X | X | | X | X | X | X | X | | | X | X | | X | | X | | | X |
| UC10: Publish Container Images for TAS | | | | | | | | | | | | X | | | | | | | | |
| UC16: Manage PES Containers | X | | X | | X | X | X | | X | | | X | X | | | | | | | |
| UC20: Activate and Deactivate Salt-based CM | X | X | X | X | X | X | X | X | X | | | X | X | | X | X | X | | | X |
| UC23: SDP access to PZ | | | | | X | | | | | X | | | | | | | | | | |
| UC101A: Temporary Jump Host | X | X | X | X | X | X | X | X | X | | | X | X | | | X | X | X | X | X |
| UC101C: Access to Tenant Assets | X | X | | | | | | X | X | | X | | | | | | | X | | |
| UC101H: Auditing the Deployment of Jump Hosts | X | X | X | X | X | X | | | | | | | | | | | | | | |
| UC104A and UC104B: PZ-controlled Deployment of Workloads onto Tenant VMs | X | X | X | X | X | X | X | X | X | | | X | X | | | X | X | | | X |

TABLE 11

PES Abstraction Layer Components and Implementation Solutions

| Layer | Component | Implementation Solution |
|---|---|---|
| 1 | PES-MN, PZ, CSE Networks | AWS VPC |
| 1 | PES Compute | AWS |
| 1 | PES Storage | AWS EBS |
| 1 | Customer IaaS AWS | AWS |
| 1 | Customer IaaS VEC | VEC |
| 2 | PES-MN Container Orchestration | Kubernetes Cluster on AWS VMs |
| 2 | PES-MN Load Balancer | AWS ELB |
| 2 | PES-MN Container Registry | AWS ECR |
| 2 | PES-MN Build Pipeline | Github + Jenkins |
| 3 | VPD | openLDAP K8S pod |
| 3 | PES Vault | Hashicorp |
| 3 | PES AAA | K8S pod |
| 3 | PES LDAP Proxy | K8S pod |
| 4 | PES Environment Interconnect | AWS VPC Peering |
| 4 | PES Environment SDP | Cyxtera AppGate |
| 4 | CSE/VEC customer Interconnect | VPN (e.g., SDWAN, IPsec, etc.) |
| 4 | PES-MN/VEC Core Interconnect | VPN |
| 5 | PZ Container Orchestration | Kubernetes Cluster on AWS VMs |
| 5 | CSE Container Orchestration | Kubernetes Cluster on AWS VMs |
| 5 | PZ/CSE Container Registry | AWS ECR |
| 5 | PZ/CSE build Pipeline | Github + Jenkins with Partner Access |
| 5 | PZ/CSE Load Balancer | AWS ELB |
| 6 | PES ControlPlane Service | K8S pod |
| 6 | PES Log System | Prometheus |
| 6 | PES Audit Service | K8S pod |
| 6 | PES Manager | K8S pod |
| 7 | PES Manager | K8S pod |
| 8 | Jump Host Orchestrator | K8S pod |
| 8 | Jump Host Images | Ubuntu-based container images |
| 8 | SAPRouter TAS | Linux image with SAPRouter |
| 8 | PCS (e.g., smartShift) | Containers for smartTool |
| 8 | SALT: Tenant Salt Master (TSM) | Linux image with Salt Master |
| 8 | SALT: GitHub | GitHub for Salt States and Pillars |
| 8 | SALT: Central Salt Master | Salt Enterprise Server |
| 8 | Tenant VM OTC: Tenant Vault | Hashicorp |
| 9 | PES Portal | Linux with nginx and UI5 portal |

TABLE 12

IP Address Range Settings for a Sample PES Framework

| Environment | Private Subnet | Public Subnet | DNS Domain | External IP | Bastion Host IP |
|---|---|---|---|---|---|
| PES MN | 172.30.32.0/20 | 172.30.16.0/20 | svc-pes-mgmt.com | — | 172.30.43.169 |
| SDP controller | 172.31.32.0/20 | 172.31.16.0/20 | — | 13.59.152.71 | — |
| PZ P1 | 10.0.0.0/24 | 10.0.1.0/24 | svc-partner1.com | — | 10.0.1.214 |
| PZ P2 | 10.1.0.0/24 | 10.1.1.0/24 | svc-partner2.com | — | — |
| CSE C1 | 100.64.1.0/24 | 100.64.0.0/24 | svc-cse1.com | — | — |
| CSE C2 | 100.64.3.0/24 | 100.64.2.0/24 | svc-cse2.com | — | — |

TABLE 13

VPC Peerings

| VPC Peering Number | Environment 1 | Environment 2 | Reason |
|---|---|---|---|
| 0 | SDP controller VPC | PES-MN | Access to Bastian Host of PES-MN |
| 1 | PZ P1 | PES-MN | Access from PZ to AAA and PES Manager, access to PZ for K8S API |
| 1b | PZ P2 | PES-MN | See above |
| 2 | CSE C1 | PES-MN | Access from PZ to AAA, PES Manager and Central Salt, access to CSE for K8S API |
| 2b | CSE C2 | PES-MN | See above |
| 3 | CSE C1 | PZ P1 | Access to and from PZ and CSE services |
| 3b | CSE C1 | PZ P2 | See above |
| 3c | CSE C2 | PZ P1 | See above |
| 4 | SDP controller VPC | CSE C1 | Access to exposed services on CSE (such as Jump Hosts) as well as to the Bastion Host |
| 4b | SDP controller VPC | CSE C2 | See above |
| 5 | SDP controller VPC | PZ P1 | Access to exposed services on PZ as well as to the Bastion Host |
| 5b | SDP controller VPC | PZ P2 | See above |
| 6 | CSE C2 | C2 ENV AWS | Communication between CSE and CE on AWS |

TABLE 14

VPN Connections

| VPN Number | Environment 1 | Environment 2 | Reason |
|---|---|---|---|
| 1 | PES-MN | PPP network | Access to Core Services |
| 2 | CSE C1 | C1 ENV VEC | Communication between CSE and customer environment on VEC |
| 2b | CSE C2 | C2 ENV VEC | See above |

What is claimed is:

1. An apparatus comprising:
    at least one processing device comprising a processor coupled to a memory;
    wherein the at least one processing device is configured to implement a plurality of virtual computing resources, the plurality of virtual computing resources comprising:
        a first subset of virtual computing resources providing a management network for a partner enablement services framework, the management network being configured to provision and control communication between one or more partner zones associated with one or more partners of the partner enablement services framework and one or more customer service enclaves associated with one or more customers of the partner enablement services framework;
        a second subset of virtual computing resources providing the one or more partner zones, wherein a given partner zone associated with a given partner of the partner enablement services framework is configured to provision one or more partner-controlled services of the given partner to one or more customer environments via the one or more customer services enclaves; and
        a third subset of virtual computing resources providing the one or more customer service enclaves, wherein a given customer service enclave associated with a given customer of the partner enablement services framework is configured to activate partner enablement services and the given partner for a given customer environment associated with the given customer to enable provisioning of the one or more partner-controlled services of the given partner from the given partner zone to the given customer environment.

2. The apparatus of claim 1 wherein the plurality of virtual computing resources comprise at least one of one or more virtual machines and one or more containers running on an Infrastructure-as-a-Service (IaaS) platform provided by the at least one processing device.

3. The apparatus of claim 2 wherein the given customer environment operates on a cloud computing platform external to the IaaS platform provided by the at least one processing device.

4. The apparatus of claim 1 wherein communication between the one or more customer environments and the one or more partner zones is initiated at the one or more customer environments and takes place via the one or more customer service enclaves.

5. The apparatus of claim 1 wherein the management network is configured:
    to provision the one or more partner zones utilizing a partner administrative services container image providing application functionality for provisioning partner-controlled services; and
    to provision the one or more customer environments utilizing a tenant administrative services container image providing application functionality for activating partner enablement services for respective ones of the one or more partners and the one or more customer environments.

6. The apparatus of claim 1 wherein the management network comprises a partner directory configured to maintain information for partners, customers and a provider of the partner enablement services framework, the partner directory being further configured to maintain authorizations provided by the one or more customers to the one or more partners for the one or more customer services enclaves and the one or more customer environments.

7. The apparatus of claim 1 wherein the management network comprises a credential store configured to store credentials utilized by the one or more partners and the one or more customers to access the partner enablement services framework.

8. The apparatus of claim 1 wherein the management network comprises a central logging system configured to store access records for the one or more partners and the one or more customers of the partner enablement services framework.

9. The apparatus of claim 1 wherein the management network is configured to manage routes between the management network, the one or more partner zones, the one or more customer services enclaves, and the one or more customer environments.

10. The apparatus of claim 9 wherein managing the routes comprises:
    generating a route between the management network and the given customer service enclave responsive to onboarding the given customer to the partner enablement services framework;
    generating a route between the given customer service enclave and the given customer environment responsive to the given customer activating partner enablement services for the given customer environment;
    generating a route between the management network and the given partner zone responsive to onboarding the given partner to the partner enablement services framework; and
    generating a route between the given partner zone and the given customer service enclave responsive to activating the given partner for the given customer.

11. The apparatus of claim 1 wherein the management network comprises a repository hosting container images for one or more micro-services utilized in the one or more partner zones and the one or more customer service enclaves.

12. The apparatus of claim 1 wherein the management network comprises a user interface portal exposing self-service functions for the one or more partners and the one or more customers, the self-service functions comprising one or more of:
    partner enablement services activation and deactivation by the one or more customers;
    partner activation and deactivation for the one or more customer service enclaves by the one or more customers;

viewing users, groups, authorizations, access records, routes and logging entries of the partner enablement services framework;

deploying and managing partner-controlled services onto the one or more partner zones; and publishing images for administrative services deployed to the one or more customer service enclaves for enabling access by the one or more customers to partner-controlled services in the one or more partner zones for activated partners of the one or more customers.

13. The apparatus of claim 1 wherein the management network is configured to provide a configuration management infrastructure for the given consumer, the configuration management infrastructure comprising:

a master component running in the given customer service enclave;

one or more minion components running on virtual computing resources operating in the given customer environment; and a version control system running in the management network for version control of states and pillars used by the configuration management infrastructure for the given consumer;

wherein the master component is configured to apply states and pillars from the version control system to deploy and configure, via the one or more minion components, applications onto the virtual computing resources operating in the given customer environment.

14. The apparatus of claim 1 wherein:

the management network comprises a central repository of managed services that may be deployed in the partner enablement services framework;

the given customer service enclave comprises a remote repository mirroring a set of available managed services from the central repository for deployment from the given customer service enclave to the given customer environment; and the set of available managed services in the remote repository comprise managed services offered by a provider of the partner enablement services framework and a subset of the one or more partners that have been activated for the given customer environment.

15. The apparatus of claim 1 wherein the management network comprises a jump host orchestrator configured to provide jump hosts providing access from the one or more partner zones to virtual computing resources running in the one or more customer environments.

16. The apparatus of claim 15 wherein providing a given jump host comprises:

receiving a request for the given jump host from the given partner associated with the given partner zone that has been activated for the given customer environment;

deploying a jump host image for the given jump host from the jump host orchestrator in the management network to the given customer service enclave;

provisioning the given jump host with a one-time passcode certificate associated with the given partner from a certificate vault in the management network;

utilizing the one-time passcode certificate provisioned in the given jump host to obtain a one-time passcode for the given partner from a tenant vault running in the given customer service enclave; and utilizing the given jump host to access a given virtual computing resource running in the given customer environment utilizing the obtained one-time passcode.

17. A method comprising:

configuring a first subset of a plurality of virtual computing resources to provide a management network for a partner enablement services framework, the management network being configured to provision and control communication between one or more partner zones associated with one or more partners of the partner enablement services framework and one or more customer service enclaves associated with one or more customers of the partner enablement services framework;

configuring a second subset of the plurality of virtual computing resources to provide the one or more partner zones, wherein a given partner zone associated with a given partner of the partner enablement services framework is configured to provision one or more partner-controlled services of the given partner to one or more customer environments via the one or more customer services enclaves; and configuring a third subset of the plurality of virtual computing resources to provide the one or more customer service enclaves, wherein a given customer service enclave associated with a given customer of the partner enablement services framework is configured to activate partner enablement services and the given partner for a given customer environment associated with the given customer to enable provisioning of the one or more partner-controlled services of the given partner from the given partner zone to the given customer environment;

wherein the method is performed by at least one processing device comprising a processor coupled to a memory.

18. The method of claim 17 wherein the plurality of virtual computing resources comprise at least one of one or more virtual machines and one or more containers running on an Infrastructure-as-a-Service (IaaS) platform provided by the at least one processing device.

19. A computer program product comprising a non-transitory processor-readable storage medium having stored therein program code of one or more software programs, wherein the program code when executed by at least one processing device causes the at least one processing device:

to configure a first subset of a plurality of virtual computing resources to provide a management network for a partner enablement services framework, the management network being configured to provision and control communication between one or more partner zones associated with one or more partners of the partner enablement services framework and one or more customer service enclaves associated with one or more customers of the partner enablement services framework;

to configure a second subset of the plurality of virtual computing resources to provide the one or more partner zones, wherein a given partner zone associated with a given partner of the partner enablement services framework is configured to provision one or more partner-controlled services of the given partner to one or more customer environments via the one or more customer services enclaves; and to configure a third subset of the plurality of virtual computing resources to provide the one or more customer service enclaves, wherein a given customer service enclave associated with a given customer of the partner enablement services framework is configured to activate partner enablement services and the given partner for a given customer environment associated with the given customer to enable provisioning of the one or more partner-controlled services of the given partner from the given partner zone to the given customer environment.

20. The computer program product of claim 19 wherein the plurality of virtual computing resources comprise at least one of one or more virtual machines and one or more containers running on an Infrastructure-as-a-Service (IaaS) platform provided by the at least one processing device.

* * * * *